(12) United States Patent
Tsuchiya et al.

(10) Patent No.: US 9,386,225 B2
(45) Date of Patent: Jul. 5, 2016

(54) SHAKING AMOUNT DETECTING APPARATUS, IMAGE PICKUP APPARATUS, AND SHAKING AMOUNT DETECTING METHOD

(71) Applicant: OLYMPUS CORPORATION, Tokyo (JP)

(72) Inventors: Hitoshi Tsuchiya, Hamura (JP); Kiyoshi Tanaka, Hachioji (JP); Hisashi Takeuchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 3 days.

(21) Appl. No.: 14/331,556

(22) Filed: Jul. 15, 2014

(65) Prior Publication Data

US 2014/0327789 A1 Nov. 6, 2014

Related U.S. Application Data

(63) Continuation of application No. PCT/JP2012/073312, filed on Sep. 12, 2012.

(30) Foreign Application Priority Data

Jan. 19, 2012 (JP) .................................. 2012-009170
May 29, 2012 (JP) .................................. 2012-122246

(51) Int. Cl.
   *H04N 5/232* (2006.01)
   *G02B 27/64* (2006.01)

(52) U.S. Cl.
   CPC .............. *H04N 5/2328* (2013.01); *G02B 27/64* (2013.01); *H04N 5/23258* (2013.01); *H04N 5/23287* (2013.01); *G03B 2205/0007* (2013.01); *G03B 2217/005* (2013.01)

(58) Field of Classification Search
   None
   See application file for complete search history.

(56) References Cited

U.S. PATENT DOCUMENTS

2009/0245771 A1  10/2009  Uenaka
2010/0053344 A1  3/2010  Tsukamoto
(Continued)

FOREIGN PATENT DOCUMENTS

EP  2 444 843 A1  4/2012
JP  2004-295027 A  10/2004
(Continued)

OTHER PUBLICATIONS

International Search Report dated Oct. 16, 2012 issued in PCT/JP2012/073312.
(Continued)

*Primary Examiner* — Roberto Velez
*Assistant Examiner* — Quan Pham
(74) *Attorney, Agent, or Firm* — Scully, Scott, Murphy & Presser, P.C.

(57) ABSTRACT

A shaking amount detecting apparatus includes an angular velocity sensor that detects yaw, pitch, and roll-angular-velocities, an acceleration sensor that detects X and Y-accelerations in X and Y-axis directions, radius calculating sections that respectively calculate a yaw-radius and an XZ-roll-radius on the basis of a yaw-angular-velocity, a roll-angular-velocity, and an X-acceleration at different times, a velocity calculating section that multiplies the yaw-angular-velocity with the yaw-radius to calculate a first component of an X-velocity, a velocity calculating section that multiplies the roll-angular-velocity with the XZ-roll-radius to calculate a second component of the X-velocity, an adding section that adds up the first component of the X-velocity and the second component of the X-velocity to acquire the X-velocity, and an integrating section that integrates the X-velocity with respect to a time period to thereby calculate a movement amount in the X-axis direction.

38 Claims, 28 Drawing Sheets

(56) References Cited

U.S. PATENT DOCUMENTS

| | | |
|---|---|---|
| 2010/0245603 A1 | 9/2010 | Hashi et al. |
| 2010/0254688 A1* | 10/2010 | Masuda ................ G03B 17/00 396/55 |
| 2010/0315520 A1 | 12/2010 | Noto et al. |

FOREIGN PATENT DOCUMENTS

| | | |
|---|---|---|
| JP | 2010-054986 A | 3/2010 |
| JP | 2010-091672 A | 4/2010 |
| JP | 2010-243824 A | 10/2010 |
| JP | 2011-259394 A | 12/2011 |

OTHER PUBLICATIONS

Extended Supplementary European Search Report dated Sep. 11, 2015 from related European Application No. 12 86 5686.5.

* cited by examiner

| MEMORY FOR POSITIVE | MEMORY FOR NEGATIVE |
|---|---|
| $R_0^+$ | $R_0^-$ |
| $R_1^+$ | $R_1^-$ |
| $R_2^+$ | $R_2^-$ |
| $R_3^+$ | $R_3^-$ |
| $R_4^+$ | $R_4^-$ |

| 0 | WEIGHT | POSITIVE /NEGATIVE |
|---|---|---|
| −t1 | 5 | + |
| −t2 | 4 | + |
| −t3 | 3 | − |
| −t4 | 2 | + |
| −t5 | 1 | + |

SHAKING AMOUNT DETECTING APPARATUS, IMAGE PICKUP APPARATUS, AND SHAKING AMOUNT DETECTING METHOD

CROSS REFERENCE TO RELATED APPLICATION

This application is a continuation application of PCT/JP2012/073312 filed on Sep. 12, 2012 and claims benefit of Japanese Applications No. 2012-009170 filed in Japan on Jan. 19, 2012, No. 2012-122246 filed in Japan on May 29, 2012, the entire contents of which are incorporated herein by this reference.

BACKGROUND OF THE INVENTION

1. Field of the Invention

The present invention relates to a shaking amount detecting apparatus that detects a movement amount on the basis of a detection result of an angular velocity and a detection result of acceleration, an image pickup apparatus including the shaking amount detecting apparatus, and a shaking amount detecting method.

2. Description of the Related Art

In recent years, a camera equipped with an image stabilization function has been generally used. It is possible to photograph a satisfactory image with little conspicuous image blur caused by shaking when holding the camera without paying special attention in hand-held photographing.

However, during long-second photographing in which an exposure time is long, performance of image stabilization is not considered to be sufficient yet and an image blur is sometimes not sufficiently corrected.

In particular, when the long-second photographing is performed in a macro region, sufficient performance is often not obtained with image stabilization functions currently put to practical use.

The image blur in the macro region does not obtain sufficient performance because of a reason explained below.

An image blur of a camera can be classified into an angular motion blur (hereinafter "angle blur") that occurs when an angle of an optical axis of the camera changes and a translation motion (shifting) blur (hereinafter "translation blur") that occurs when the camera moves (shifts) in a direction perpendicular to the optical axis.

Most of image stabilization techniques currently put to practical use are techniques for correcting only the former angle blur.

On the other hand, the latter translation blur does not substantially affect image quality when an image magnification is low. However, the influence on quality of a photographed image increases as the image magnification is higher. Sufficient performance cannot be obtained in the macro region with the currently used image stabilization techniques because of this reason (that is, because the image magnification is high in the macro region).

As a technique for solving such a problem, for example, Japanese Patent Application Laid-Open Publication No. 2004-295027 describes a technique including an acceleration sensor that detects acceleration of vibration applied to an interchangeable lens, an angular velocity sensor that detects an angular velocity of the vibration, and a target position converting section that calculates a rotation center of angular vibration on the basis of detection results of the acceleration and the angular velocity by the acceleration sensor and the angular velocity sensor and calculates a target position of an image stabilization lens. The image stabilization apparatus drives the image stabilization lens on the basis of a calculation result obtained by the target position converting section and corrects a blur of an image.

Japanese Patent Application Laid-Open Publication No. 2010-243824 describes an image blur correction apparatus including a photographing optical system that photographs an object, angular velocity detecting means for detecting and outputting an angular velocity applied to the image blur correction apparatus, acceleration detecting means for detecting and outputting acceleration applied to the image blur correction apparatus, rotation angular velocity calculating means for calculating a rotation angular velocity component centering on a main point of the photographing optical system on the basis of the output of the angular velocity detecting means, revolution angular velocity calculating means for calculating a revolution angular velocity component about an object on the basis of the output of the acceleration detecting means and a calculation result of the rotation angular velocity calculating means, and control means for performing image blur correction control on the basis of a difference value between the rotation angular velocity component and the revolution angular velocity component. According to the technique, irrespective of in what kind of state angular vibration and parallel vibration are mixed, it is possible to perform correct image blur correction without a failure of control and computation complexity is reduced.

In the technique described in Japanese Patent Application Laid-Open Publication No. 2004-295027, a blur amount of an image surface is calculated on the basis of a translation blur due to rotational motions in a yaw direction and a pitch direction. However, a translation blur due to a rotational motion in a roll direction is not taken into account. Since the translation blur is also caused by the rotational motion in the roll direction, it is preferable to take this point into account to detect a blur amount accurately.

This point is explained with reference to FIG. 1 and FIG. 2A to FIG. 2C according to this application.

First, as shown in FIG. 1, when an optical axis direction of an optical system 2 is represented as Z direction, a horizontal direction of a camera 1 in a standard posture is represented as X direction, and a vertical direction of the camera 1 in the standard posture is represented as Y direction, a rotational motion about a Z axis, which is a first axis, is roll, a rotational motion about a Y axis, which is a second axis, is yaw, and a rotational motion about an X axis, which is a third axis, is pitch.

As shown in FIG. 2A, when the rotational motion in the yaw direction occurs in the camera 1, a movement amount in the X direction is generated. As shown in FIG. 2B, when a rotational motion in the pitch direction occurs in the camera 1, a movement amount in the Y direction is generated.

However, a translation blur that occurs in the camera 1 is not caused only by these rotational motions. It is seen that, as shown in FIG. 2C, when a rotational motion in the roll direction occurs in the camera 1, a movement amount including a movement amount component in the X direction and a movement amount component in the Y direction is generated.

In the technique described in Japanese Patent Application Laid-Open Publication No. 2010-243824, a complicated calculation is performed taking into account a focus vibration, a centripetal force of revolution, acceleration of the revolution, a Coriolis force, a centripetal force of rotation, acceleration of the rotation, a gravitational acceleration component, and the like using, for example, a polar coordinate system.

SUMMARY OF THE INVENTION

A shaking amount detecting apparatus according to an aspect of the present invention includes: a first angular velocity detecting section that detects a first angular velocity about a first axis; a second angular velocity detecting section that detects a second angular velocity about a second axis orthogonal to the first axis; an acceleration detecting section that detects third acceleration in a third axis direction orthogonal to the first axis and the second axis; a rotation radius calculating section that calculates a second radius of a rotational motion about the second axis on the basis of the first angular velocity, the second angular velocity, and the third acceleration at a first time and the first angular velocity, the second angular velocity, and the third acceleration at a second time, and calculates a first-third projection radius of projection of a first radius of a rotational motion about the first axis on a plane including the first axis and the third axis; and a shaking amount calculating section that calculates a movement amount in the third axis direction on the basis of the second radius, the first-third projection radius, the first angular velocity, and the second angular velocity.

An image pickup apparatus according to an aspect of the present invention includes: the shaking amount detecting apparatus according to the aspect; an optical system that forms an image of light from an object as an object image; an image pickup device that converts the object image formed by the optical system into a video signal; and a driving section that drives at least one of the optical system and the image pickup device in a direction for cancelling a movement amount detected by the shaking amount detecting apparatus.

A shaking amount detecting method according to an aspect of the present invention includes: detecting a first angular velocity about a first axis; detecting a second angular velocity about a second axis orthogonal to the first axis; detecting third acceleration in a third axis direction orthogonal to the first axis and the second axis; calculating a second radius of a rotational motion about the second axis on the basis of the first angular velocity, the second angular velocity, and the third acceleration at a first time and the first angular velocity, the second angular velocity, and the third acceleration at a second time, and calculating a first-third projection radius of projection of a first radius of a rotational motion about the first axis on a plane including the first axis and the third axis; and calculating a movement amount in the third axis direction on the basis of the second radius, the first-third projection radius, the first angular velocity, and the second angular velocity.

DETAILED DESCRIPTION OF THE PREFERRED EMBODIMENT

Embodiments of the present invention are explained below with reference to the drawings.

[First Embodiment]

Figure 1:
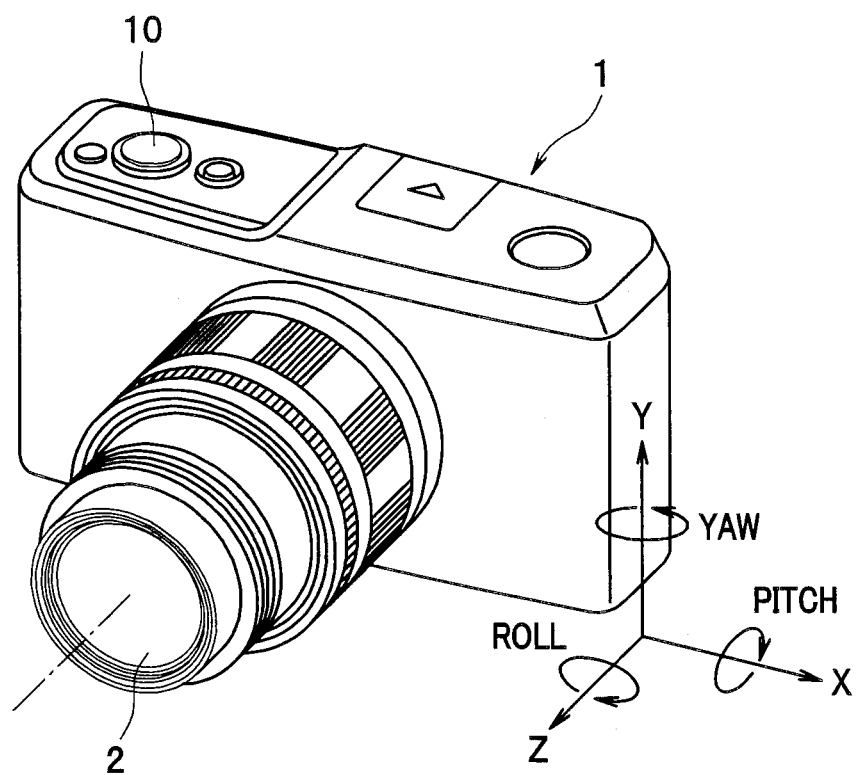
FIG. 1 is a perspective view for explaining types of rotational motions that occur in an image pickup apparatus in a first embodiment of the present invention.

FIG. 1 to FIG. 14 show a first embodiment of the present invention. FIG. 1 is a perspective view for explaining types of rotational motions that occur in an image pickup apparatus.

First, a coordinate system and rotating directions set in an image pickup apparatus 1 are explained with reference to FIG. 1. Note that the image pickup apparatus 1 only has to be an apparatus including an image pickup function and widely includes various apparatuses such as a digital camera, a video camera, and a cellular phone with a camera function. However, in the following explanation, the image pickup apparatus 1 is representatively referred to as camera 1 or the like as appropriate.

The camera 1 includes an optical system 2 that forms an image of light from an object as an object image. An optical axis direction of the optical system 2 is represented as Z direction. A positive Z direction is a direction from the camera 1 to the object.

In a standard posture (a so-called lateral position) of the camera 1, a horizontal direction of the camera 1 is represented as X direction. A positive X direction is a right direction at the time when the camera 1 is viewed from the object side (i.e., a left direction at the time when the camera 1 is viewed from a photographer).

Further, in the standard posture of the camera 1, a vertical direction of the camera 1 is represented as Y direction. A positive Y direction is an upward direction in the standard posture.

In FIG. 1 (and FIG. 2A to FIG. 2C referred to below), an origin position of the coordinate system is shifted in order to prevent the coordinate system from overlapping the camera 1 to be less easily seen. However, an origin of the coordinate system is a center of an image pickup plane of an image pickup device 4 (see FIG. 3) and, in general, a point where the image pickup plane and an optical axis of the optical system 2 cross. The coordinate system is a coordinate system fixed to the camera 1. If the camera 1 moves or rotates, the coordinate system also moves or rotates with respect to an earth. In the coordinate system, an X-Y plane is a plane coinciding with the image pickup plane.

In such a coordinate system, a rotational motion about the Z axis is roll, a rotational motion about the X axis is pitch, and a rotational motion about the Y axis is yaw.

Further, in the following explanation, for example, a left rotation about the Z axis at the time when a Z-axis positive direction is viewed from the origin is a positive direction rotation of the roll. A left rotation about the X axis at the time when an X-direction positive direction is viewed from the origin is a positive direction rotation of the pitch. A right rotation about the Y axis at the time when a Y-axis positive direction is viewed from the origin is a positive direction rotation of the yaw.

Note that positive and negative directions of coordinate axes and positive and negative of rotating directions are positive and negative directions of the coordinate axes and positive and negative of the rotating directions for convenience that depend on mounting directions of an angular velocity sensor 8 and an acceleration sensor 9 explained hereunder (see FIG. 3 and the like) and are not theoretically limited to the above.

In the coordinate system explained above, when a rotation center is present at the origin (or the rotation center is present in the camera 1 including the origin), an angle blur is mainly caused. When the rotation center is present on an outside of the camera 1, a translation blur is caused in addition to the angle blur. Therefore, it may be considered that a translation blur for which image stabilization needs to be performed occurs when the rotation center is substantially present on the outside of the camera 1.

First, the angle blur only has to be described as a rotational motion about the origin. That is, as it is well-known, an optical axis is swung to the left and right by a rotational motion in a yaw direction and an object range image-formed on the image pickup device 4 moves to the left and right and the optical axis is swung up and down by a rotational motion in a pitch direction and the object range image-formed on the image pickup device 4 moves up and down. As it is also well-known, a rotational motion in a roll direction causes a lateral position and a longitudinal position of a screen and an oblique position in the middle of the lateral position and the longitudinal position.

Figure 2A:
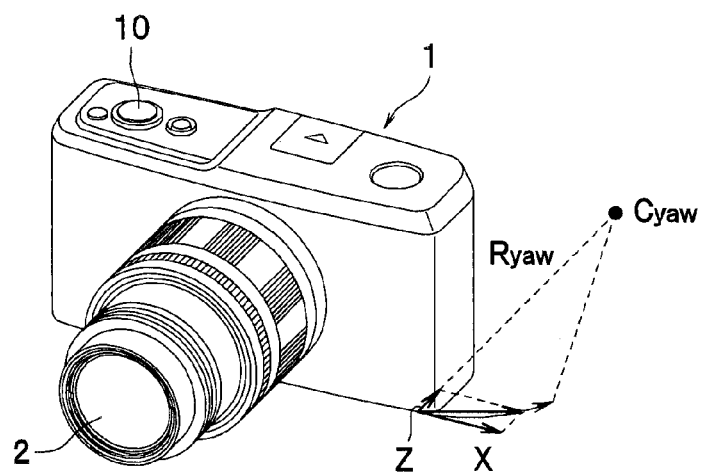
FIG. 2A is a diagram showing a state in which a movement amount is generated in an X direction in the image pickup apparatus by a yaw rotation in the first embodiment.
Figure 2B:
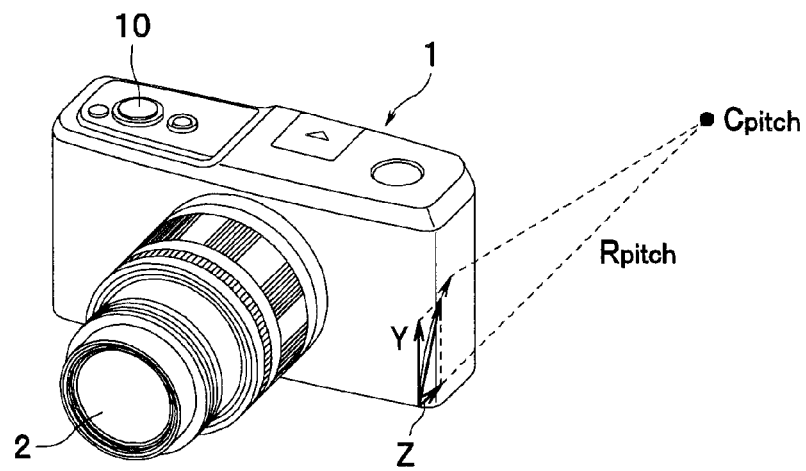
FIG. 2B is a diagram showing a state in which a movement amount in a Y direction is generated in the image pickup apparatus by a pitch rotation in the first embodiment.
Figure 2C:
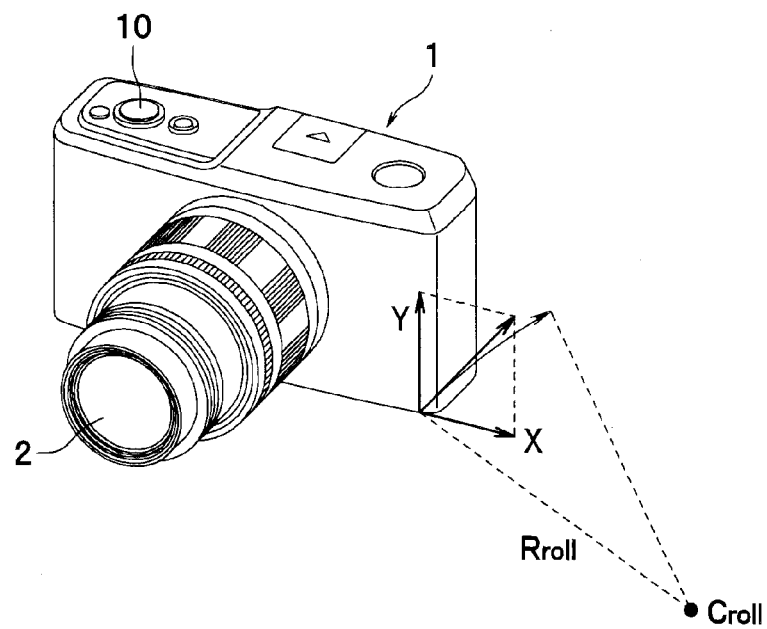
FIG. 2C is a diagram showing a state in which movement amounts in the X direction and the Y direction are generated in the image pickup apparatus by a roll rotation in the first embodiment.

On the other hand, as explained above, the translation blur can be described as a rotational motion having a rotation center on the outside of the camera 1. FIG. 2A is a diagram showing a state in which a movement amount in the X direction is generated in the image pickup apparatus by the yaw rotation. FIG. 2B is a diagram showing a state in which a movement amount in the Y direction is generated in the image pickup apparatus by the pitch rotation. FIG. 2C is a diagram showing a state in which movement amounts in the X direction and the Y direction occur in the image pickup apparatus by the roll rotation.

As shown in FIG. 2A, when a rotational motion in the yaw direction having a rotation center Cyaw in a position at a distance (a rotation radius) Ryaw from the origin on the outside of the camera 1 occurs in the camera 1, a movement amount in the X direction is generated.

As shown in FIG. 2B, when a rotational motion in the pitch direction having a rotation center Cpitch in a position at a distance (a rotation radius) Rpitch from the origin on the outside of the camera 1 occurs in the camera 1, a movement amount in the Y direction is generated.

Further, as shown in FIG. 2C, a rotational motion in the roll direction having a rotation center Croll in a position at a distance (a rotation radius) Rroll from the origin on the outside of the camera 1 occurs in the camera 1, in general, a movement amount including a movement amount component in the X direction and a movement amount component in the Y direction is generated.

Of the angle blur and the translation blur, a publicly-known technique can be used concerning the former angle blur as appropriate. Therefore, in the present embodiment, the latter translation blur is mainly explained.

Figure 3:
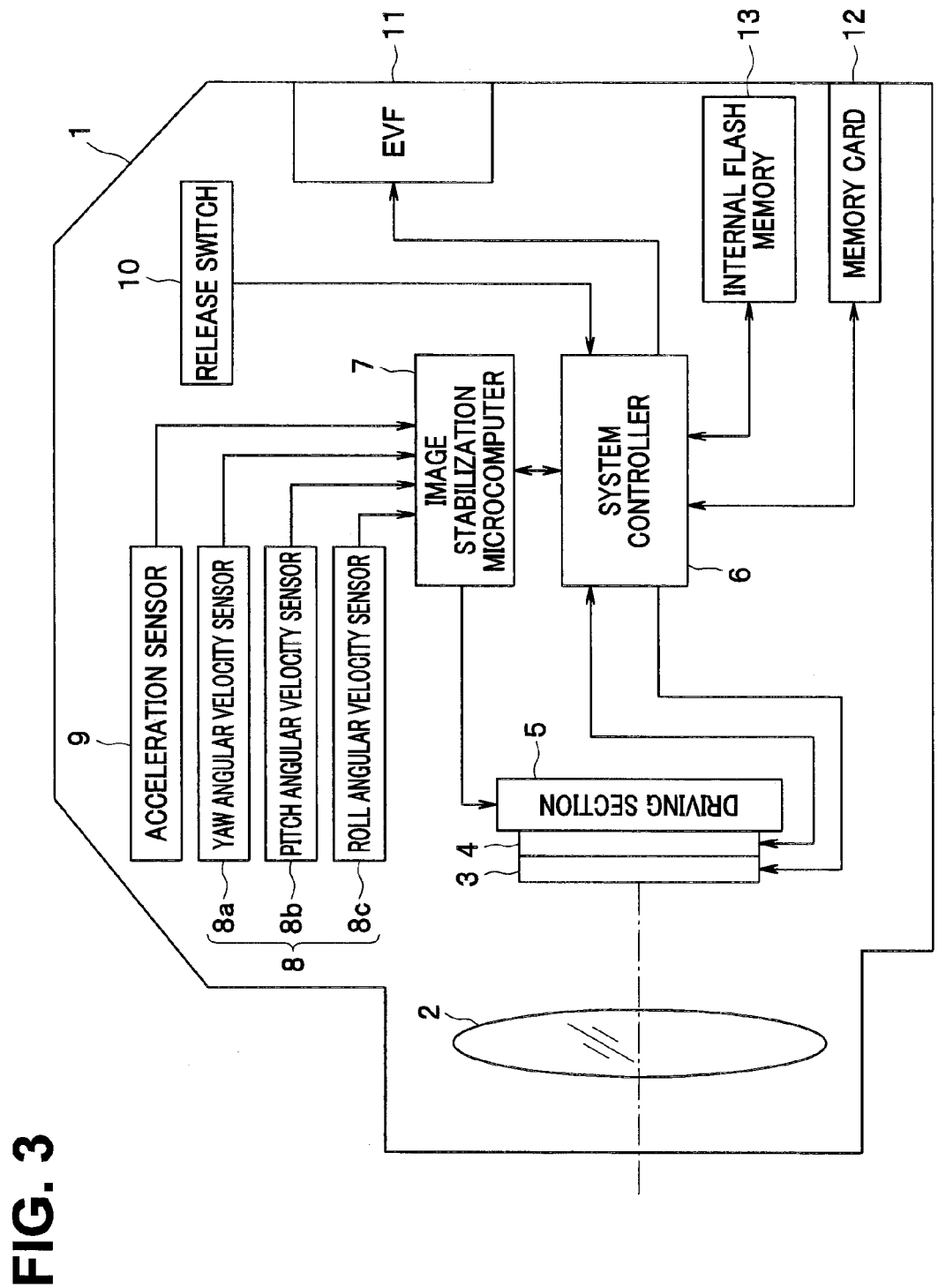
FIG. 3 is a block diagram showing a configuration of the image pickup apparatus in the first embodiment.

First, FIG. 3 is a block diagram showing a configuration of the image pickup apparatus 1.

The camera 1, which is the image pickup apparatus, includes the optical system 2, a focal plane shutter 3, the image pickup device 4, a driving section 5, a system controller 6, an image stabilization microcomputer 7, the angular velocity sensor 8, the acceleration sensor 9, a release switch 10, an EVF (electronic view finder) 11, and an internal flash memory 13. In FIG. 3, a memory card 12 is also shown. However, the memory card 12 is configured to be, for example, detachably attachable to the camera 1. Therefore, the memory card 12 does not have to be a component peculiar to the camera 1.

The optical system 2 forms an image of light from an object on an image pickup plane of the image pickup device 4 as an object image.

The focal plane shutter 3 is disposed on a front surface (the optical system 2 side) of the image pickup device 4 and controls an exposure time by performing an opening and closing motion. That is, the focal plane shutter 3 opens to set the image pickup device 4 in an exposing state and closes to set the image pickup device 4 in a shading state.

The image pickup device 4 converts the object image formed on the image pickup plane into an electric signal on the basis of an instruction of the system controller 6. The converted electric signal is read out as a video signal by the system controller 6.

The driving section 5 supports the image pickup device 4 to be movable in a two-dimensional direction parallel to the image pickup plane and drives the image pickup device 4 in the X direction and the Y direction shown in FIG. 1 and the like on the basis of an instruction from the image stabilization microcomputer 7.

The system controller 6 is a control section that comprehensively performs various kinds of control concerning functions of the entire camera 1 including readout of the video signal. As explained below, the system controller 6 also performs control for causing the image stabilization microcomputer 7 to perform blur detection and perform image stabilization on the basis of a blur detection result.

The angular velocity sensor 8 is a sensor configured as an angular velocity detecting section that detects a rotational motion. The angular velocity sensor 8 detects an angle change per unit time as an angular velocity and outputs the angular velocity to the image stabilization microcomputer 7. The angular velocity sensor 8 includes a yaw angular velocity sensor 8a functioning as a yaw angular velocity detecting section (a second angular velocity detecting section) that detects a yaw angular velocity related to a yaw rotational motion about the Y axis shown in FIG. 2A, a pitch angular velocity sensor 8b functioning as a pitch angular velocity detecting section (a third angular velocity detecting section) that detects a pitch angular velocity related to a pitch rotational motion about the X axis shown in FIG. 2B, and a roll angular velocity sensor 8c functioning as a roll angular velocity detecting section (a first angular velocity detecting section) that detects a roll angular velocity related to a roll rotational motion about the Z axis shown in FIG. 2C. The angular velocity sensor 8 is configured to detect angular velocities having three degrees of freedom of a rotating direction. Note that, although the yaw angular velocity sensor 8a is the second angular velocity detecting section and the pitch angular velocity sensor 8b is the third angular velocity detecting section, the yaw angular velocity sensor 8a (the yaw angular velocity detecting section) may be the third angular velocity detection section and the pitch angular velocity sensor 8b (the pitch angular velocity detecting section) may be the second angular velocity detecting section.

The yaw angular velocity sensor 8a, the pitch angular velocity sensor 8b, and the roll angular velocity sensor 8c detect rotational motions about the respective axes using, for example, a sensor of the same model by varying a mounting direction.

The acceleration sensor 9 is an acceleration detecting section that detects at least acceleration in the X-axis direction (X acceleration) and acceleration in the Y-axis direction (Y acceleration). In the present embodiment, further, a sensor that can also detect acceleration in the Z-axis direction (Z acceleration) is adopted. The acceleration sensor 9 outputs the detected accelerations in the respective directions to the image stabilization microcomputer 7.

Note that the angular velocity sensor 8 and the acceleration sensor 9 perform detection in time series (that is, at every predetermined time interval) at different detection times and sequentially output detection results to the image stabilization microcomputer 7.

The image stabilization microcomputer 7 calculates a shaking amount of the camera 1 from the output of the angular velocity sensor 8 and the output of the acceleration sensor 9 on the basis of an instruction of the system controller 6. The image stabilization microcomputer 7 outputs, to the driving section 5, an instruction for driving the image pickup device 4 by the detected shaking amount in an opposite direction of a detected blur direction. Consequently, the driving section 5 drives the image pickup device 4 to cancel a blur on the image pickup plane. Therefore, it is possible to prevent a blur that occurs in a photographed image. Note that, although the image pickup device 4 is driven to perform image stabilization, the optical system 2 may be driven to perform the image stabilization instead of or in addition to this.

A shaking amount detecting apparatus is configured to include the image stabilization microcomputer 7, the angular velocity sensor 8, and the acceleration sensor 9. An image stabilization apparatus is configured to include the shaking amount detecting apparatus and the driving section 5.

The release switch 10 includes, for example, a press switch of a two-step type connected to the system controller 6. AF and AE are performed by press in the first step (half-press or 1st release) and exposure is started in the second step (full-press or 2nd release).

The EVF 11 is a display section configured to include a liquid crystal panel. The EVF 11 displays a video signal read out from the image pickup device 4 and converted into a displayable form in the system controller 6 or the like to enable the user to visually recognize the video signal.

The memory card 12 is a nonvolatile recording medium that records the video signal read out from the image pickup device 4 and converted into a recordable form in the system controller 6 or the like. As explained above, the memory card 12 is configured to be, for example, detachably attachable to the camera 1.

The internal flash memory 13 is a nonvolatile recording medium that records a control program for the camera 1 executed by the system controller 6 and various parameters and the like used for control.

Figure 4:
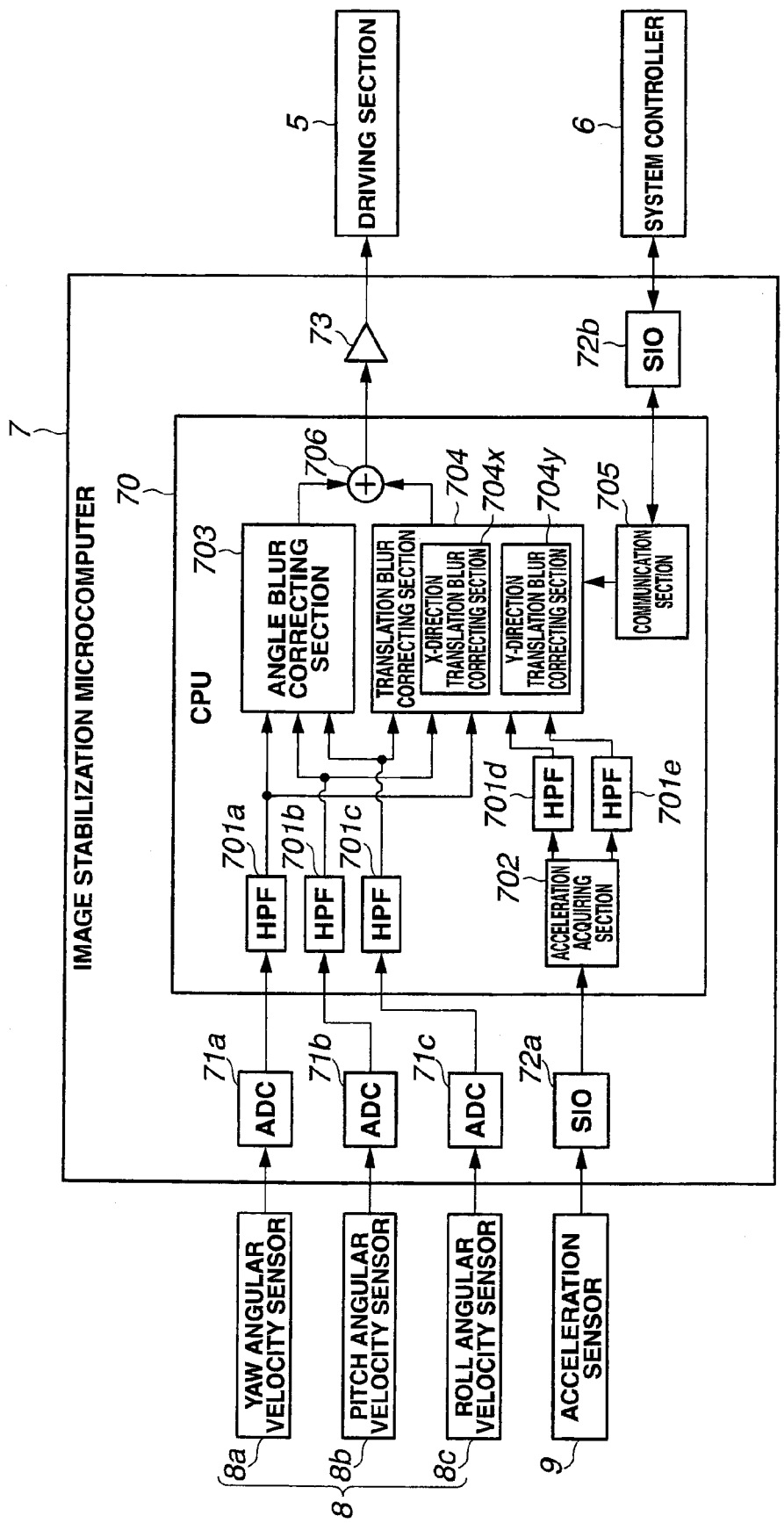
FIG. 4 is a block diagram showing a configuration of an image stabilization microcomputer in the first embodiment.

FIG. 4 is a block diagram showing a configuration of the image stabilization microcomputer 7.

The image stabilization microcomputer 7 includes a CPU 70, ADCs (analog digital converters) 71a to 71c, SIOs (serial input/outputs) 72a and 72b, and a driver 73.

The ADCs 71a to 71c respectively convert analog signals inputted from the angular velocity sensors 8a to 8c into digital signals.

The SIOs 72a and 72b are communication sections through which the CPU 70 performs communication with external devices by a serial interface. The SIO 72a is used by the CPU 70 to read out a value of acceleration detected by the acceleration sensor 9. The SIO 72b is used for communication in which the CPU 70 exchanges commands with the system controller 6.

The driver 73 outputs, on the basis of a correction amount calculated by the CPU 70, a signal for driving the driving section 5.

The CPU 70 includes HPFs (high pass filters) 701a to 701e, an acceleration acquiring section 702, an angle blur correcting section 703, a translation blur correcting section 704, a communication section 705, and an adding section 706 as, for example, functions configured by firmware, which is an internal program (however, naturally, the sections may be configured as hardware). The CPU 70 calculates correction amounts of an angle blur and a translation blur on the basis of detection results of the angular velocity sensor 8 and the acceleration sensor 9.

The HPFs 701a to 701e remove low-frequency components of angular velocities and accelerations inputted as digital data. That is, the HPF 701a removes the low-frequency component from an inputted yaw angular velocity, the HPF 701b removes the low-frequency component from an inputted pitch angular velocity, the HPF 701c removes the low-frequency component from an inputted roll angular velocity, the HPF 701d removes the low-frequency component from inputted X acceleration, and the HPF 701e removes the low-frequency component from inputted Y acceleration. Examples of the low-frequency components to be removed include frequency components equal to or lower than 1 Hz. However, the low-frequency components are not limited to this band. It is confirmed by an experiment that a frequency based on a camera shake is between about 1 Hz and 10 Hz. Consequently, it is possible to remove components of aged deterioration due to movement (e.g., drift) of a sensor caused by a factor other than the camera shake.

The acceleration acquiring section 702 reads out accelerations in independent three axis directions from the acceleration sensor and divides the accelerations into acceleration information in the respective directions of the X axis, the Y axis, and the Z axis shown in FIG. 2 and the like. The acceleration acquiring section 702 outputs the X acceleration to the HPF 701d and outputs the Y acceleration to the HPF 701e.

The angle blur correcting section 703 calculates a blur amount (an angle blur) involved in an angle change on the basis of the yaw rotational motion and the pitch rotational motion. Concerning the angle blur, a publicly-known technique can be used as appropriate. Therefore, details of the angle blur are not described.

The translation blur correcting section 704 calculates a translation movement amount of the camera 1 on the basis of acceleration and an angular velocity, converts the calculated movement amount into a blur amount of an object image on the image pickup plane, and transmits the blur amount to the driving section 5 as a correction amount. The translation blur correcting section 704 includes an X-direction translation blur correcting section 704x that performs calculation of a translation blur amount in the X direction and a Y-direction translation blur correcting section 704y that performs calculation of a translation blur amount in the Y direction.

The communication section 705 communicates with the system controller 6 through the SIO 72b.

The adding section 706 adds up the angle blur amount calculated by the angle blur correcting section 703 and the translation blur amount calculated by the translation blur correcting section 704 and outputs a total blur amount to the driver 73.

Figure 5:
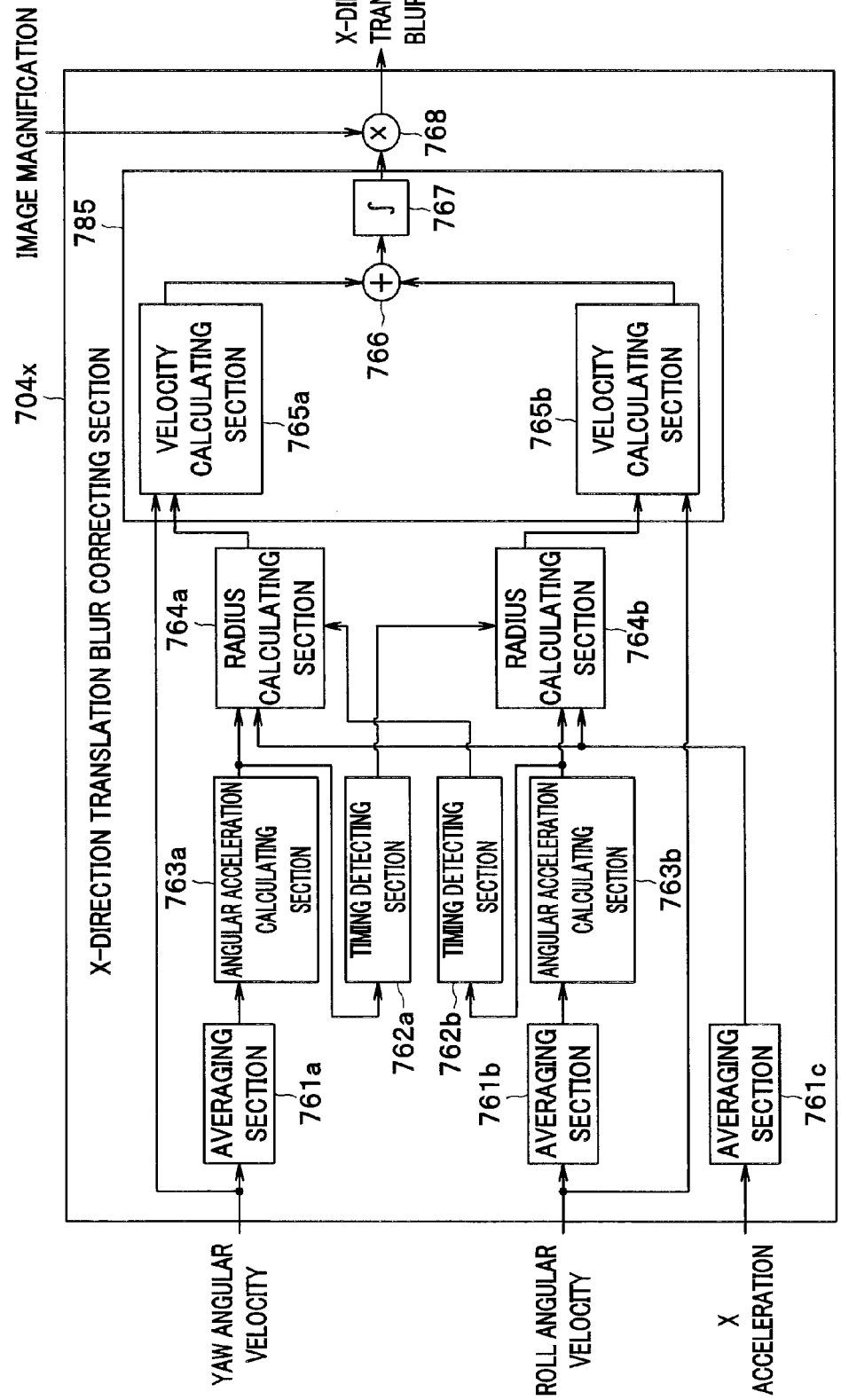
FIG. 5 is a block diagram showing a configuration of an X-direction translation blur correcting section in the first embodiment.

FIG. 5 is a block diagram showing a configuration of the X-direction translation blur correcting section 704x.

The Y-direction translation blur correcting section 704y has the same configuration as the X-direction translation blur correcting section 704x. The Y-direction translation blur correcting section 704y is only different from the X-direction translation blur correcting section 704x in that inputs are the pitch angular velocity and the Y acceleration instead of the yaw angular velocity and the X acceleration. Therefore, only the X-direction translation blur correcting section 704x is explained with reference to FIG. 5.

The X-direction translation blur correcting section 704x includes averaging sections 761a to 761c, timing detecting sections 762a and 762b, angular acceleration calculating sections 763a and 763b, radius calculating sections 764a and 764b, a movement amount calculating section 785, and a multiplying section 768.

The averaging sections 761a to 761c average angular velocities and accelerations inputted in time series. The averaging is performed by, for example, calculating an average of data for four samplings and outputting the average as one sampling value. The averaging has an effect of suppressing a high-frequency component from being emphasized by a differential operation in the angular acceleration calculating sections 763a and 763b at a later stage and has an effect of reducing computational complexity because a data amount is reduced to ¼.

The angular acceleration calculating sections 763a and 763b differentiate the averaged angular velocity and calculate angular acceleration. The calculated angular acceleration is used for radius calculation in the radius calculating sections 764a and 764b and used for detection of time indicating radius calculation timing in the timing detecting sections 762a and 762b.

The timing detecting sections 762a and 762b detect timing (time) when the radius calculating sections 764a and 764b perform calculation of a radius. That is, in the case of the X-direction translation blur correcting section 704x, the timing detecting section 762b sets timing (timing) without an influence of the roll rotational motion as timing (time) for calculating the yaw radius (the second radius) of the yaw rotational motion about the Y axis. The timing detecting section 762a sets timing (time) without an influence of the yaw rotational motion as timing (time) for calculating the roll radius (the first radius) of the roll rotational motion about the Z axis.

As indicated by Expression 1 to Expression 4 below, a rotation radius is calculated on the basis of acceleration and angular acceleration. Therefore, the timing (the time) without an influence of the roll rotational motion is timing (time) when the roll angular acceleration is 0. The timing (the time) without an influence of the yaw rotational motion is timing (time) when the yaw angular acceleration is 0. However, as explained below, a rotation radius R can also be calculated from a relation between a velocity and an angular velocity. In this case, the timing (the time) without an influence of the roll rotational motion is timing (time) when the roll angular velocity is 0. The timing (the time) without an influence of the yaw rotational motion is timing (time) when the yaw angular velocity is 0.

Figure 6:
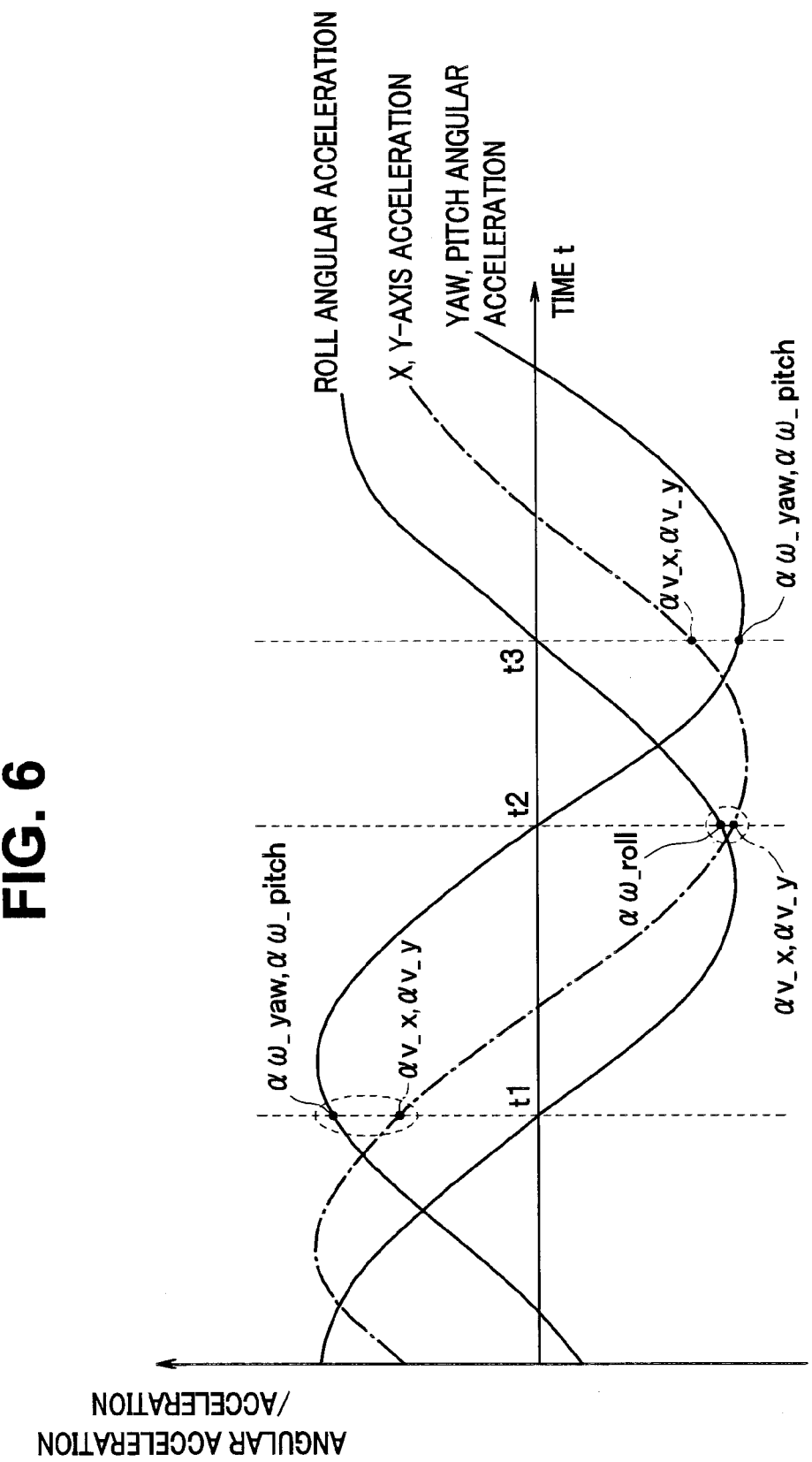
FIG. 6 is a graph for explaining radius calculation timing detected by a timing detecting section in the first embodiment.

FIG. 6 is a graph for explaining radius calculation timing detected by the timing detecting sections 762a and 762b.

As shown in FIG. 6, timing for calculating a yaw radius is timing when the roll angular acceleration calculated from the roll angular velocity is 0 (timing when the roll angular acceleration crosses zero (0 cross) in the graph of FIG. 6 and times t1 and t3 in an example shown in FIG. 6). Timing for calculating XZ roll radiuses serving as a first-third projection radius, which is a projection radius of a roll radius on a Z-X plane (a plane including the Z axis and the X axis) is timing when the yaw angular acceleration calculated from the yaw angular velocity is 0 (timing when the yaw angular velocity crosses zero in the graph of FIG. 6 and time t2 in the example shown in FIG. 6).

Similarly, in the case of the Y-direction translation blur correcting section 704y, the timing detecting section 762b sets timing without an influence of the roll rotational motion (the roll angular acceleration (or the roll angular velocity) is 0) as timing for calculating the pitch radius of the pitch rotational motion about the X axis. The timing detecting section 762a sets timing without an influence of the pitch rotational motion (the pitch angular acceleration (or the pitch angular velocity) is 0) as timing for calculating YZ roll radiuses serving as a first-second projection radius, which is a projection radius of the roll radius on a Z-Y plane (a plane including the Z axis and the Y axis).

The radius calculating sections 764a and 764b are rotation radius calculating sections that calculate a radius, for example, in a dimension of acceleration at the timing detected by the timing detecting sections 762b and 762a.

That is, the radius calculating section 764a calculates, at timing for calculating a yaw radius, a yaw radius Ryaw as indicated by Expression 1 blew on the basis of yaw angular acceleration αω_yaw outputted from the angular acceleration calculating section 763a and averaged X acceleration αv_x outputted from the averaging section 761c.

$$R\text{yaw} = \alpha v\_x / \alpha \omega\_\text{yaw} \qquad \text{[Expression 1]}$$

The radius calculating section 764b calculates, at timing for calculating an XZ roll radius, an XZ roll radius Rrollx as indicated by Expression 2 below on the basis of roll angular acceleration αω_roll outputted from the angular acceleration calculating section 763b and averaged X acceleration αv_x outputted from the averaging section 761c.

$$R\text{rollx} = \alpha v\_x / \alpha \omega\_\text{roll} \qquad \text{[Expression 2]}$$

Similarly, in the radius calculating section 764a of the Y-direction translation blur correcting section 704y, a pitch radius Rpitch is calculated by Expression 3 below and a YZ roll radius Rrolly is calculated by Expression 4 below on the basis of the pitch angular velocity αω_pitch, the Y acceleration αv_y, and the roll angular velocity αωroll.

$$R\text{pitch} = \alpha v\_y / \alpha \omega\_\text{pitch} \qquad \text{[Expression 3]}$$

$$R\text{rolly} = \alpha v\_y / \alpha \omega\_\text{roll} \qquad \text{[Expression 4]}$$

Note that, in performing the calculation using Expression 1 to Expression 4, it is assumed that a change amount of a radius per unit time is small. In the present embodiment, the averaged X acceleration αv_x and the averaged Y acceleration αv_y are used in calculating the yaw radius, the pitch radius, the XZ roll radius, and the YZ roll radius. However, un-averaged X acceleration and un-averaged Y acceleration may be used.

The movement amount calculating section 785 includes velocity calculating sections 765a and 765b, an adding section 766, and an integrating section 767. On the basis of a radius calculated by the radius calculating sections 764a and 764b and an angular velocity inputted from the HPFs 701a to 701c, the movement amount calculating section 785 calculates a movement amount in the X-axis direction when the movement amount calculating section 785 is provided in the X-direction translation blur correcting section 704x and calculates a movement amount in the Y-axis direction when the movement amount calculating section 785 is provided in the Y-direction translation blur correcting section 704y.

The velocity calculating sections 765a and 765b calculate a translational velocity on the basis of the radius calculated by the radius calculating sections 764a and 764b and the angular velocity inputted from the HPFs 701a to 701c.

That is, the velocity calculating section 765a of the X-direction translation blur correcting section 704x multiplies together the yaw radius Ryaw inputted from the radius calculating section 764a and a yaw angular velocity ωyaw inputted from the HPF 701a to thereby calculate a translational velocity (a first component of an X-direction velocity in the X-axis direction) Ryaw×ωyaw in the X direction due to the yaw rotational motion.

The velocity calculating section 765b of the X-direction translation blur correcting section 704x multiplies together the XZ roll radius Rrollx inputted from the radius calculating section 764b and a roll angular velocity ωroll inputted from the HPF 701c to thereby calculate a translational velocity (a second component of an X-direction velocity in the X-axis direction) Rrollx×ωroll in the X direction due to the roll rotational motion.

The adding section 766 is a velocity combining section. The adding section 766 adds up an output of the velocity calculating section 765a and an output of the velocity calculating section 765b to thereby calculate a translational velocity (an X-direction velocity) Vx in the X-direction due to both of the yaw rotational motion and the roll rotational motion as indicated by Expression 5 below.

$$Vx = R\text{yaw} \times \omega\text{yaw} + R\text{rollx} \times \omega\text{roll} \qquad \text{[Expression 5]}$$

Similarly, the velocity calculating sections 765a and 765b of the Y-direction translation blur correcting section 704y respectively calculate a first component Rpitch×ωpitch of a Y-direction velocity and a second component Rrolly×ωroll of the Y-direction velocity. The adding section 766, which is the velocity combining section, adds up the first component Rpitch×ωpitch and the second component Rrolly×ωroll to thereby calculate a translational velocity (a Y-direction velocity) Vy in the Y direction due to both of the pitch rotational motion and the roll rotational motion as indicated by Expression 6 below.

$$Vy = R\text{pitch} \times \omega\text{pitch} + R\text{rolly} \times \omega\text{roll} \qquad \text{[Expression 6]}$$

The integrating section 767 of the X-direction translation blur correcting section 704x functions as a first movement amount calculating section, integrates the calculated an X-direction velocity Vx with respect to a time period t, and calculates a movement amount ΔX in the X-axis direction as indicated by Expression 7 below.

$$\Delta X = \int V_x dt \qquad \text{[Expression 7]}$$

Similarly, the integrating section 767 of the Y-direction translation blur correcting section 704y functions as a first movement amount calculating section, integrates the calculated Y-direction velocity Vy with the respect to time t as indicated by Expression 8 below, and calculates a movement amount ΔY in the Y-axis direction.

$$\Delta Y = \int V_y dt \quad \text{[Expression 8]}$$

The movement amounts ΔX and ΔY calculated in this way are movement amounts of the angular velocity sensor 8 and the acceleration sensor 9, that is, movement amounts of the camera 1 itself. On the other hand, to perform image stabilization, it is necessary to calculate a movement amount of an optical image formed on the image pickup plane of the image pickup device 4. Therefore, the multiplying section 768 multiplies the movement amounts ΔX and ΔY inputted from the integrating section 767 with an image magnification f, which is a parameter inputted from the system controller 6 via the SIO 72*b* and the communication section 705 (see step S3 in FIG. 9) to thereby convert the movement amounts ΔX and ΔY into a blur amount on the image pickup plane and outputs the blur amount as a correction amount D (see step S3 in FIG. 9).

The correction amount D (a translation blur amount) calculated in this way is added to the angle blur amount in the adding section 706 as explained above. Therefore, the driver 73 outputs, on the basis of a total blur amount after the addition, a signal for driving the driving section 5.

Figure 7:
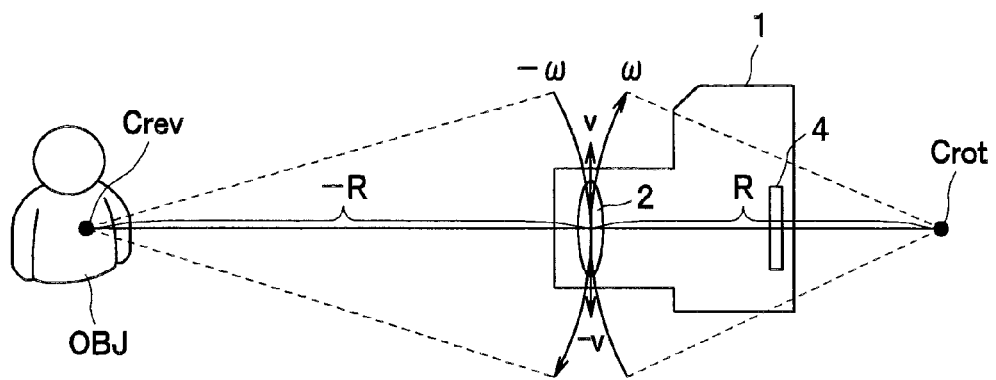
FIG. 7 is a diagram for explaining that a sign of a radius calculated by a radius calculating section is different when a rotation center is present on a photographer side of a camera and when the rotation center is present on an object side in the first embodiment.
Figure 8A:
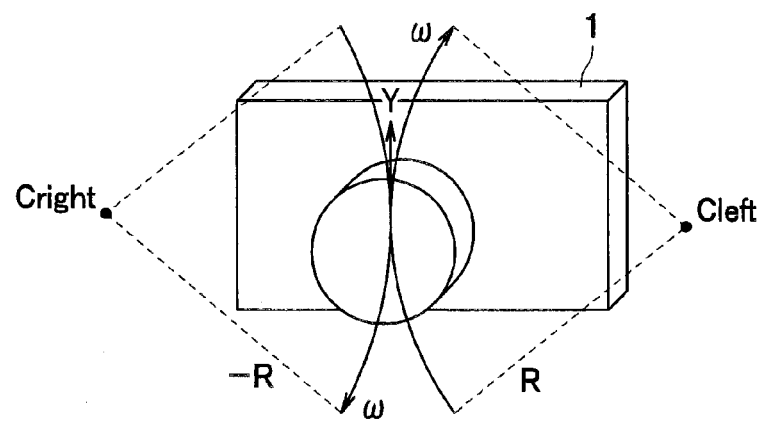
FIG. 8A is a diagram for explaining that the sign of the radius calculated by the radius calculating section is different when the rotation center is present on a left side of the camera and when the rotation center is present on a right side of the camera in the first embodiment.
Figure 8B:
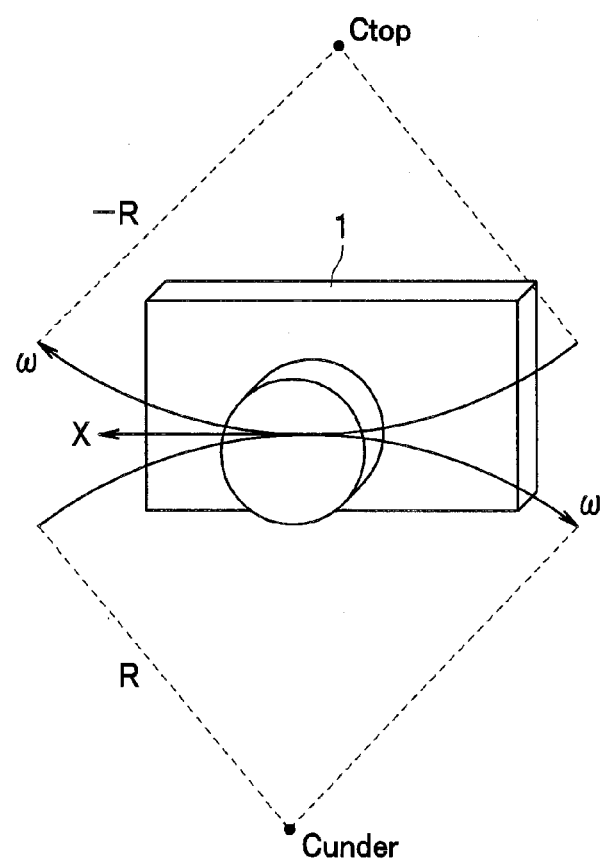
FIG. 8B is a diagram for explaining that the sign of the radius calculated by the radius calculating section is different when the rotation center is present on an upper side of the camera and when the rotation center is present on a lower side of the camera in the first embodiment.

A sign of a radius calculated by the radius calculating sections 764*a* and 764*b* is explained with reference to FIG. 7, FIG. 8A, and FIG. 8B. FIG. 7 is a diagram for explaining that the sign of the radius calculated by the radius calculating sections 764*a* and 764*b* is different when a rotation center is present on the photographer side of the camera 1 and when the rotation center is present on the object side. FIG. 8A is a diagram for explaining that the sign of the radius calculated by the radius calculating sections 764*a* and 764*b* is different when the rotation center is present on a left side of the camera 1 and when the rotation center is present on a right side of the camera 1. FIG. 8B is a diagram for explaining that the sign of the radius calculated by the radius calculating sections 764*a* and 764*b* is different when the rotation center is present on an upper side of the camera 1 and when the rotation center is present on a lower side of the camera 1.

The radius calculating sections 764*a* and 764*b* calculate the radius R from acceleration and angular acceleration as indicated by Expression 1 to Expression 4. The acceleration and the angular acceleration can take both of a positive value and a negative value. Therefore, a sign of the calculated radius R is sometimes positive and is sometimes negative according to a relation between the sign of the acceleration and the sign of the angular acceleration.

When the velocity calculating sections 765*a* and 765*b* calculate a translational velocity component directly using the radius R calculated in this way, a direction of a calculated velocity is opposite when the sign of the radius R is positive and when the sign of the radius R is negative.

For example, as shown in FIG. 7, the sign of the calculated radius R is different when the rotation center is present further on the near side to the photographer (the photographer side) than the camera 1 and when the rotation center is present on an object OBJ side.

If FIG. 7 is a diagram of the camera 1 viewed from a left side surface direction (from the outside of the camera 1 on an X-axis positive side to an X-axis negative direction), when the angular velocity sensor 8 detects a positive angular velocity (as shown in FIG. 1 as pitch, positive is clockwise with respect to the origin), a velocity calculated when a rotation center Crot is present on the near side to the photographer (the photographer side) of the camera 1 is a velocity in an upward direction. A velocity calculated when the rotation center Crev is present on the object OBJ side is a velocity in a downward direction.

When FIG. 7 is a diagram of the camera 1 viewed from an upper side downward, substantially the same explanation is applied to a rotational motion in the yaw direction (however, as shown in FIG. 1 as yaw, positive is counterclockwise with respect to the origin. Therefore, positive and negative are opposite to the above explanation).

When the rotation center Crot is present further on the near side to the photographer (the photographer side) than the camera 1, this is considered to be mainly caused by vibration of a shaft that supports the camera 1, that is, a shake of the photographer gripping the camera 1, a so-called hand shake.

When the rotation center Crev is present on the object OBJ side, this is considered to be manly caused when the rotation center Crev is the object OBJ, that is, caused by movement for returning the target object OBJ to a center of a frame when the target object OBJ deviates from the center of the frame. This kind of movement is often not continuous.

The roll rotational motion is examined. The roll rotational motion affects both of a movement amount in the X direction and a movement amount in the Y direction. Therefore, the roll rotational motion is examined separately for a radius serving as a coefficient related to the movement amount in the X direction and a radius serving as a coefficient related to the movement amount in the Y direction.

Positive and negative of a sign of the radius R related to the movement amount in the Y direction are determined according to whether a rotation center is present on the right (Cright) or the left (Cleft) viewed from the photographer of the camera 1 as shown in FIG. 8A.

Positive and negative of the sign of the radius R related to the movement amount in the X direction are determined according to whether the rotation center is present above (Ctop) or under (Cunder) the camera 1 as shown in FIG. 8B.

A position of the rotation center related to the roll rotational motion is mainly affected by a photographing posture. For example, concerning whether the rotation center is present on the right (Cright) or the left (Cleft) of the camera 1, which is related to the movement amount in the Y direction, the rotation center is often present on the right (Cright) from a relation of a grip position where the photographer grips the camera 1. Concerning whether the rotation center is present above (Ctop) or under (Cunder) the camera 1, which is related to the movement amount in the X direction, when the camera 1 is normally held, the rotation center is present under (Cunder) the camera 1 because an elbow of the photographer is below the camera 1 but, in the case of low-angle photographing, the rotation center is present above (Ctop) the camera 1 because the elbow of the photographer is above the camera 1.

The treatment of the sign of the radius explained above requires attention because, in some case, correction is performed oppositely, that is, a blur is expanded rather than being corrected. It is explained more in detail below how the sign of the radius is determined.

Figure 9:
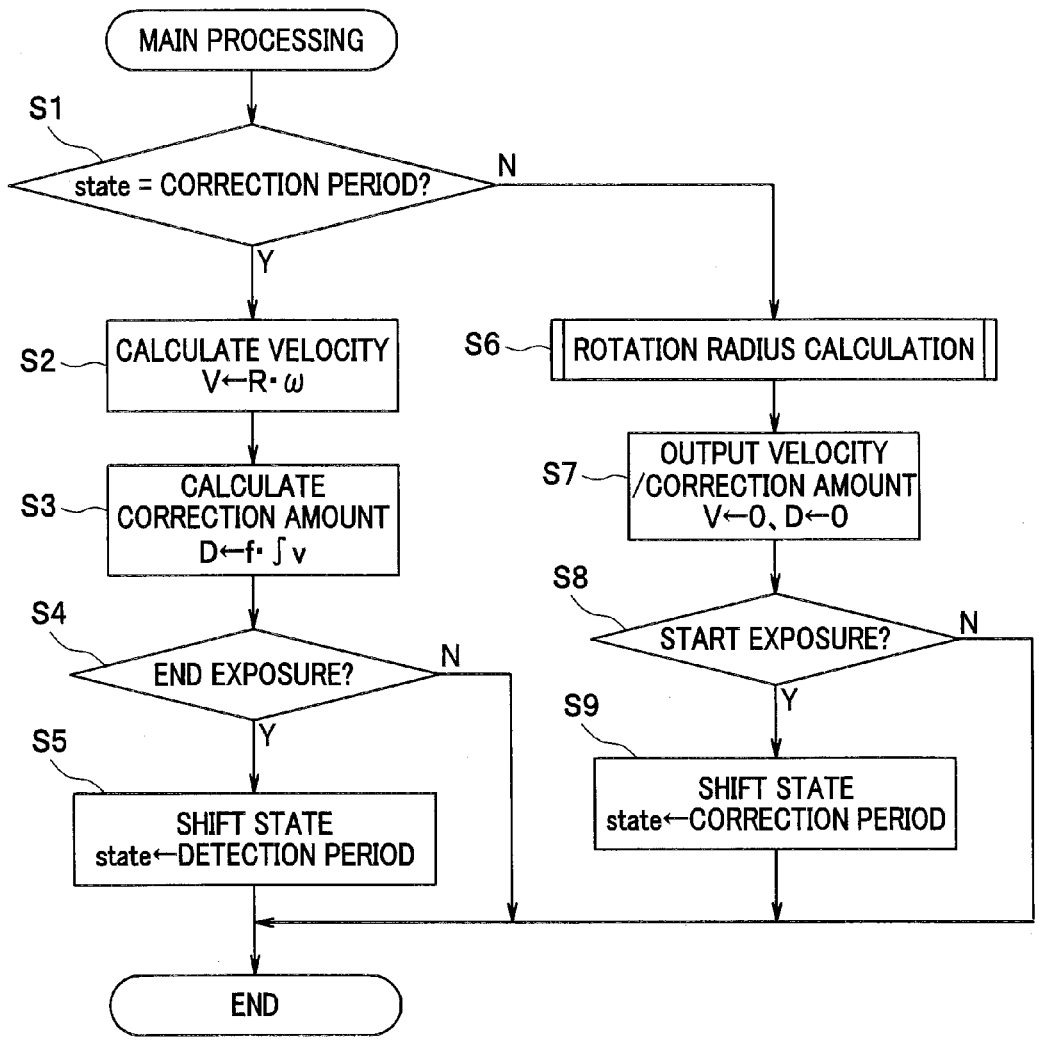
FIG. 9 is a flowchart for explaining main control steps of shaking amount detection in the first embodiment.

A flow of control of shaking amount detection in the translation blur correcting section 704 is explained. First, FIG. 9 is a flowchart for explaining main control steps of the shaking amount detection. Processing shown in FIG. 9 is processing periodically executed at a time interval of, for example, 1 msec.

An operation in the main control is divided into two control periods, i.e., a detection period in which an angular velocity and acceleration are detected and calculation of a rotation radius is performed but blur correction is not performed and a correction period in which blur correction is performed using a rotation radius calculated in the detection period. It is recorded in a state flag state whether the control period is the detection period or the correction period.

When the processing is started, first, the translation blur correcting section 704 refers to the state flag state to thereby determine whether the control period is the correction period (step S1).

When determining that the control period is not the correction period, that is, when the control period is the detection period, the translation blur correcting section 704 performs rotation radius calculation explained below with reference to FIG. 10 (step S6) and sets a translational velocity V to 0, that is, outputs the correction amount D as 0 (step S7).

Thereafter, the translation blur correcting section 704 determines, on the basis of whether an exposure start is notified from the system controller 6 via the SIO 72b and the communication section 705, whether exposure is started (step S8).

When the exposure is started during the detection period, the translation blur correcting section 704 switches the state flag state to the correction period (step S9), and then ends the processing. When the exposure is not started, the translation blur correcting section 704 directly ends the processing.

On the other hand, when determining in step S1 that the control period is the correction period, the translation blur correcting section 704 multiplies together the radius R calculated in the detection period and the angular velocity ω outputted from the angular velocity sensor 8 to thereby calculate the translational velocity V (step S2). Further, the translation blur correcting section 704 integrates the translational velocity with time and multiplies the translational velocity with the image magnification f to thereby calculate a translation movement amount generated on the image pickup plane (step S3).

The translation blur correcting section 704 determines, on the basis of whether an exposure end is notified from the system controller 6 via the SIO 72b and the communication section 705, whether the exposure ends (step S4).

When determining that the exposure ends, the translation blur correcting section 704 switches the state flag state to the detection period (step S5) and then ends this main processing. When the exposure does not end and continues, the translation blur correcting section 704 directly ends this main processing.

Figure 10:
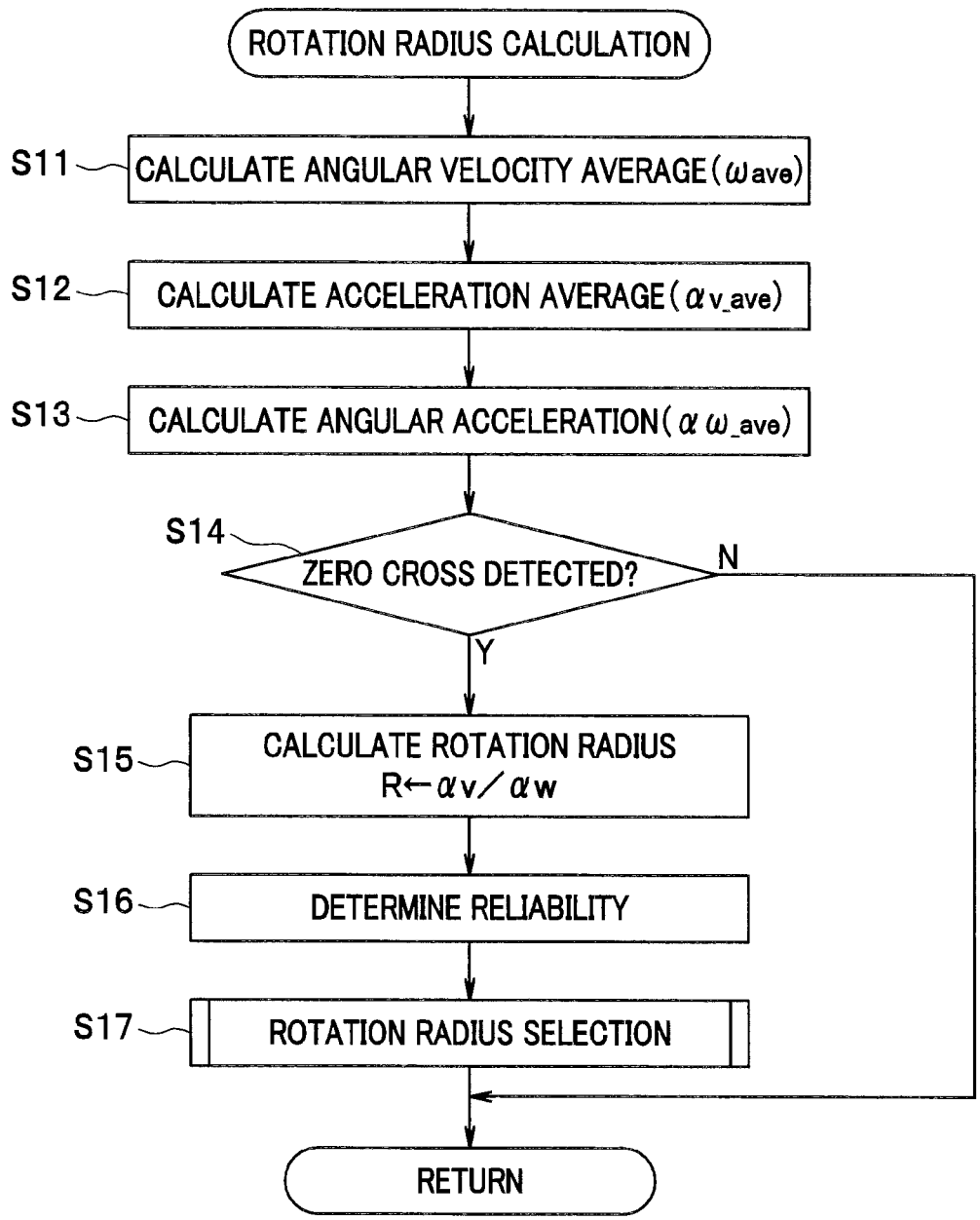
FIG. 10 is a flowchart for explaining details of processing of a rotation radius calculation in step S6 in FIG. 9 in the first embodiment.

FIG. 10 is a flowchart for explaining details of processing of rotation radius calculation in step S6 in FIG. 9. The rotation radius calculation processing is explained with reference to FIG. 5 as appropriate.

Note that the rotation radius calculation processing is applied to the respective rotation axes and, more specifically, applied to each of the yaw radius Ryaw, the pitch radius Rpitch, the XZ roll radius Rrollx, and the YZ roll radius Rrolly.

First, the translation blur correcting section 704 performs, with the averaging sections 761a to 761c, calculation of an angular velocity average ωave (step S11) and calculation of an acceleration average αv_ave (step S12).

Subsequently, the translation blur correcting section 704 differentiates, with the angular acceleration calculating sections 763a and 763b, the angular velocity average ωave calculated in step S11 with time and calculates angular acceleration αω_ave (step S13).

The translation blur correcting section 704 determines, with the timing detecting sections 762a and 762b, whether the other of angular accelerations related to a first component and a second component of the same direction velocity crosses zero (step S14). That is, when processing related to the first component Ryaw×ωyaw of the X-direction velocity is performed, the translation blur correcting section 704 determines whether the roll angular acceleration αω_roll crosses zero. When processing related to the second component Rrollx×ωroll of the X-direction velocity is performed, the translation blur correcting section 704 determines whether the yaw angular acceleration αω_yaw crosses zero. When processing related to the first component Rpitch×ωpitch of the Y-direction velocity is performed, the translation blur correcting section 704 determines whether the roll angular acceleration αω_roll crosses zero. When processing related to the second component Rrolly×ωroll of the Y-direction velocity is performed, the translation blur correcting section 704 determines whether the pitch angular acceleration αω_pitch crosses zero.

When the zero cross is detected in step S14, the translation blur correcting section 704 performs, with the radius calculating sections 764a and 764b, the calculation indicated by Expression 1 to Expression 4 using the acceleration average αv_ave calculated in step S12 and the angular acceleration αω_ave calculated in step S13 to thereby calculate the rotation radius R (step S15).

Note that the rotation radius R is not limitedly calculated on the basis of the acceleration and the angular acceleration and can also be calculated from a relation between a velocity and an angular velocity. However, when the rotation radius R is calculated from the relation between the velocity and the angular velocity, it is necessary to integrate acceleration detected by the acceleration sensor 9 and calculate velocity. However, it is likely that an influence of noise such as drift of the acceleration sensor 9 is emphasized by the integration operation to deteriorate accuracy of a radius to be calculated. Therefore, in the present embodiment, a radius is calculated in a dimension of the acceleration on the basis of the acceleration and the angular acceleration to perform more accurate calculation of a rotation radius.

Subsequently, the radius calculating sections 764a and 764b further perform reliability determination concerning whether the rotation radius calculated in step S15 can be used for velocity calculation (step S16).

A translational velocity component is calculated by multiplication of the rotation radius and the angular velocity. Therefore, when an absolute value of the rotation radius is large, an absolute value of the translational velocity component to be calculated is also large, that is, a correction amount is large. That is, when an error is included in the rotation radius, it is likely that a correction amount due to the error is also large, leading to erroneous correction.

Therefore, the translation blur correcting section 704 compares the rotation radius calculated in step S15 with a predetermined threshold. When the rotation radius is larger than the predetermined threshold, the translation blur correcting section 704 determines that there is not reliability and does not use the rotation radius for velocity calculation (as specific processing, sets the rotation radius outputted from the radius calculating sections 764a and 764b to 0, that is, clears the rotation radius to 0).

When the radius is calculated in step S15, as indicated by Expression 1 to Expression 4, the acceleration is divided by the angular acceleration. However, when the angular acceleration is a value near 0, a calculation result is an extremely large value (in some case, divergence). Therefore, it is possible to prevent erroneous correction due to such 0 division by not using the rotation radius having a large absolute value.

A method of the reliability determination in step S16 is not limited to the method explained above. Other various methods can be adopted.

For example, instead of or in addition to determining the reliability on the basis of a magnitude of the absolute value of the rotation radius, when at least one of a condition that an absolute value of the angular acceleration is smaller than a predetermined angular acceleration threshold and a condition that an absolute value of the acceleration is smaller than a predetermined acceleration threshold holds, that is, an absolute value of at least one of a denominator and a numerator of a right side in any one of Expression 1 to Expression 4 is small, the radius calculating sections 764a and 764b may determine that there is no reliability in the rotation radius calculated by the expression and output a rotation radius 0 without using a calculation result.

Note that examples of the case in which the rotation radius is cleared to 0 further include cases explained below.

In a first case in which the rotation radius is cleared to 0, a stationary state is detected. Since no blur caused by shaking occurs in the stationary state, it is possible to prevent erroneous correction by clearing the rotation radius to 0. Examples of a method of detecting the stationary state include a method in which an output of the angular velocity sensor 8 and an output of the acceleration sensor 9 excluding components considered to be noise or the like are continuously substantially 0 for a predetermined time period or more. Another example of a state in which the stationary state is detected, tripod connection is detected by a tripod detecting section or the like. As a detection method for the tripod connection, publicly-known various methods can be used. Therefore, a specific example of the detection method is not explained.

In a second case in which the rotation radius is cleared to 0, panning operation is detected. In general, the panning operation is not included in a camera shake. Moreover, since the camera 1 is moved in a relatively large angle range, a correction range by the driving section 5 is often exceeded. In addition, when the panning operation is performed, since an influence of the HPFs (in particular, the HPF 701a and the HPF related to acceleration in the X-axis direction) remains, a normal correction amount cannot be calculated for a while immediately after the panning operation is performed. Therefore, it is possible to prevent erroneous correction due to an influence of the HPF 701 after the panning operation by clearing a rotation radius calculated from a yaw rotational motion related to the panning operation, that is, the yaw radius Ryaw calculated by Expression 1 to 0. Note that the detection of the panning operation can be determined by detecting that detection values of the angular velocity sensor 8 and the acceleration sensor 9, i.e., outputs (detection values) from the HPFs (in particular, the HPF 701a and the HPF 701d) do not change exceeding a predetermined time period or signs of the detection values do not change exceeding the predetermined time period.

In a third case in which the rotation radius is cleared to 0, time of execution of image stabilization from an exposure start exceeds a predetermined time period.

In the case of a normal photographing time not in the long-second photographing, since an influence on a photographed image is small, even if erroneous correction occurs, there is almost no influence on the photographed image. On the other hand, in the case of the long-second photographing, even if a correction amount is small, the correction amount is accumulated for a long time (in particular, an amount integrated according to time is accumulated for a long time). Therefore, an influence (of, in particular, image stabilization based on accumulated errors) on a photographed image is large. Therefore, when time from the exposure start exceeds a predetermined time period, the rotation radius is cleared to 0 and the correction is stopped.

Monitoring of the exposure time is performed by the CPU 70. Time from reception of an exposure start command from the system controller 6 is counted by a timer. When a count value exceeds a predetermined time period, the rotation radius outputted from the radius calculating sections 764a and 764b is cleared to 0.

Besides the cases explained above, when it is determined that reliability of a calculated correction amount is low, the rotation radius only has to be cleared to 0 as appropriate.

Thereafter, the translation blur correcting section 704 selects, on the basis of the rotation radius calculated in step S15 and determined in step S16 as having reliability, a radius used for calculation in the correction period (step S17). Processing of the rotation radius selection in step S17 is explained below with reference to FIG. 11.

When the processing in step S17 ends or when the zero cross is not detected in step S14, the processing returns from the rotation radius calculation processing to the main processing shown in FIG. 9.

Figures 11, 12:
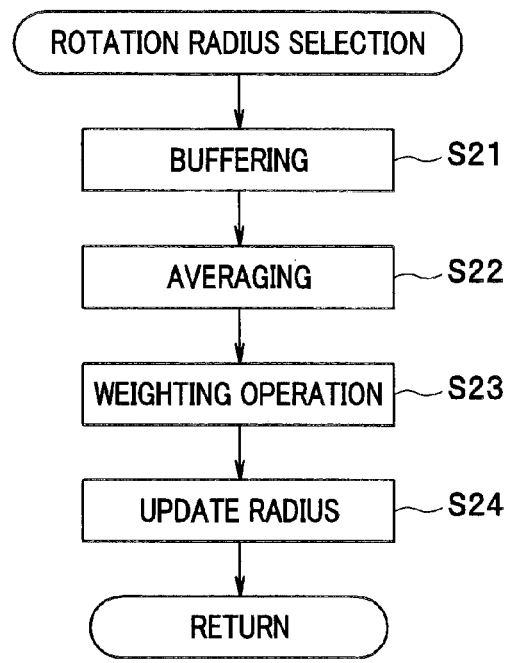
FIG. 11 is a flowchart for explaining details of processing of rotation radius selection in step S17 in FIG. 10 in the first embodiment.
FIG. 12 is a table showing an example of positive and negative rotation radiuses retained in a memory in the radius calculating section in the first embodiment.

FIG. 11 is a flowchart for explaining details of the processing of the rotation radius selection in step S17 of FIG. 10.

When this processing is stared, first, the translation blur correcting section 704 retains, by a predetermined number from a latest calculated value according to positive and negative of the sign of the radius, the rotation radius calculated in step S15 and determined in step S16 as having reliability (step S21). The predetermined number of times of the rotation radiuses to be retained are rotation radiuses for the number of time necessary for subsequent averaging processing. For example, five positive rotation radiuses and five negative rotation radiuses are retained from the latest rotation radiuses back to the rotation radiuses in the past.

FIG. 12 is a table showing an example of positive and negative rotation radiuses retained in memories in the radius calculating sections 764a and 764b. As shown in the figure, in the memory for positive, five positive rotation radiuses R attached with a + sign at upper right parts are retained from the latest rotation radius R back to the rotation radiuses R in the past attached with numbers 0 to 4 in lower right parts. Similarly, in the memory for negative, five negative rotation radiuses R attached with a − sign at upper right parts are retained from the latest rotation radius R back to the rotation radiuses R in the past attached with numbers 0 to 4 in lower right parts. When the latest radius having reliability is calculated in step S15 and step S16, when the radius is a positive radius, stored content of the memory for positive is moved back one step and the latest radius is stored in a column for storing the latest radius. When the radius is a negative radius, the same processing is applied to the memory for negative. Therefore, oldest radiuses retained in the memories in the radius calculating sections 764a and 764b are radiuses nine or more preceding generations tracking back from a present generation.

Subsequently, in order to reduce an influence of erroneous calculation of the radiuses, the translation blur correcting section 704 performs averaging of the radiuses (step S22). However, since there are positive and negative radiuses, if the positive and negative radiuses are mixed and averaged, the positive and negative radiuses cancel each other to be closer to 0. Therefore, the positive radiuses and the negative radiuses are separately averaged.

Specifically, as indicated by Expression 9 below, the five positive rotation radiuses R retained in the memory for positive are averaged to calculate a positive average rotation radius AvR+ and the five negative rotation radiuses R retained in the memory for negative are averaged to calculate a negative average rotation radius AvR−.

$$\begin{cases} AvR_+ = \dfrac{\sum_{i=0}^{4} R_i^+}{5} \\ AvR_- = \dfrac{\sum_{i=0}^{4} R_i^-}{5} \end{cases} \quad \text{[Expression 9]}$$

When radiuses are calculated, if a value of acceleration or angular acceleration is small, an influence of noise components is large. In such a case, fluctuation occurs in the radiuses to be calculated. However, by performing averaging, the influence can be reduced.

The translation blur correcting section 704 performs a weighting operation in order to determine which of the positive average rotation radius AvR+ and the negative average rotation radius AvR– calculated in step S22 (step S23) is used.

Figures 13, 14:
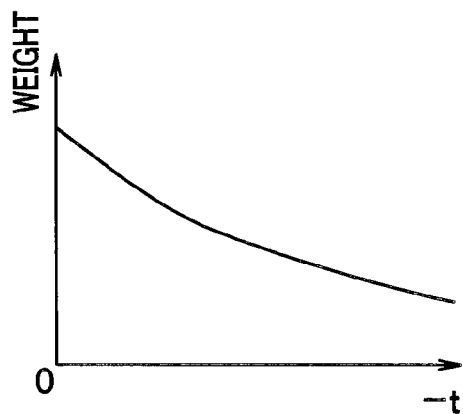
FIG. 13 is a graph showing an example of weights given to radiuses in the first embodiment.
FIG. 14 is a table showing an example of weighting given to the radius.

Specifically, the translation blur correcting section 704 gives, to the radiuses retained in step S21, weights largest for the latest radius and decreasing from the latest radius back to the radiuses in the past. FIG. 13 is a graph showing an example of the weights given to the radiuses. In FIG. 13, an example of weights in which the latest radius has a predetermined weight and the weight monotonously decreasing back to the radiuses in the past and gradually approaching 0 are shown.

The radiuses retained in step S21 are, in the example shown in FIG. 12, ten radiuses in total including the positive and negative radiuses. The weights are given to, for example, the latest five radiuses, that is, the radiuses in the present generation to the four preceding generations.

FIG. 14 is a table showing an example of weighting given to radiuses.

First, weighting for the present generation acquired at time –t1 is set to 5. Similarly, weighting for the immediately preceding generation (at time –t2) is set to 4, weighting for the second preceding generation (at time –t3) is set to 3, weighting for the third preceding generation (at time –t4) is set to 2, and weighting for the fourth preceding generation (at time –t5) is set to 1. Signs of the radiuses obtained in the present generation to the fourth preceding generation are, for example, +, +, –, +, and + in this order. In this case, a + evaluation value for the positive radiuses and a – evaluation value for the negative radiuses are calculated by addition of weights obtained for the respective signs. In the example shown in FIG. 14, + evaluation value=5+4+2+1=12
– evaluation value=3

The radius calculating sections 764a and 764b include beforehand a predetermined threshold for comparing the obtained evaluation values. The threshold is set to a value equal to or larger than a half value of total weights (5+4+3+2+1=15). Therefore, both of an added-up weight for the positive radiuses and an added-up weight for the negative radiuses cannot take the value equal to or larger than the threshold. Any one of the added-up weights can take the value if possible (however, in some case, both of the added-up weights do not take the value). It is assumed that the threshold is set to 10. In the example shown in FIG. 14, a comparison result of the evaluation values and the threshold is as described below, + evaluation value=12≥10
– evaluation value=3<10

Therefore, the radius calculating sections 764a and 764b perform radius update and output an average rotation radius of the sign, the evaluation value of which is equal to or larger than the threshold, that is, the positive average rotation radius AvR+ to the velocity calculating sections 765a and 765b (step S24).

When the – evaluation value is equal to or larger than the threshold, the radius calculating sections 764a and 764b output the negative average rotation radius AvR– to the velocity calculating sections 765a and 765b.

Further, when the signs of the radiuses obtained in the present generation to the fourth preceding generation are, for example, in order of +, –, –, +, and +, + evaluation value=5+2+1=8<10
– evaluation value=3+4=7<10

Both the evaluation values are not equal to or larger than the threshold. In this case, as the processing for the radius update, the radius calculating sections 764a and 764b output the radius 0 to the velocity calculating sections 765a and 765b (that is, clears the radiuses to 0). This is because, unless the evaluation values are equal to or larger than the predetermined threshold, since it is not considered sufficiently clear whether the signs of the rotation radiuses are + or –, a correction value is not calculated to prevent erroneous correction using rotation radiuses having wrong signs.

When the processing in step S24 ends in this way, the translation blur correcting section 704 returns from the rotation radius selection processing shown in FIG. 11 to the rotation radius calculation processing shown in FIG. 10.

Note that, in the processing shown in FIG. 11, when the signs of the radiuses are selected, the weighting is used to determine the signs of the radiuses. However, the determination of the signs of the radiuses is not limited to this. For example, of the average of the positive radiuses and the average of the negative radiuses calculated for the respective signs, the average of the sign same as the sign of the latest radius determined as having reliability in step S16 may be outputted to the velocity calculating sections 765a and 765b.

Alternatively, as explained with reference to FIG. 7, FIG. 8A, and FIG. 8B, in the general photographing, the rotation center is considered to be often present on the side of the photographer who retains the camera by the right hand. Therefore, assuming such a photographing situation, it is also conceivable to fix the signs of the radiuses to one sign.

According to the first embodiment, the moving velocity in the lateral direction detected from the angular velocity in the yaw direction and the moving velocity in the lateral direction detected from the angular velocity in the roll direction are combined by the velocity combining section to calculate the lateral moving velocity. The moving velocity in the longitudinal direction detected from the angular velocity in the pitch direction and the moving velocity in the longitudinal direction detected from the angular velocity in the roll direction are combined by the velocity combining section to calculate the longitudinal moving velocity. Therefore, it is possible to more accurately detect the moving velocity than the moving velocity calculated on the basis of only the angular velocity in the yaw direction and the angular velocity in the pitch direction.

The radius at which the rotational motion in the roll direction affects the lateral direction is calculated at the timing (time) when the rotational motion (the angular acceleration) in the yaw direction is 0. The radius at which the rotational motion in the roll direction affects the longitudinal direction is calculated at the timing (time) when the rotational motion (the angular acceleration) in the pitch direction is 0. The radius at which the rotational motions in the yaw direction and the pitch direction respectively affect the lateral direction and the longitudinal direction, respectively, is calculated at the timing (time) when the rotational motion (the angular acceleration) in the roll direction is 0. Therefore, it is unnecessary to solve a complicated relational operation for the respective rotation axes. It is possible to relatively easily calculate the radiuses without increasing an operation load.

Further, the angular velocities and the accelerations detected by the angular velocity sensor and the acceleration sensor are averaged by the sampling data for the predetermined number of times. Therefore, it is possible to suppress an influence of a high-frequency component emphasized in the differential processing in the later stage. Data of a plurality of samples can be treated as data of one sample by the averaging. Therefore, a data amount of a processing target is compressed and an operation load can be reduced.

The angular velocity is differentiated to calculate the angular acceleration. The radius is calculated on the basis of the calculated angular acceleration and the detected acceleration. Therefore, errors can be further reduced than when acceleration is integrated to calculate a velocity and a radius is calculated on the basis of the velocity and an angular velocity. This is because, since errors are likely to be accumulated if the integration operation is performed, it is possible to avoid erroneous calculation due to the accumulated errors.

In addition, when at least one of the acceleration and the angular acceleration related to the radius calculation is smaller than the predetermined threshold, calculation of a radius is not performed and 0 is outputted. Therefore, it is possible to prevent an influence of noise considered to occur when any one of the acceleration and the angular acceleration is small. It is possible to avoid erroneous calculation of a radius.

By averaging the radiuses calculated and determined as having reliability from the latest radiuses by the predetermined number of times, it is possible to reduce fluctuation in the calculated radiuses. In this case, the calculated radiuses are separately averaged for the positive radiuses and the negative radiuses. Therefore, it is possible to perform the averaging of the radiuses corresponding to the position of the rotation center.

Further, when it is determined on the basis of the sign of the latest calculated radius whether the positive average radius is used or the negative average radius is used of the calculated average radiuses, it is possible to quickly cope with a change in the rotation center position. There is an advantage that a real-time property is high.

On the other hand, the signs of the predetermined generations are analyzed from the calculated latest radius to the radiuses in the past. The weights are added to each of the signs of the radiuses in order from the latest radius. When any one of the total of the weights having the positive sign (the + evaluation value) and the total of the weights having the negative sign (the − evaluation value) is equal to or larger than the predetermined threshold, the average radius having the sign equal to or larger than the threshold is used. Therefore, it is possible to estimate correctness of the signs from a radius calculation history in the past. When both the evaluation values are smaller than the predetermined threshold, 0 is outputted as the radius. Therefore, a correction amount is not calculated when correctness of the signs of the radiuses cannot be estimated. It is possible to prevent erroneous correction.

In this way, the translation movement amount generated in the camera 1, which is the image pickup apparatus, is calculated taking into account the influence due to the rotational motion of the roll in addition to the influence due to the rotational motions of the yaw and the pitch. Therefore, it is possible to more accurately calculate a correction amount than in the past with a simple configuration. By driving the image pickup device to cancel an image blur amount by a detected movement amount, it is possible to photograph, with the camera 1, an image from which a translation blur is removed.

That is, the shaking amount detecting apparatus, the image pickup apparatus, and the shaking amount detecting method are obtained, in which a translation blur amount can be more accurately detected with relatively simple processing.

[Second Embodiment]

Figure 15:
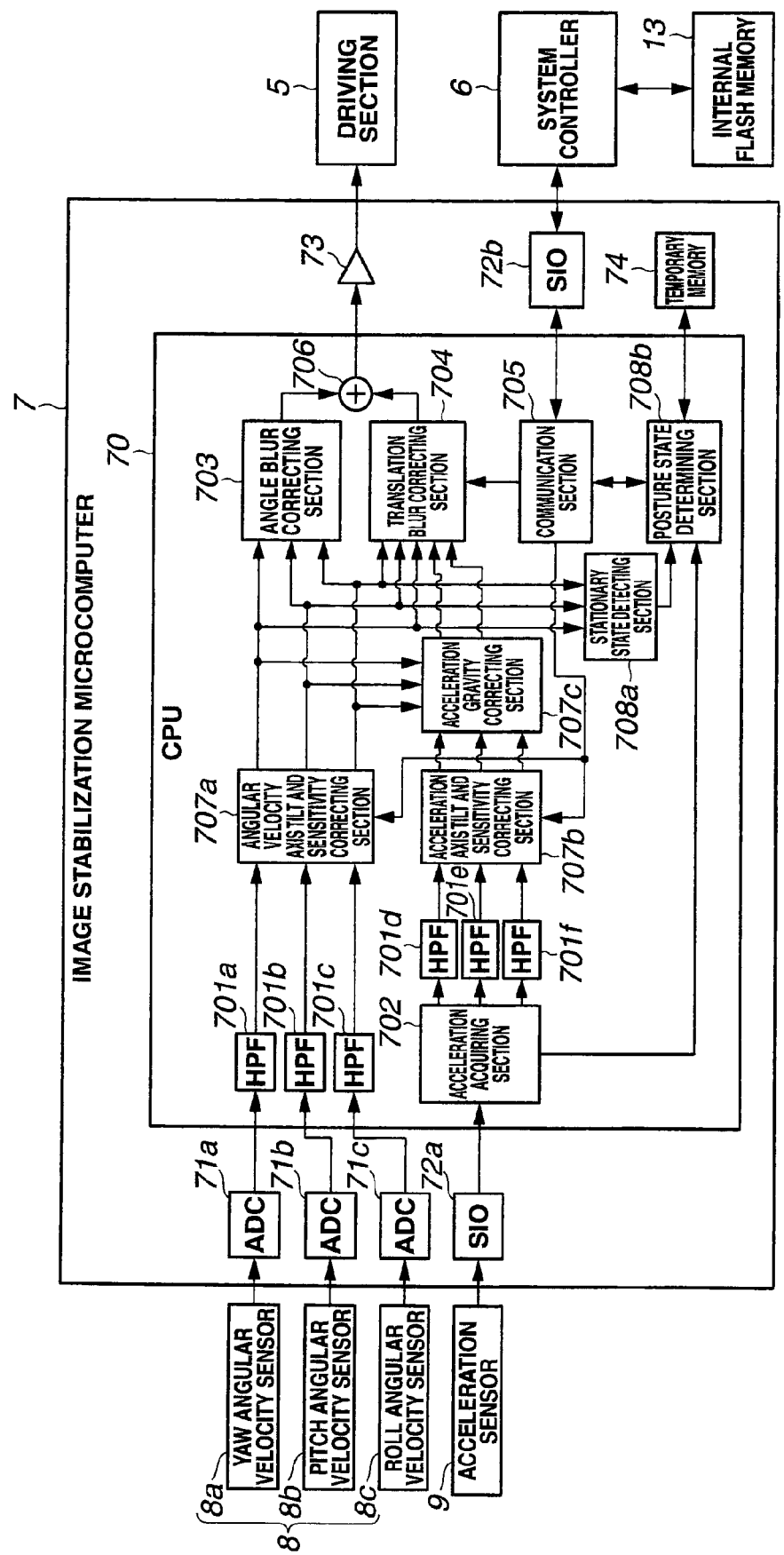
FIG. 15 is a block diagram showing a configuration of an image stabilization microcomputer in a second embodiment of the present invention.

FIG. 15 to FIG. 18 show a second embodiment of the present invention. FIG. 15 is a block diagram showing a configuration of an image stabilization microcomputer. In the second embodiment, components same as the components in the first embodiment are, for example, denoted by the same reference numerals and signs and explanation of the components is omitted as appropriate. Only differences are mainly explained.

In the image stabilization microcomputer 7 in the present embodiment, an HPF 701f, an angular velocity axis tilt and sensitivity correcting section 707a, an acceleration axis tilt and sensitivity correcting section 707b, an acceleration gravity correcting section 707c, a stationary state detecting section 708a, a posture state determining section 708b, and a temporary memory 74 are added to the configuration of the image stabilization microcomputer 7 in the first embodiment shown in FIG. 5.

The acceleration acquiring section 702 further outputs Z acceleration in acceleration information read out from the acceleration sensor and divided into the respective directions of the X axis, the Y axis, and the Z axis to the HPF 701f.

The HPF 701f is included in the CPU 70. The HPF 701f removes a low-frequency component from the Z acceleration inputted from the acceleration acquiring section 702 and outputs a processing result to the acceleration axis tilt and sensitivity correcting section 707b.

The angular velocity axis tilt and sensitivity correcting section 707a is an axis correcting section and included in the CPU 70. The angular velocity axis tilt and sensitivity correcting section 707a receives inputs from the HPFs 701a to 701c and the communication section 705 and outputs a processing result to the angle blur correcting section 703, the translation blur correcting section 704, the acceleration gravity correcting section 707c, and the stationary state detecting section 708a.

The acceleration axis tilt and sensitivity correcting section 707b is an axis correcting section and included in the CPU 70. The acceleration axis tilt and sensitivity correcting section 707b receives inputs from the HPFs 701d to 701f and the communication section 705 and outputs a processing result to the acceleration gravity correcting section 707c.

The acceleration gravity correcting section 707c is included in the CPU 70. The acceleration gravity correcting section 707c receives inputs from the angular velocity axis tilt and sensitivity correcting section 707a and the acceleration axis tilt and sensitivity correcting section 707b and outputs a processing result to the translation blur correcting section 704.

The stationary state detecting section 708a receives an input from the angular velocity axis tilt and sensitivity correcting section 707a and outputs a processing result to the posture state determining section 708b.

The posture state determining section 708b is an acceleration sensitivity correction information calculating section. The posture state determining section 708b receives inputs from the acceleration acquiring section 702, the stationary state detecting section 708a, the temporary memory 74, and the communication section 705 and outputs a processing result to the temporary memory 74 or the communication section 705.

The temporary memory 74 is connected to the posture state determining section 708b and a volatile storing section that temporarily stores information.

Processing of axis correction in the image stabilization microcomputer 7 is explained.

The angular velocity sensor 8 and the acceleration sensor 9 do not always completely match the XYZ axes shown in FIG. 1 because of convenience in design of a component layout and the like or because of individual differences such as errors during attachment. Sensor sensitivities are not always completely the same in the respective XYZ axes. Therefore, in the internal flash memory 13, which is the storing section, correction information R for correcting tilts and sensitivities of axes of the respective sensors is stored. The correction information is, for example, a 3×3 matrix coefficient indicated by Expression 10 below.

$$\begin{pmatrix} R_{xx} & R_{xy} & R_{xz} \\ R_{yx} & R_{yy} & R_{yz} \\ R_{zx} & R_{zy} & R_{zz} \end{pmatrix} \quad [\text{Expression 10}]$$

The correction information R includes information concerning tilts of the axes of the respective sensors with respect to a predetermined standard direction (detecting section tilt information) and information concerning sensitivities of the respective sensors (sensitivity correction information). The correction information R is stored in the internal flash memory 13 as correction information for each of the angular velocity sensor 8 and the acceleration sensor 9.

The correction information R stored in the internal flash memory 13 is transmitted from the system controller 6 to the image stabilization microcomputer during camera startup via the SIO 72b.

The angular velocity axis tilt and sensitivity correcting section 707a corrects, on the basis of the correction information R for the angular velocity sensor 8 received via the communication section 705, tilts of the axes and sensitivity with respect to information S concerning an angular velocity inputted from the angular velocity sensor 8 and obtains information O concerning an angular velocity after the correction. Similarly, the acceleration axis tilt and sensitivity correcting section 707b corrects, on the basis of the correction information R for the acceleration sensor 9 received via the communication section 705, tilts of the axes and sensitivity with respect to the information S concerning acceleration inputted from the acceleration sensor 9 and obtains information O concerning acceleration after the correction.

An operation for obtaining the information O after the correction from the information S before the correction using the correction information R is performed, for example, as indicated by Expression 11 below.

$$\begin{pmatrix} O_x \\ O_y \\ O_z \end{pmatrix} = \begin{pmatrix} R_{xx} & R_{xy} & R_{xz} \\ R_{yx} & R_{yy} & R_{yz} \\ R_{zx} & R_{zy} & R_{zz} \end{pmatrix} \begin{pmatrix} S_x \\ S_y \\ S_z \end{pmatrix} \quad [\text{Expression 11}]$$

Figure 16:
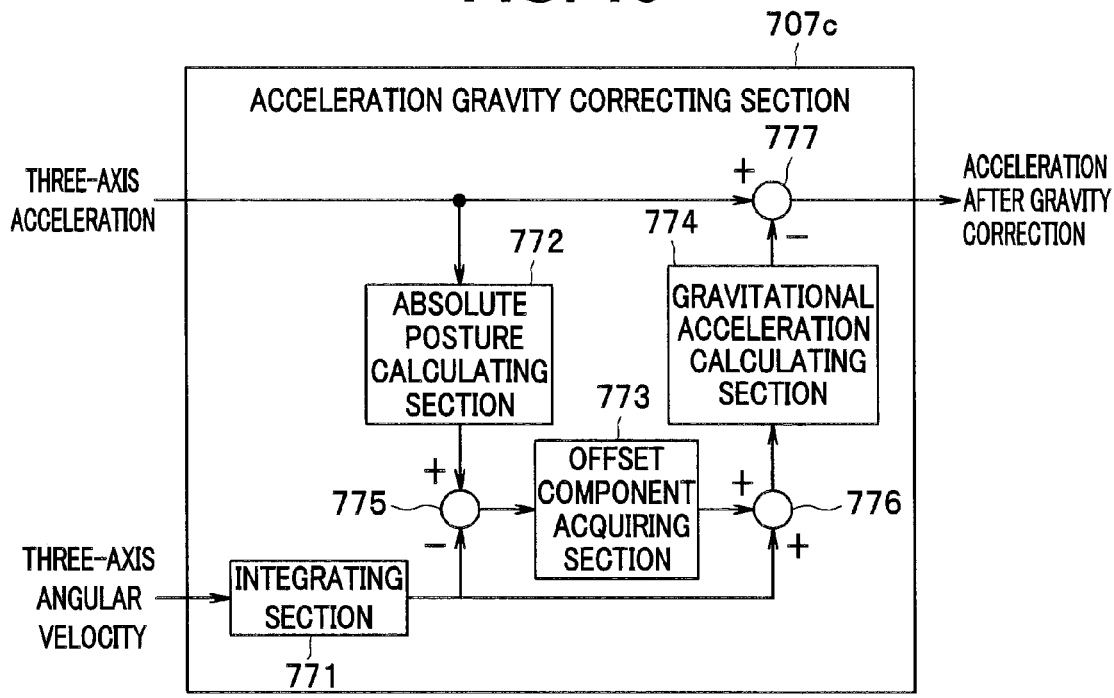
FIG. 16 is a block diagram showing a configuration of an acceleration gravity correcting section in the second embodiment.
Figure 17:
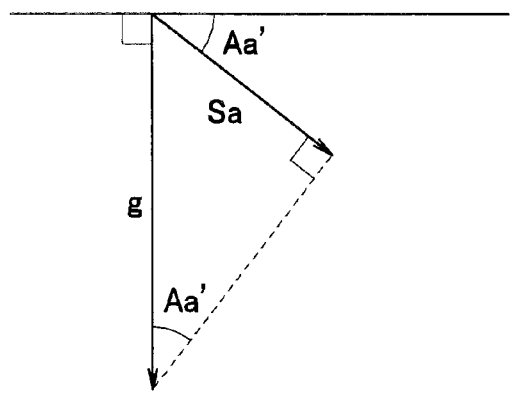
FIG. 17 is a diagram showing a component relation between acceleration and gravity in the second embodiment.

Processing of gravity correction in the image stabilization microcomputer 7 is explained with reference to FIG. 16 and FIG. 17. FIG. 16 is a block diagram showing a configuration of the acceleration gravity correcting section 707c. FIG. 17 is a diagram showing a component relation between acceleration and gravity.

As shown in FIG. 16, the acceleration gravity correcting section 707c includes an integrating section 771, an absolute posture calculating section 772, an offset component acquiring section 773, a gravitational acceleration calculating section 774, a first adding section 775, a second adding section 776, and a third adding section 777.

Three-axis acceleration from the acceleration axis tilt and sensitivity correcting section 707b is inputted to the absolute posture calculating section 772 and the third adding section 777.

A three-axis angular velocity from the angular velocity axis tilt and sensitivity correcting section 707a is inputted to the integrating section 771.

The first adding section 775 receives an input of an output of the absolute posture calculating section 772, receives an inverse input of an output of the integrating section 771, and adds up the outputs.

The offset component acquiring section 773 acquires an offset component from an output of the first adding section 775.

The second adding section 776 receives inputs of an output of the offset component acquiring section 773 and an output of the integrating section 771 and adds up the outputs.

The gravitational acceleration calculating section 774 calculates gravitational acceleration from an output of the second adding section 776.

The third adding section 777 receives an input of a three-axis acceleration from the acceleration axis tilt and sensitivity correcting section 707b, receives an inverted input of an output of the gravitational acceleration calculating section 774, adds up the three-axis acceleration and the output, and outputs a result of the addition as acceleration after gravity correction.

Such processing of the acceleration gravity correcting section 707c is explained more in detail.

The acceleration gravity correcting section 707c is configured to correct a gravity component included in detected acceleration using angular velocity information.

First, the integrating section 771 accumulates a detected angular velocity Sg, that is, integrates the angular velocity Sg with respect to a time period using the angular velocity information to thereby calculate relative posture information Ar of the camera 1 from an integration start point as indicated by Expression 12.

$$Ar = \int Sg \, dt \quad [\text{Expression 12}]$$

The absolute posture calculating section 772 calculates, on the basis of acceleration information Sa, absolute posture information Aa' of the camera 1 as indicated by Expression 13 below. A component of acceleration due to a translation blur is included in the acceleration information Sa of a calculation source. Therefore, an influence of the translation blur is also included in the absolute posture information Aa' to be calculated.

$$Aa' = \sin^{-1}(Sa) \quad [\text{Expression 13}]$$

Expression 13 is obtained on the basis of a component relation between the acceleration information Sa and gravity g shown in FIG. 17. Note that, in Expression 13, a unit for setting the gravity g to 1 is used.

The first adding section 775 subtracts the relative posture information Ar calculated by the integrating section 771 from the absolute posture information Aa' calculated by the absolute posture calculating section 772 and outputs a subtraction result (Aa'−Ar).

The offset component acquiring section 773 takes, for example, a moving average of the output of the first adding section 775 as indicated by Expression 14 below to thereby calculate an initial value of the absolute posture information Aa' calculated by the absolute posture calculating section 772, that is, a posture offset Ao.

$$Ao = \langle Aa' - Ar \rangle \quad \text{[Expression 14]}$$

A sign < > indicates that a moving average is taken.

The second adding section 776 adds the posture offset Ao calculated by the offset component acquiring section 773 to the relative posture information Ar calculated by the integrating section 771 to thereby acquire absolute posture information Aa not including an influence of the translation blur as indicated by Expression 15.

$$Aa = Ar + Ao \quad \text{[Expression 15]}$$

The gravitational acceleration calculating section 774 calculates, on the basis of the absolute posture information Aa calculated by the second adding section 776, acceleration correction information gc (information concerning a gravity component included in the acceleration information Sa) as indicated by Expression 16 below.

$$gc = \sin(Aa) \quad \text{[Expression 16]}$$

The third adding section 777 subtracts the acceleration correction information gc from the acceleration information Sa to thereby acquire accurate translational acceleration not including a gravitational acceleration component and outputs the translational acceleration to the translation blur correcting section 704.

The acceleration gravity correcting section 707c performs such an operation for each of X acceleration and Y acceleration used in the translation blur correcting section 704.

Figure 18:
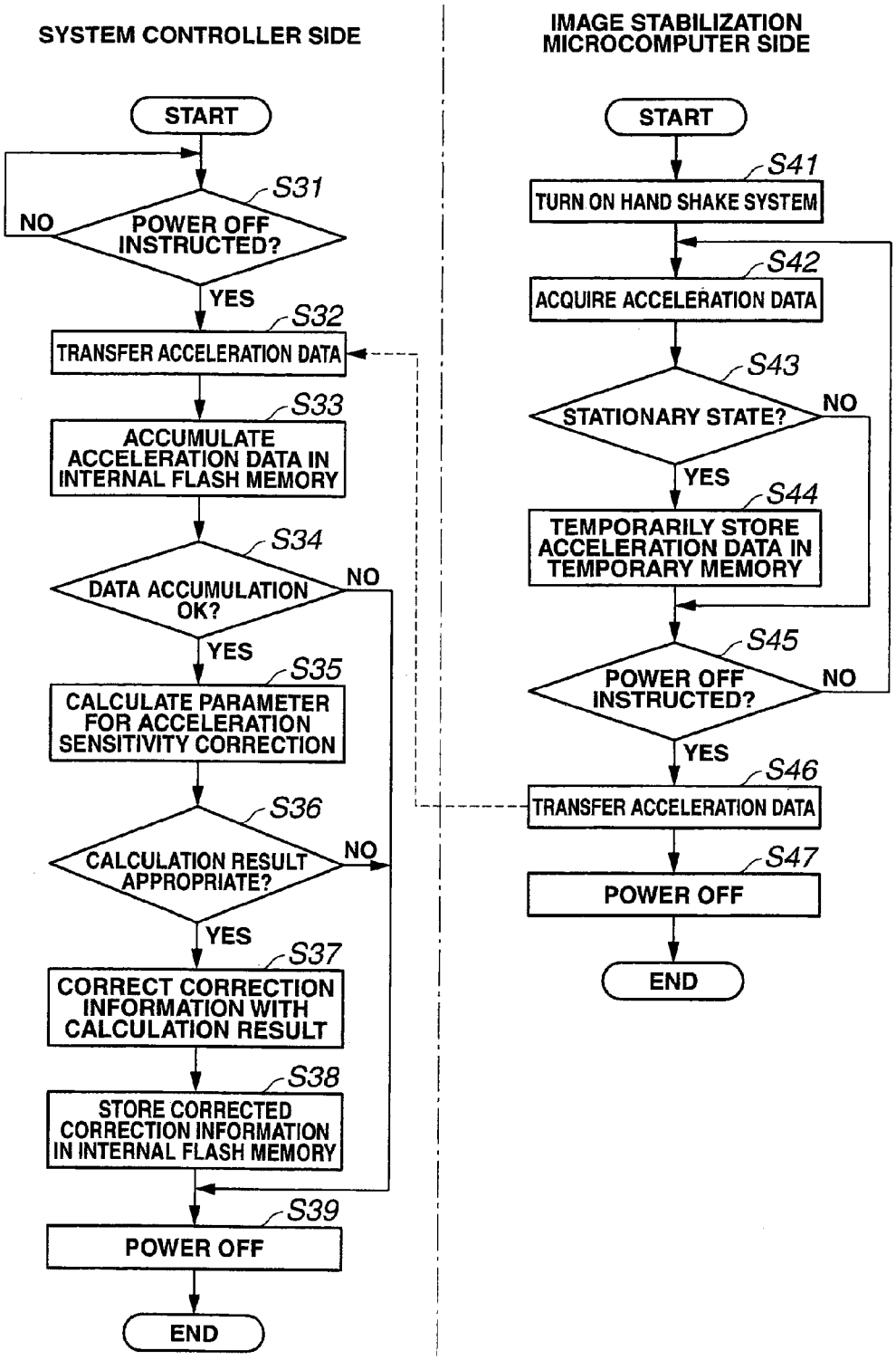
FIG. 18 is a flowchart for explaining aged deterioration correction processing in a camera in the second embodiment.

FIG. 18 is a flowchart for explaining aged deterioration correction processing in the camera 1.

It is known that sensitivity of the acceleration sensor 9 is deteriorated with time. When the camera 1 is used for a long period, a correction value of the translation blur correcting section 704 that uses an output of the acceleration sensor 9 is considered to be inaccurate. Therefore, it is desirable to correct, in every appropriate period, the information R for correcting the sensitivity of the acceleration sensor 9 (see Expression 10).

Therefore, in the present embodiment, the correction information R is corrected making use of a fact that acceleration applied to the acceleration sensor 9 when the camera 1 stands still is only gravity. When it is assumed that three-axis acceleration (Sx, Sy, Sz) (see Expression 11) outputted from the acceleration sensor 9 applied with the same acceleration changes to (kx×Sx, ky×Sy, kz×Sz) because of aged deterioration, unknown parameters to be calculated are three parameters (kx, ky, kz). Therefore, it is possible to accurately estimate the sensitivity of the acceleration sensor 9 if outputs of the acceleration sensor 9 at the time when the camera 1 takes independent three or more stationary postures are used.

When a power supply of the camera 1 is turned on, this aged deterioration correction processing is started.

The image stabilization microcomputer 7 turns on an image stabilization system, receives outputs of the angular velocity sensor 8 and the acceleration sensor 9, calculates a hand shake amount, and sets a state in which image stabilization by the driving section 5 is executed (step S41).

In this state, the posture state determining section 708b acquires acceleration information from the acceleration sensor 9 via the acceleration acquiring section 702 (step S42).

On the other hand, the stationary state detecting section 708a determines, using information concerning a three-axis angular velocity outputted from the angular velocity axis tilt and sensitivity correcting section 707a, whether the camera 1 is in a stationary state and transmits a result of the determination to the posture state determining section 708b. Therefore, the posture state determining section 708b determines, on the basis of an output from the stationary state detecting section 708a, whether the camera 1 is in the stationary state (step S43).

When the posture state determining section 708b determines that the camera 1 is in the stationary state, the posture state determining section 708b further determines a posture of the camera 1 on the basis of the acceleration information acquired in step S42 and stores the acceleration information in a recording space in the temporary memory 74 corresponding to the determined posture (step S44). The temporary memory 74 is configured to record acceleration information (an output value of the acceleration sensor 9) in a different recording space for each of postures.

When the processing of step S44 ends or it is determined in step S43 that the camera 1 is not in the stationary state, the image stabilization microcomputer 7 determines whether a power-off command for turning off the power supply of the camera 1 is inputted from a power switch (step S45).

When it is determined that the power-off command is not inputted, the processing returns to step S42. The processing explained above is repeatedly performed.

When it is determined in step S45 that the power-off command is inputted, since content of the temporary memory 74 cannot be retained if the camera 1 is turned off, the posture state determining section 708b transmits the acceleration information corresponding to the posture stored in the temporary memory 74 to the system controller 6 side via the communication section 705 and the SIO 72b (step S46).

Thereafter, the image stabilization microcomputer 7 is powered off (step S47) and ends the processing.

On the other hand, when the power supply is turned on, the system controller 6 periodically determines whether a power-off command is inputted from the power switch (step S31).

When determining that the power-off command is inputted, the system controller 6 receives the acceleration information transferred from the image stabilization microcomputer 7 (step S32).

Further, the system controller 6 stores the received acceleration information corresponding to the posture in a recording space corresponding to the posture in the internal flash memory 13 (step S33).

Thereafter, the system controller 6 determines whether the acceleration information stored in the internal flash memory 13 reaches an amount sufficient for performing sensitivity correction of the acceleration sensor 9 (step S34). The determination is performed on the basis of whether the acceleration information is acquired in the independent three or more stationary states explained above. However, in order to further improve statistical accuracy, it is desirable to perform the determination on the basis of whether acceleration information is stored in the internal flash memory 13 by a predetermined number equal to or larger than three in the independent three or more stationary states.

When determining that the acceleration information stored in the internal flash memory 13 reaches the sufficient amount, the system controller 6 calculates the parameters for correction (kx, ky, kz) using, for example, a method of least squares (step S35).

The system controller 6 determines whether the calculated parameters for correction (kx, ky, kz) are appropriate (step S36). The determination is performed on the basis of, for example, whether values of the respective parameters for correction are within a predetermined range. Specifically, if the respective parameters for correction satisfy all of Expression 17 to Expression 19 below, the system controller 6 determines that the parameters for correction are appropriate. If the respective parameters for correction do not satisfy all of Expression 17 to Expression 19, the system controller 6 determines that the parameters for correction are inappropriate.

$$\text{Thmin} \leq kx \leq \text{Thmax} \quad \text{[Expression 17]}$$

$$\text{Thmin} \leq ky \leq \text{Thmax} \quad \text{[Expression 18]}$$

$$\text{Thmin} \leq kz \leq \text{Thmax} \quad \text{[Expression 19]}$$

Thmin indicates a lower limit value of an appropriate range and Thmax indicates an upper limit value of the appropriate range. When correction is not performed, $kx=ky=kz=1$. Therefore, an example of a value of Thmin is 0.9 (more desirably 0.95) an example of a value of Thmax is 1.1 (more desirably 1.05) or the like. However, it is desirable to determine the lower limit value Thmin and the upper limit value Thmax to be appropriate values for each of products of the acceleration sensor 9 mounted on the camera 1.

When determining in step S36 that the parameters for correction are appropriate, the system controller 6 corrects, using the calculated parameters (kx, ky, kz), the correction information R used by the acceleration axis tilt and sensitivity correcting section 707b (step S37). Specifically, the system controller 6 performs processing for dividing the respective coefficients shown in Expression 10 Rxx, Ryx, and Rzx, Rxy, Ryy, and Rzy, and Rxz, Ryz, and Rzz respectively by kx, ky, and kz.

The system controller 6 overwrites the correction information R before the correction of the internal flash memory 13 with the correction information R after the correction and stores the correction information R after the correction (step S38).

When the processing in step S38 ends, it is determined in step S34 that the acceleration information does not reach the sufficient amount, or it is determined in step S36 that the parameters for correction are inappropriate, the system controller 6 powers off the entire camera 1 (step S39) and ends the processing.

According to such processing, when the power supply of the camera 1 is turned on next time, the acceleration axis tilt and sensitivity correcting section 707b corrects tilts of axes of acceleration and sensitivity using the correction information R after the correction.

Note that, in the above explanation, the sensitivity correction of the acceleration sensor 9 is performed when the power supply of the camera 1 is turned off. However, the sensitivity correction is not limited to this. For example, the sensitivity correction may be performed when the power supply of the camera 1 is turned on or may be performed at other timings.

In the above explanation, the acceleration information is stored in the temporary memory 74, transmitted to the system controller 6 side when the power supply of the camera 1 is turned off, and stored in the internal flash memory 13. However, the acceleration information may be stored in the internal flash memory 13 from the beginning.

According to the second embodiment, effects substantially the same as the effects of the first embodiment are attained. Since the axis correction of the angular velocity sensor 8 and the acceleration sensor 9 is performed, it is possible to perform more accurate image stabilization.

Since an influence of the gravity on the acceleration sensor 9 is removed, it is possible to perform accurate image stabilization without being affected by a photographing posture. In this case, the relative posture information calculated on the basis of the angular velocity information is corrected on the basis of the offset information to calculate the absolute posture. Therefore, it is possible to perform detection with a high real-time property.

Further, since the sensitivity correction according to the aged deterioration of the acceleration sensor 9 is performed, even if the sensitivity of the acceleration sensor 9 changes as the acceleration sensor 9 is used for a longer time, it is possible to maintain accurate image stabilization performance.

In the first and second embodiments, the yaw radius and the pitch radius are calculated at the timing when the roll angular acceleration (or the roll angular velocity) crosses zero. The XZ roll radius is calculated at the timing when the yaw angular velocity (or the yaw angular velocity) crosses zero. The YZ roll radius is calculated at the timing when the pitch angular acceleration (or the pitch angular velocity) crosses zero. On the other hand, third to seventh embodiments explained below are embodiments generalized such that the respective radiuses can be calculated at any timing.

[Third Embodiment]

FIG. 19 to FIG. 25 show a third embodiment of the present invention. In the third embodiment, components same as the components in the first and second embodiments are, for example, denoted by the same reference numerals and signs and explanation of the components is omitted as appropriate. Only differences are mainly explained.

First, configurations of an image pickup apparatus and an image stabilization microcomputer in the present embodiment are the same as the configurations shown in FIG. 3 and FIG. 4 in the first embodiment.

Figure 19:
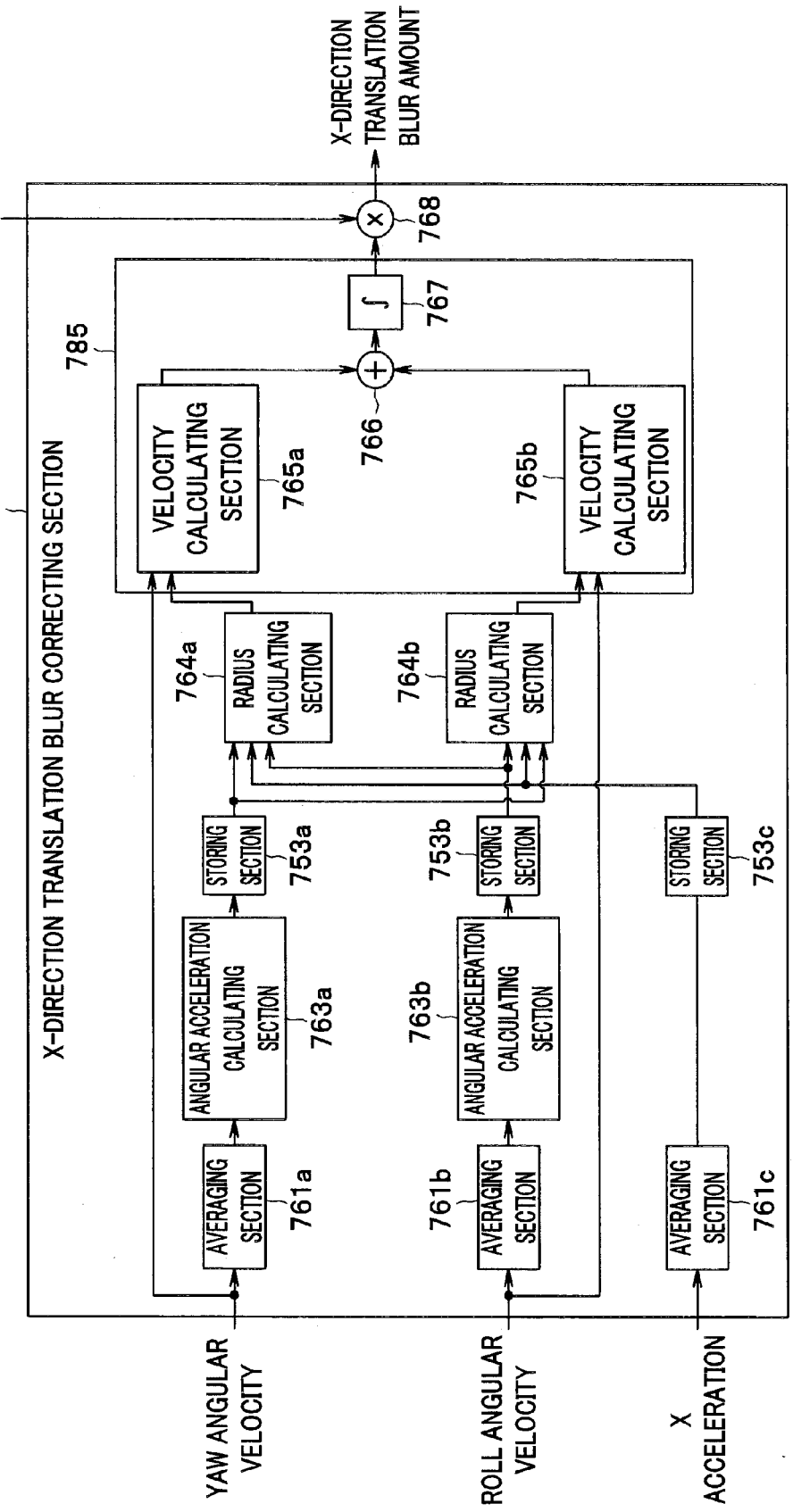
FIG. 19 is a block diagram showing a configuration of an X-direction translation blur correcting section in a third embodiment of the present invention.

FIG. 19 is a block diagram showing a configuration of the X-direction translation blur correcting section 704x.

The Y-direction translation blur correcting section 704y has a configuration same as the configuration of the X-direction translation blur correcting section 704x. The Y-direction translation blur correcting section 704y is only different from the X-direction translation blur correcting section 704 in that inputs are the pitch angular velocity and the Y acceleration instead of the yaw angular velocity and the X acceleration. Therefore, only the X-direction translation blur correcting section 704x is explained with reference to FIG. 19.

The X-direction translation blur correcting section 704x includes the averaging sections 761a to 761c, the angular acceleration calculating sections 763a and 763b, storing sections 753a, 753b, and 753c, the radius calculating sections 764a and 764b, the movement amount calculating section 785, and the multiplying section 768.

The averaging sections 761a to 761c average angular velocities and accelerations inputted in time series. The averaging is performed by, for example, calculating an average of data for four samplings and outputting the average as one sampling value. The averaging has an effect of suppressing a high-frequency component from being emphasized by a differential operation in the angular acceleration calculating sections 763a and 763b at a later stage and has an effect of reducing computational complexity because a data amount is reduced to ¼.

The angular acceleration calculating sections 763a and 763b differentiate the averaged angular velocity and calculate angular acceleration.

The storing sections 753a and 753b store the angular acceleration calculated by the angular acceleration calculating sections 763a and 763b up to angular accelerations of past data necessary for radius calculation in the radius calculating sections 764a and 764b.

Similarly, the storing section 753c stores the acceleration averaged by the averaging section 761c up to accelerations of past data necessary for the radius calculation in the radius calculating sections 764a and 764b.

Figure 20:
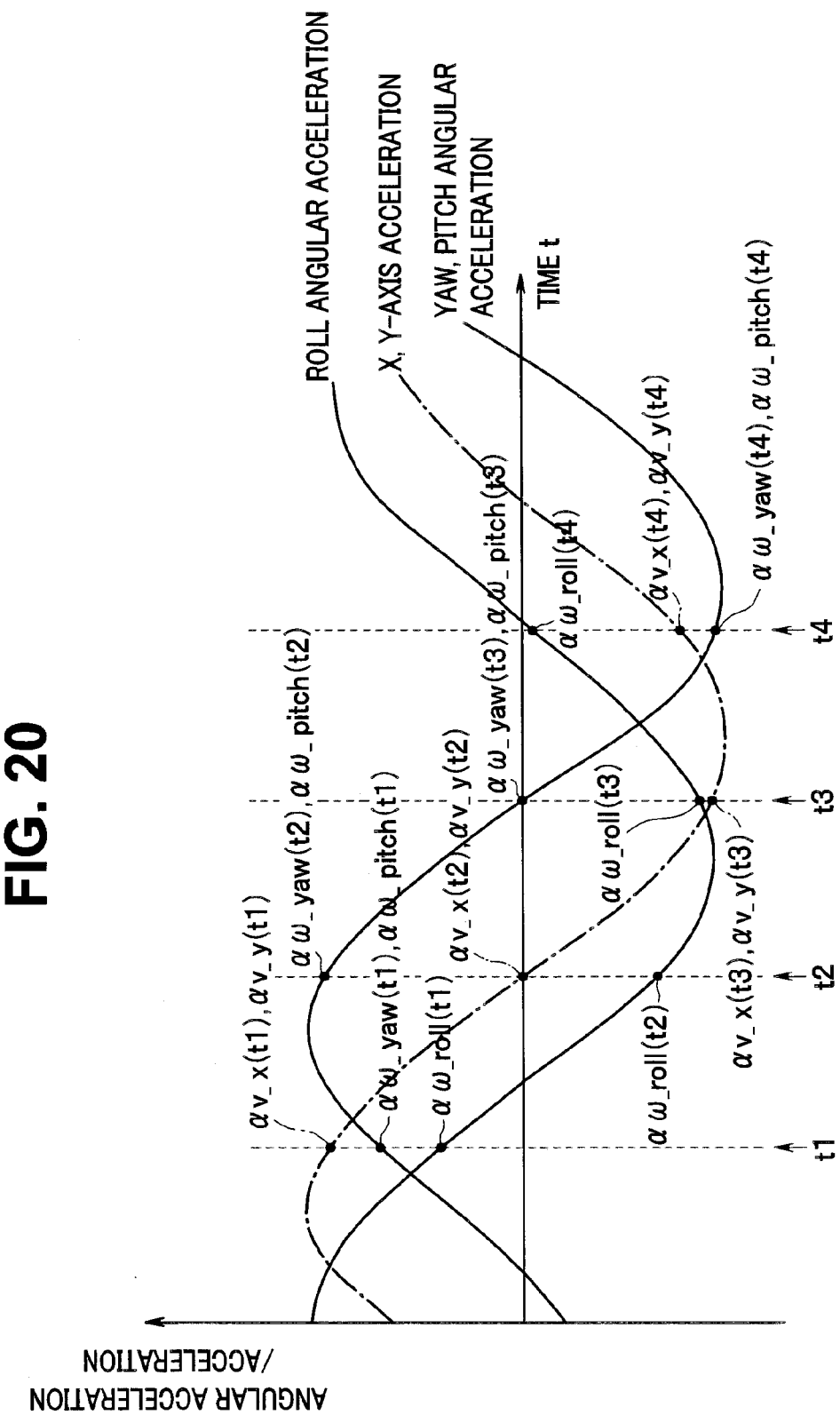
FIG. 20 is a graph for explaining an example of times when a radius is calculated in the third embodiment.

The data stored in the storing sections 753a, 753b, and 753c is data of at times t1, t2, and the like shown in FIG. 20. The respective times t1, t2, and the like are, for example, equal time intervals. FIG. 20 is a graph for explaining an example of times when a radius is calculated.

The radius calculating sections 764a and 764b are rotation radius calculating sections that calculate the rotation radius R on the basis of, for example, acceleration and angular acceleration (however, as explained below, the radius calculating sections 764a and 764b may calculate the rotation radius R on the basis of a velocity and an angular velocity).

First, it is assumed that a relational expression indicated by Expression 20 below holds among the yaw angular acceleration αω_yaw, the roll angular acceleration αω_roll, the yaw radius Ryaw, the XZ roll radius Rrollx, and the X acceleration αv_x.

$$a_{v\_x} = R_{yaw} \times \alpha_{\omega\_yaw} + R_{rollx} \times \alpha_{\omega\_roll} \qquad \text{[Expression 20]}$$

Similarly, a relational expression indicated by Expression 21 below holds among the pitch angular acceleration αω_pitch, the roll angular acceleration αω_roll, the pitch radius Rpitch, the YZ roll radius Rrolly, and the Y acceleration αv_y.

$$a_{v\_y} = R_{pitch} \times \alpha_{\omega\_pitch} + R_{rolly} \times \alpha_{\omega\_roll} \qquad \text{[Expression 21]}$$

In Expression 20, measurable amounts are the yaw angular acceleration αω_yaw, the roll angular acceleration αω_roll, and the X acceleration αv_x. Amounts desired to be calculated are the yaw radius Ryaw and the XZ roll radius Rrollx.

Similarly, in Expression 21, measurable amounts are the pitch angular acceleration αω_pitch, the roll angular acceleration αω_roll, and the Y acceleration αy_x. Amounts desired to be calculated are the pitch radius Rpitch and the YZ roll radius Rrolly.

In both of Expression 20 and Expression 21, there are two unknown numbers (amounts desired to be calculated). Therefore, the respective radiuses cannot be calculated without changing the expressions. Therefore, Expression 20 at a first time T1 and Expression 20 at a second time T2 (note that, although temporal order of the first time T1 and the second time T2 may be any order, for example, it is assumed that the first time T1 is temporally earlier and the second time T2 is temporally later) are set up as simultaneous equations as indicated by Expression 22 below. Similarly, Expression 21 at the first time T1 and Expression 21 at the second time T2 are set up as simultaneous equations as indicated by Expression 23 below.

$$\begin{cases} \alpha_{v\_x}(T1) = R_{yaw} \times \alpha_{\omega\_yaw}(T1) + R_{rollx} \times \alpha_{\omega\_roll}(T1) \\ \alpha_{v\_x}(T2) = R_{yaw} \times \alpha_{\omega\_yaw}(T2) + R_{rollx} \times \alpha_{\omega\_roll}(T2) \end{cases} \qquad \text{[Expression 22]}$$

$$\begin{cases} \alpha_{v\_y}(T1) = R_{pitch} \times \alpha_{\omega\_pitch}(T1) + R_{rolly} \times \alpha_{\omega\_roll}(T1) \\ \alpha_{v\_y}(T2) = R_{pitch} \times \alpha_{\omega\_pitch}(T2) + R_{rolly} \times \alpha_{\omega\_roll}(T2) \end{cases} \qquad \text{[Expression 23]}$$

In Expression 22 and Expression 23, it is assumed that change amounts between respective radiuses at the first time T1 and respective radiuses at the second time T2 are small and negligible (that is, Ryaw=Ryaw(T1)=Ryaw(T2), Rpitch=Rpitch(T1)=Rpitch(T2), Rrollx=Rrollx(T1)=Rrollx(T2), and Rrolly=Rrolly(T1)=Rrolly(T2)).

A solution of the simultaneous equations of Expression 22 is as indicated by Expression 24 below. A solution of the simultaneous equations of Expression 23 is as indicated by Expression 25 below.

$$\begin{cases} R_{yaw} = \dfrac{\alpha_{\omega\_roll}(T2) \times \alpha_{v\_x}(T1) - \alpha_{\omega\_roll}(T1) \times a_{v\_x}(T2)}{\alpha_{\omega\_roll}(T2) \times \alpha_{\omega\_yaw}(T1) - \alpha_{\omega\_roll}(T1) \times \alpha_{\omega\_yaw}(T2)} \\ R_{rollx} = \dfrac{\alpha_{\omega\_yaw}(T2) \times \alpha_{v\_x}(T1) - \alpha_{\omega\_yaw}(T1) \times a_{v\_x}(T2)}{\alpha_{\omega\_yaw}(T2) \times \alpha_{\omega\_roll}(T1) - \alpha_{\omega\_yaw}(T1) \times \alpha_{\omega\_roll}(T2)} \end{cases} \qquad \text{[Expression 24]}$$

$$\begin{cases} R_{pitch} = \dfrac{\alpha_{\omega\_roll}(T2) \times \alpha_{v\_y}(T1) - \alpha_{\omega\_roll}(T1) \times a_{v\_y}(T2)}{\alpha_{\omega\_roll}(T2) \times \alpha_{\omega\_pitch}(T1) - \alpha_{\omega\_roll}(T1) \times \alpha_{\omega\_pitch}(T2)} \\ R_{rolly} = \dfrac{\alpha_{\omega\_pitch}(T2) \times \alpha_{v\_y}(T1) - \alpha_{\omega\_pitch}(T1) \times a_{v\_y}(T2)}{\alpha_{\omega\_pitch}(T2) \times \alpha_{\omega\_roll}(T1) - \alpha_{\omega\_pitch}(T1) \times \alpha_{\omega\_roll}(T2)} \end{cases} \qquad \text{[Expression 25]}$$

Therefore, the radius calculating section 764a calculates the yaw radius Ryaw on the basis of a first equation in Expression 24 using yaw angular acceleration αω_yaw(T1) at the first time T1 and yaw angular acceleration αω_yaw(T2) at the second time T2 stored in the storing section 753a, roll angular acceleration αω_roll(T1) at the first time T1 and roll angular acceleration αω_roll(T2) at the second time T2 stored in the storing section 753b, and X acceleration αv_x(T1) at the first time T1 and X acceleration αv_x(T2) at the second time T2 stored in the storing section 753c.

The radius calculating section 764b calculates the XZ roll radius Rrollx on the basis of a second equation of Expression 24 using data same as the data used by the radius calculating section 764a.

Similarly, the radius calculating section 764a of the Y-direction translation blur correcting section 704y calculates the pitch radius Rpitch on the basis of a first equation in Expression 25 using pitch angular acceleration αω_pitch(T1) at the first time T1 and pitch angular acceleration αω_pitch(T2) at the second time T2 stored in the storing section 753a, the roll angular acceleration αω_roll(T1) at the first time T1 and the roll angular acceleration αω_roll(T2) at the second time T2 stored in the storing section 753b, and Y acceleration αv_y(T1) at the first time T1 and Y acceleration αv_y(T2) at the second time T2 stored in the storing section 753c.

The radius calculating section 764b of the Y-direction translation blur correcting section 704y calculates the YZ roll radius Rrolly on the basis of a second equation of Expression 25 using data same as the data used by the radius calculating section 764a of the Y-direction translation blur correcting section 704y.

The angular accelerations at the respective times used by the radius calculating sections 764a and 764b are amounts obtained using at least angular velocities at the same times.

Note that, if the time T1 when, for example, the roll angular acceleration αω_roll(T1) is 0 is selected in the first equation of Expression 24 and the first equation of Expression 25, Expression 1 and Expression 3 at the time T1 are obtained. If the time T1 when, for example, the yaw angular acceleration αω_yaw(T1) is 0 is selected in the second equation of Expression 24, Expression 2 at the time T1 is obtained. Further, if the time T1 when, for example, the pitch angular acceleration αω_pitch(T1) is 0 is selected in the second equation of Expression 25, Expression 4 at the time T1 is obtained. The same applies when T2 is selected as time when the angular velocities are 0. Therefore, it is seen that the present embodiment is generalization of the first embodiment.

That is, in the first embodiment, with the first time set as time when there is no influence of the rotational motion about the first axis and the second time set as time when there is no influence of the rotational motion about the second axis, the rotation radius calculating section calculates the second radius on the basis of the second angular velocity and the third acceleration at the first time and calculates the first-third projection radius on the basis of the first angular velocity and the third acceleration at the second time in the present embodiment.

Note that, in the present embodiment, the averaged X acceleration αv_x and the averaged Y acceleration αv_y are used when the yaw radius Ryaw, the pitch radius Rpitch, the XZ roll radius Rrollx, and the YZ roll radius Rrolly are calculated. However, since the averaging is not an essential requirement but is a preferred requirement, un-averaged X acceleration and un-averaged Y acceleration may be used.

The movement amount calculating section 785 includes the velocity calculating sections 765a and 765b, the adding section 766, and the integrating section 767. On the basis of a radius calculated by the radius calculating sections 764a and 764b and an angular velocity inputted from the HPFs 701a to 701c, the movement amount calculating section 785 calculates a movement amount in the X-axis direction when the movement amount calculating section 785 is provided in the X-direction translation blur correcting section 704x and calculates a movement amount in the Y-axis direction when the movement amount calculating section 785 is provided in the Y-direction translation blur correcting section 704y.

The velocity calculating sections 765a and 765b calculate a translational velocity on the basis of the radius calculated by the radius calculating sections 764a and 764b and the angular velocity inputted from the HPFs 701a to 701c.

That is, the velocity calculating section 765a of the X-direction translation blur correcting section 704x multiplies together the yaw radius Ryaw inputted from the radius calculating section 764a and the yaw angular velocity ωyaw inputted from the HPF 701a to thereby calculate the translational velocity (the first component of the X-direction velocity in the X-axis direction) Ryaw×ωyaw in the X direction due to the yaw rotational motion.

The velocity calculating section 765b of the X-direction translation blur correcting section 704x multiplies together the XZ roll radius Rrollx inputted from the radius calculating section 764b and the roll angular velocity ωroll inputted from the HPF 701c to thereby calculate the translational velocity (the second component of the X-direction velocity in the X-axis direction) Rrollx×ωroll in the X direction due to the roll rotational motion.

The adding section 766 of the X-direction translation blur correcting section 704x is a velocity combining section. The adding section 766 adds up an output of the velocity calculating section 765a and an output of the velocity calculating section 765b to thereby calculate the translational velocity (the X-direction velocity) Vx in the X-direction due to both of the yaw rotational motion and the roll rotational motion as indicated by Expression 5 described above (described below again).

$$Vx = Ryaw \times \omega yaw + Rrollx \times \omega roll \qquad \text{[Expression 5]}$$

Similarly, the velocity calculating sections 765a and 765b of the Y-direction translation blur correcting section 704y respectively calculate the first component Rpitch×ωpitch of the Y-direction velocity and the second component Rrolly×ωroll of the Y-direction velocity. The adding section 766, which is the velocity combining section, of the Y-direction translation blur correcting section 704y adds up the first component Rpitch×ωpitch and the second component Rrolly×ωroll to thereby calculate the translational velocity (the Y-direction velocity) Vy in the Y direction due to both of the pitch rotational motion and the roll rotational motion as indicated by Expression 6 described above (described below again).

$$Vy = Rpitch \times \omega pitch + Rrolly \times \omega roll \qquad \text{[Expression 6]}$$

The integrating section 767 of the X-direction translation blur correcting section 704x functions as a movement amount calculating section, integrates the calculated the X-direction velocity Vx with respect to the time period t, and calculates the movement amount ΔX in the X-axis direction as indicated by Expression 7 described above (described below again).

$$\Delta X = \int V_x dt \qquad \text{[Expression 7]}$$

Similarly, the integrating section 767 of the Y-direction translation blur correcting section 704y functions as a movement amount calculating section, integrates the calculated Y-direction velocity Vy with respect to the time period t, and calculates the movement amount ΔY in the Y-axis direction as indicated by Expression 8 described above (described below again).

$$\Delta Y = \int V_y dt \qquad \text{[Expression 8]}$$

The movement amounts ΔX and ΔY calculated in this way are movement amounts of the angular velocity sensor 8 and the acceleration sensor 9, that is, movement amounts of the camera 1 itself. On the other hand, to perform image stabilization, it is necessary to calculate a movement amount of an optical image formed on the image pickup plane of the image pickup device 4. Therefore, the multiplying section 768 multiplies the movement amounts ΔX and ΔY inputted from the integrating section 767 with the image magnification f, which is a parameter inputted from the system controller 6 via the SIO 72b and the communication section 705 (see step S58 in FIG. 24) to thereby convert the movement amounts ΔX and ΔY into a blur amount on the image pickup plane and outputs the blur amount as the correction amount D (see step S58 in FIG. 24).

The correction amount D (a translation blur amount) calculated in this way is added to the angle blur amount in the adding section 706 as explained above. Therefore, the driver 73 outputs, on the basis of a total blur amount after the addition, a signal for driving the driving section 5.

Note that Expression 24 and Expression 25 are expressions for calculating the respective radiuses with a division. Therefore, if an absolute value of a denominator is small, it is likely that an error of a calculated radius expands. This point is explained with reference to FIG. 21 to FIG. 23. First, FIG. 21 is a graph for explaining an example in which a cycle of angular acceleration and acceleration is long compared with a time interval for calculating a radius.

Figure 21:
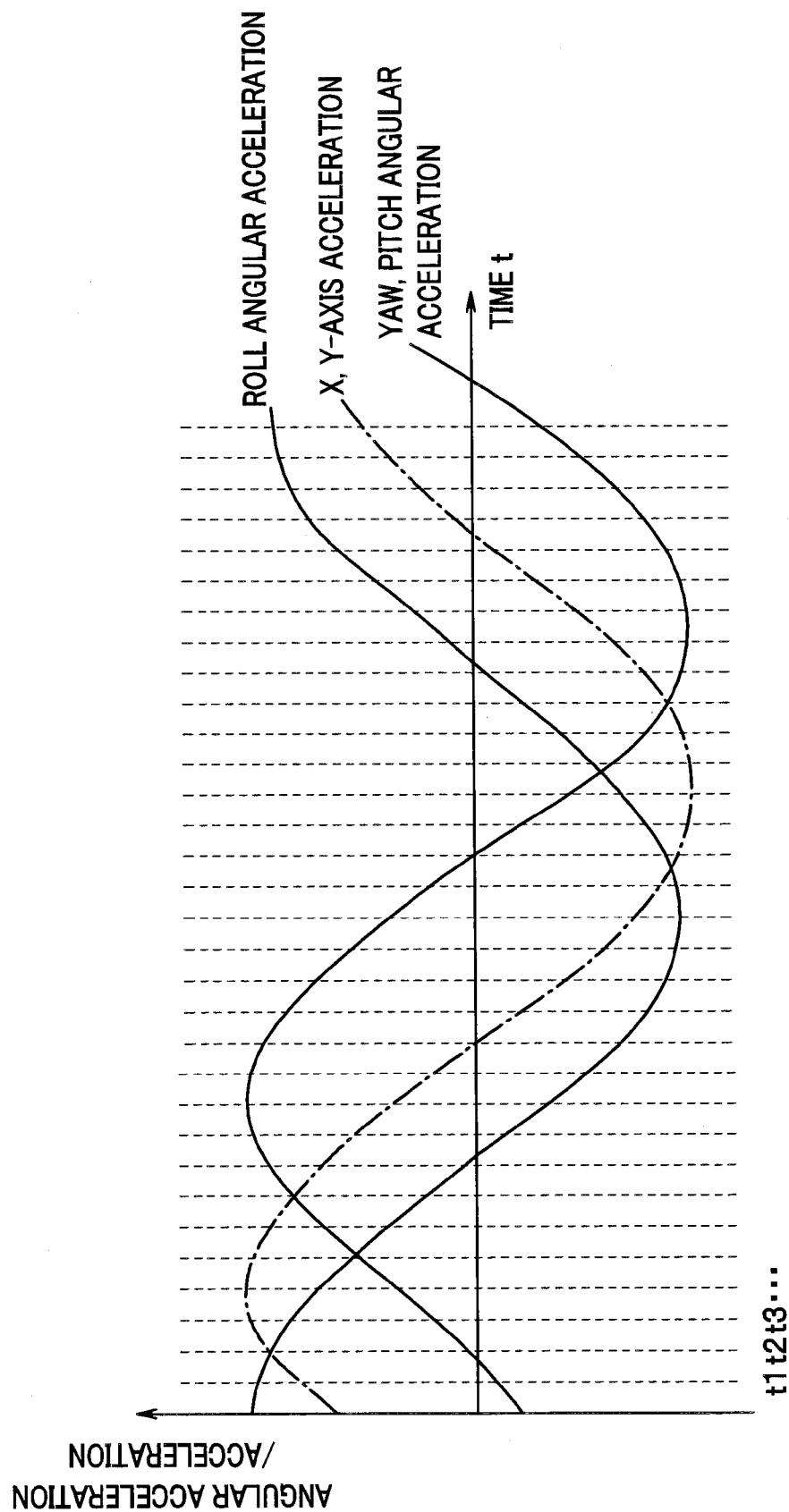
FIG. 21 a graph for explaining an example in which a cycle of angular acceleration and acceleration is long compared with a time interval for calculating a radius in the third embodiment.

When a cycle of a change in the angular acceleration and the acceleration is long compared with an interval of time t1, t2, and the like for calculating a radius, for example, a graph is as shown in FIG. 21. An abscissa (a time axis) of FIG. 21 is compressed compared with FIG. 20.

With respect to the angular acceleration and the acceleration having such a long cycle, when, for example, respective radiuses are calculated with the first time T1=t1 and the second time T2=t2, and subsequently, respective radiuses are calculated with the first time T1=t2 and the second time T2=t3, and respective radiuses are further calculated with the first time T1=t3 and the second time T2=t4, since change amounts of the angular acceleration and the acceleration at a calculation time interval are small, a state sometimes occurs in which absolute values of denominators of the respective equations in Expression 24 and Expression 25 are small.

Figure 22:
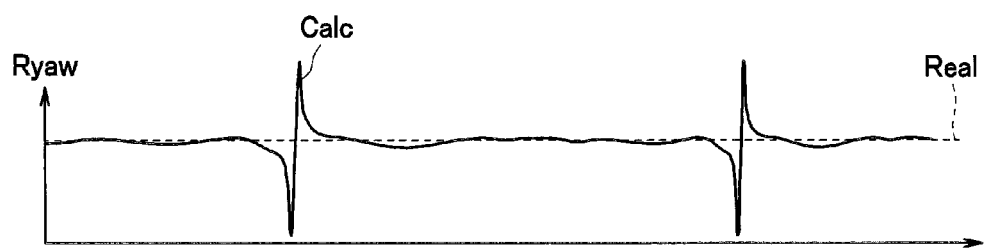
FIG. 22 is a graph showing an example of a value obtained by calculating a yaw radius in an example of the angular acceleration and the acceleration shown in FIG. 21 in the third embodiment.

FIG. 22 is a graph of an example of a value obtained by calculating the yaw radius Ryaw in the example of the angular acceleration and the acceleration shown in FIG. 21. As shown in the figure, with respect to a dotted line Real indicating an actual yaw radius Ryaw, an error of a solid line Calc indicating the yaw radius Ryaw obtained by calculation expands near a coordinate in which an absolute value of a denominator of a calculation expression is small.

Figure 23:
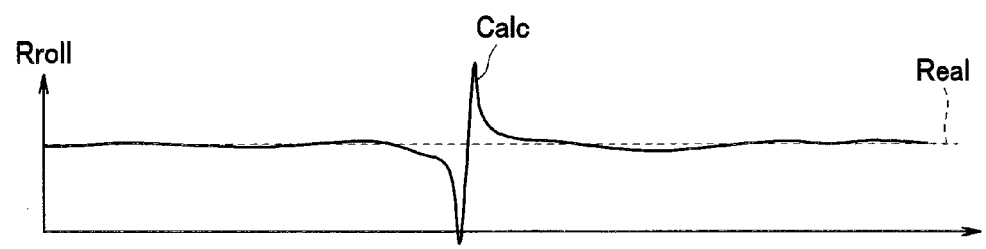
FIG. 23 is a graph showing an example of a value obtained by calculating a roll radius in the example of the angular acceleration and the acceleration shown in FIG. 21 in the third embodiment.

FIG. 23 is a graph showing an example of a value obtained by calculating the roll radius Rroll (the XZ roll radius Rrollx or the YZ roll radius Rrolly) in the example of the angular acceleration and the acceleration shown in FIG. 21. Similarly, with respect to the dotted line Real indicating an actual roll radius Rroll, an error of the solid line Calc indicating the roll radius Rroll obtained by calculation expands near a coordinate in which an absolute value of a denominator of a calculation expression is small.

In the present embodiment, such processing for coping with a case in which reliability of a calculated radius is low is performed. The processing is explained below with reference to FIG. 25.

Figure 24:
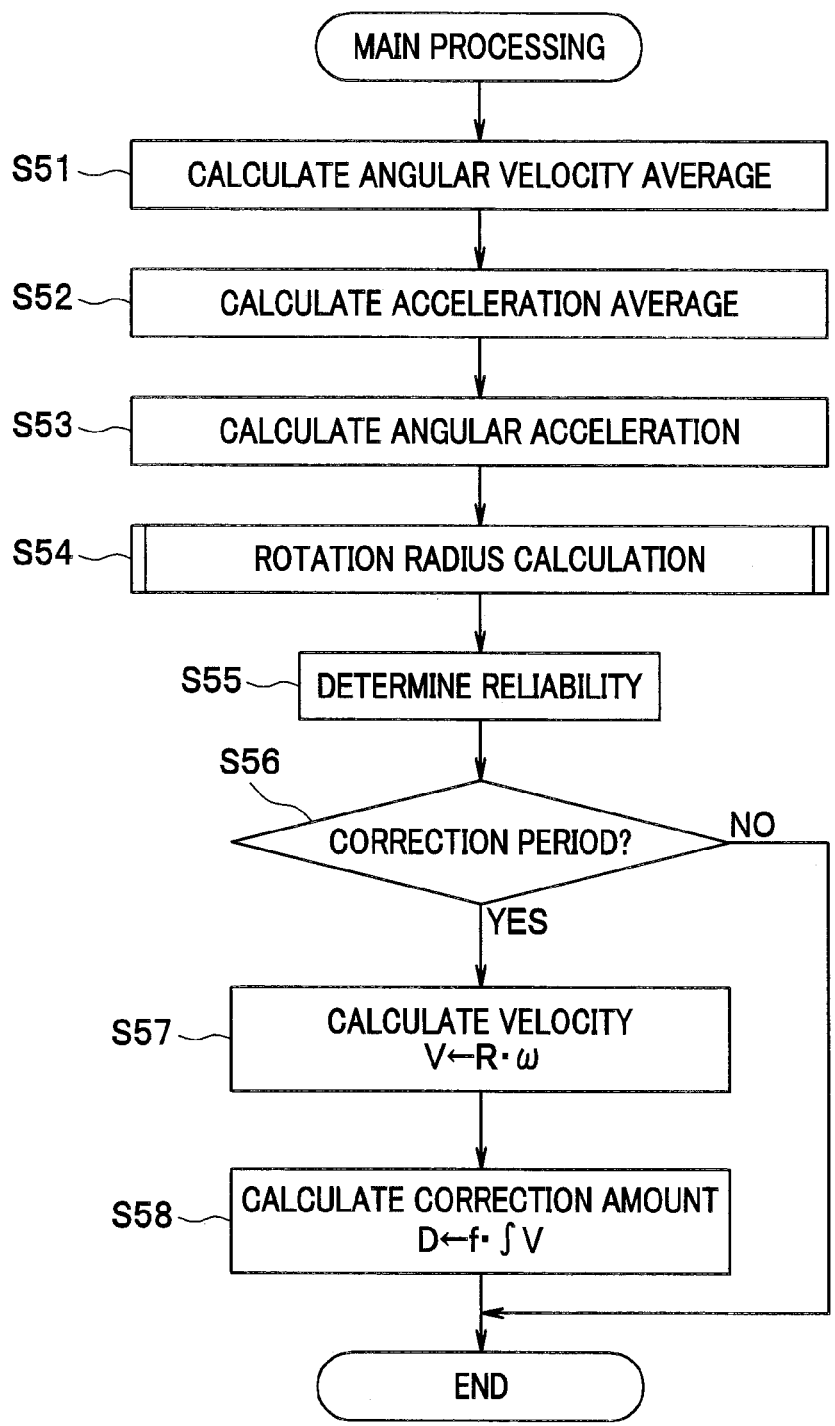
FIG. 24 is a flowchart for explaining main control of detection of a translation blur amount in the third embodiment.

A flow of control steps of blur amount detection in the translation blur correcting section 704 is explained. First, FIG. 24 is a flowchart for explaining main control of detection of a translation blur amount. The main processing shown in FIG. 24 is processing periodically executed at a time interval of, for example, 1 ms.

When the main processing is started, first, the translation blur correcting section 704 performs, with the averaging sections 761a and 761b, calculation of an averaged angular velocity (step S51) and performs, with the averaging section 761c, calculation of averaged acceleration (step S52). The averaged acceleration calculated in step S52 is stored in the storing section 753c.

Subsequently, the translation blur correcting section 704 differentiates, with the angular acceleration calculating sections 763a and 763b, the angular velocity calculated in step S51 with time and calculates angular acceleration (step S53). The calculated angular acceleration is stored in the storing sections 753a and 753b.

Subsequently, the translation blur correcting section 704 performs, with the radius calculating sections 764a and 764b, the operations indicated by Expression 24 and Expression 25 using the acceleration and the angular acceleration stored in the storing sections 753a, 753b, and 753c to thereby calculate a rotation radius (step S54).

Thereafter, the radius calculating sections 764a and 764b further perform reliability determination for determining whether the rotation radius calculated in step S54 is usable for velocity calculation (step S55).

A translation component is calculated by multiplication of the rotation radius and the angular velocity. Therefore, when an absolute value of the rotation radius is large, an absolute value of the calculated translation component is also large, that is, a correction amount is also large. Therefore, if an error is included in the rotation radius, a correction amount due to the error is also large. This is likely to lead to erroneous correction.

Therefore, the rotation radius calculated in step S54 is compared with a predetermined threshold and, when the rotation radius is larger than the predetermined threshold, it is determined that the rotation radius does not have reliability. The rotation radius is not used for velocity calculation (as specific processing, the rotation radius outputted from the radius calculating sections 764a and 764b is set to 0: that is, the rotation radius is cleared to 0).

When the radius is calculated in step S54, the division is used as indicated by Expression 24 and Expression 25. Therefore, when the denominator is a value near 0, a calculation result is an extremely large value (in some case, divergence). Therefore, it is possible to prevent erroneous correction due to such 0 division by not using the rotation radius having a large absolute value.

A method of the reliability determination in step S55 is not limited to the method explained above. Other various methods can be adopted.

For example, instead of or in addition to determining the reliability on the basis of a magnitude of the absolute value of the rotation radius, when at least one of a condition that an absolute value of the denominator is smaller than a predetermined value and a condition that an absolute value of the numerator is smaller than a predetermined value in Expression 24 or Expression 25 holds, that is, an absolute value of at least one of a denominator and a numerator of a right side in any one of Expression 24 to Expression 25 is smaller than a threshold set in advance, the radius calculating sections 764a and 764b may determine that there is no reliability in the rotation radius calculated by the expression and output a rotation angle 0 without using a calculation result.

Note that examples of the case in which the rotation radius is cleared to 0 further include cases explained below.

In a first case in which the rotation radius is cleared to 0, a stationary state is detected. Since no blur caused by shaking occurs in the stationary state, it is possible to prevent erroneous correction by clearing the rotation radius to 0. Examples of a method of detecting the stationary state include a method in which an output of the angular velocity sensor 8 and an output of the acceleration sensor 9 excluding components considered to be noise or the like are continuously substantially 0 for a predetermined time period or more. Another example of a state in which the stationary state is detected, tripod connection is detected by a tripod detecting section or the like. As a detection method for the tripod connection, publicly-known various methods can be used. Therefore, a specific example of the detection method is not explained.

In a second case in which the rotation radius is cleared to 0, panning operation is detected. In general, the panning operation is not included in a hand shake. Moreover, since the camera 1 is moved in a relatively large angle range, a correction range by the driving section 5 is often exceeded. In addition, when the panning operation is performed, since an influence of the HPFs (in particular, the HPF 701a and the HPF related to acceleration in the X-axis direction) remains, a normal correction amount cannot be calculated for a while immediately after the panning operation is performed. Therefore, it is possible to prevent erroneous correction due to an influence of the HPF 701 after the panning operation by clearing a rotation radius calculated from a yaw rotational motion related to the panning operation, that is, the yaw radius Ryaw calculated by Expression 20 to 0. Note that the detection of the panning operation can be determined by detecting that detection values of the angular velocity sensor 8 and the acceleration sensor 9, i.e., outputs (detection values) from the HPFs 701a to 701e (in particular, the HPF 701a and the HPF 701d) do not change exceeding a predetermined time period or signs of the detection values do not change exceeding the predetermined time period.

Further, besides the cases explained above, when it is determined that reliability of a calculated correction amount is low, the rotation radius only has to be cleared to 0 as appropriate.

The camera 1 has two control periods, i.e., a detection period in which an angular velocity and acceleration are detected and calculation of a rotation radius is performed but image blur correction is not performed and a correction period in which both of calculation of a rotation radius and image stabilization using the calculated rotation radius are performed. It is recorded in, for example, a state flag state whether the control period is the detection period or the correction period.

The image stabilization microcomputer 7 refers to the state flag to thereby determine whether the control period is the correction period (step S56).

When it is determined that the control period is the correction period, the velocity calculating sections 765a and 765b and the adding section 766 multiply together and add up the radius R determined as having reliability in step S55 and the angular velocity ω outputted from the angular velocity sensor 8 as indicated by Expression 5 and Expression 6 to thereby calculate the translational velocity V (step S57).

Further, the integrating section 767 integrates the translational velocity V with time. The multiplying section 768 multiplies a result of the integration with the image magnification f to thereby calculate a translation movement amount generated on the image pickup plane (step S58).

When step S58 ends or it is determined in step S56 that the control period is not the correction period (that is, the control period is the detection period), the translation blur correcting section 704 ends the main processing.

Figure 25:
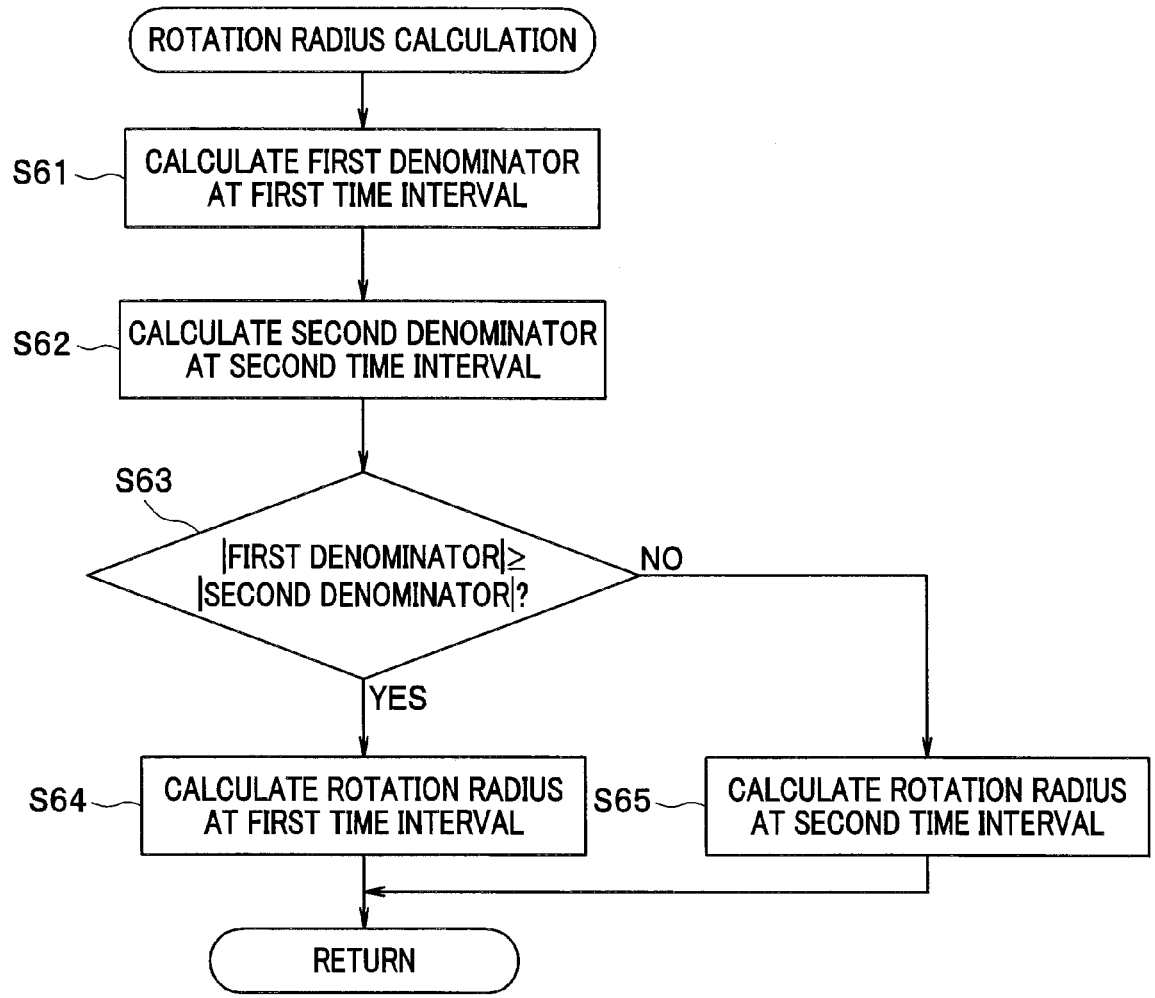
FIG. 25 is a flowchart for explaining details of processing of a rotation radius calculation in step S54 in FIG. 24 in the third embodiment.

FIG. 25 is a flowchart for explaining details of the processing of the rotation radius calculation in step S54 in FIG. 24. Note that the rotation radius calculation processing is applied to each of the yaw radius Ryaw, the pitch radius Rpitch, the XZ roll radius Rrollx, and the YZ roll radius Rrolly.

The rotation radius calculation processing is processing for coping with the case in which the reliability of the calculated radius is low explained above with reference to FIG. 21 to FIG. 23.

That is, when the processing is started, the radius calculating sections 764a and 764b of the X-direction translation blur correcting section 704x and the Y-direction translation blur correcting section 704y calculate the denominators (in the present embodiment, hereinafter referred to as first denominators) in the respective equations of Expression 24 and Expression 25 using data in which the first time T1 and the second time T2 have a first time interval (step S61). Specifically, with respect to the respective times t1, t2, and the like shown in FIG. 20 and FIG. 21, the radius calculating sections 764a and 764b calculate the first denominators with, for example, the first time T1=t(i−1) and the second time T2=ti, where i is an index indicating different time t when a value of i is different. For example, i is an integer.

Subsequently, the radius calculating sections 764a and 764b calculate the denominators (in the present embodiment, hereinafter referred to as second denominators) in the respective equations of Expression 24 and Expression 25 using data in which the first time T1 and the second time T2 have a second time interval (step S62). Specifically, with respect to the respective times t1, t2, and the like shown in FIG. 20 and FIG. 21, the radius calculating sections 764a and 764b calculate the second denominators with, for example, the first time T1=t(i−4) and the second time T2=ti. Note that, in this example, the second time interval is four times as long as the first time interval. However, the second time interval is not limited to this. A ratio of the first time interval and the second time interval may be an appropriate ratio.

Subsequently, the radius calculating sections 764a and 764b determine whether absolute values of the first denominators are equal to or larger than absolute values of the second denominators (step S63). A method of the determination is a method of determining that reliability of a calculated rotation radius is higher when absolute values of the denominators in the respective equations of Expression 24 and Expression 25 are larger.

When determining that the absolute values of the first denominators are equal to or larger than the absolute values of the second denominators, the radius calculating sections 764a and 764b calculate a rotation radius at the first time interval (step S64).

On the other hand, when determining that the absolute values of the first denominators are smaller than the absolute values of the second denominators, the radius calculating sections 764a and 764b calculate a rotation radius at the second time interval (step S65).

After the processing in step S64 or step S65 is performed, the processing returns from the rotation radius calculation processing to the main processing shown in FIG. 24.

Note that, in the processing shown in FIG. 24, the reliability determination of the two kinds of denominators including the denominators calculated on the basis of the data of the first time interval and the denominators calculated on the basis of the data of the second time interval is performed. However, reliability determination of a larger number of kinds of denominators based on data of other time intervals may be performed. In this case, for example, it only has to be determined that reliability of a rotation radius calculated on the basis of data that gives a denominator having a largest absolute value is highest.

According to the third embodiment, the moving velocity in the lateral direction detected from the angular velocity in the yaw direction and the moving velocity in the lateral direction detected from the angular velocity in the roll direction are combined by the velocity combining section to calculate the lateral moving velocity. The moving velocity in the longitudinal direction detected from the angular velocity in the pitch direction and the moving velocity in the longitudinal direction detected from the angular velocity in the roll direction are combined by the velocity combining section to calculate the longitudinal moving velocity. Therefore, it is possible to more accurately detect a moving velocity than a moving velocity calculated on the basis of only the angular velocity in the yaw direction and the angular velocity in the pitch direction.

A rotation radius can be calculated by the four arithmetic operations indicated by Expression 24 and Expression 25. Therefore, it is possible to relatively easily calculate a radius without applying a large operation load.

In this case, among rotation radiuses calculated on the basis of data of a plurality of time intervals, rotation radiuses having large absolute values of the denominators in the respective equations of Expression 24 and Expression 25 are determined as having high reliability. Therefore, it is possible to prevent expansion of errors when the absolute values of the denominators are small.

Further, the angular velocities and the accelerations detected by the angular velocity sensor and the acceleration sensor are averaged by the sampling data for the predetermined number of times. Therefore, it is possible to suppress an influence of a high-frequency component emphasized in the differential processing in the later stage. Data of a plurality of samples can be treated as data of one sample by the averaging. Therefore, a data amount of a processing target is compressed and an operation load can be reduced.

The angular velocity is differentiated to calculate the angular acceleration. The radius is calculated on the basis of the calculated angular acceleration and the detected acceleration. That is, the integration operation in the radius calculation is made unnecessary. Therefore, it is possible to avoid errors likely to be accumulated when the integration operation is performed. There is an advantage that erroneous calculation due to accumulated errors does not occur.

In addition, when reliability of a calculated radius is low, 0 is outputted as a radius. Therefore, it is possible to prevent erroneous correction due to erroneous calculation of a radius.

In this way, the translation movement amount generated in the camera 1, which is the image pickup apparatus, is calculated taking into account the influence due to the rotational motion of the roll in addition to the influence due to the rotational motions of the yaw and the pitch. Therefore, it is possible to more accurately calculate a correction amount than in the past with a simple configuration. By driving the image pickup device to cancel an image blur amount by a detected movement amount, it is possible to photograph, with the camera 1, an image from which a translation blur amount is removed.

That is, the shaking amount detecting apparatus, the image pickup apparatus, and the shaking amount detecting method are obtained that can more accurately detect a translation blur amount with relatively simple processing.

[Modification of Third Embodiment]

A modification of the third embodiment is explained.

In the third embodiment, as explained above, the angular velocity is differentiated to calculate the angular acceleration. The radius is calculated on the basis of the calculated angular acceleration and the detected acceleration. However, in this modification, acceleration is integrated to calculate velocity. A radius is calculated on the basis of the calculated velocity and an angular velocity.

That is, a rotation radius is not limitedly calculated on the basis of angular acceleration and acceleration and can also be calculated on the basis of an angular velocity and a velocity.

In this case, in the configuration shown in FIG. 19, the angular acceleration calculating sections 763a and 763b are deleted (see an example in which an angular acceleration calculating section is absent between the averaging section 761a and a storing section 753d and between the averaging section 761b and a storing section 753e in FIG. 28 referred to below) and an integrating section is added between the averaging section 761c and the storing section 753c (see an integrating section 769 that is provided in a pre-stage of an averaging section 761d and integrates acceleration to calculate a velocity in FIG. 28 referred to below). In the modification of the third embodiment, the integrating section integrates an averaged acceleration outputted from the averaging section 761c shown in FIG. 19 and calculates a velocity. Specifically, the integrating section of the X-direction translation blur correcting section 704x calculates the X velocity vx and the integrating section of the Y-direction translation blur correcting section 704y calculates a Y velocity vy.

Therefore, in this modification, the yaw angular velocity ωyaw, the roll angular velocity ωroll, and the X velocity vx are inputted to the radius calculating sections 764a and 764b of the X-direction translation blur correcting section 704x. A pitch angular velocity ωpitch, the roll angular velocity ωroll, and the Y velocity vy are inputted to the radius calculating sections 764a and 764b of the Y-direction translation blur correcting section 704y.

In this case, a relational expression indicated by Expression 5 described above holds among the yaw angular velocity ωyaw, the roll angular velocity ωroll, the yaw radius Ryaw, the XZ roll radius Rrollx, and the X velocity vx.

Similarly, a relational expression indicated by Expression 6 described above holds among the pitch angular velocity ωpitch, the roll angular velocity ωroll, the pitch radius Rpitch, the YZ roll radius Rrolly, and the Y velocity vy.

In Expression 5, measurable amounts are the yaw angular velocity ωyaw, the roll angular velocity ωroll, and the X velocity vx. Amounts desired to be calculated are the yaw radius Ryaw and the XZ roll radius Rrollx.

Similarly, in Expression 6, measurable amounts are the pitch angular velocity ωpitch, the roll angular velocity ωroll, and the Y velocity vy. Amounts desired to be calculated are the pitch radius Rpitch and the YZ roll radius Rrolly.

In both of Expression 5 and Expression 6, there are two unknown numbers (amounts desired to be calculated). Therefore, as explained above, Expression 5 at the first time T1 and Expression 5 at the second time T2 are set up as simultaneous equations as indicated by Expression 26 below. Similarly, Expression 6 at the first time T1 and Expression 6 at the second time T2 are set up as simultaneous equations as indicated by Expression 27 below.

$$\begin{cases} v_x(T1) = R_{yaw} \times \omega_{yaw}(T1) + R_{rollx} \times \omega_{roll}(T1) \\ v_x(T2) = R_{yaw} \times \omega_{yaw}(T2) + R_{rollx} \times \omega_{roll}(T2) \end{cases} \quad \text{[Expression 26]}$$

$$\begin{cases} v_y(T1) = R_{pitch} \times \omega_{pitch}(T1) + R_{rolly} \times \omega_{roll}(T1) \\ v_y(T2) = R_{pitch} \times \omega_{pitch}(T2) + R_{rolly} \times \omega_{roll}(T2) \end{cases} \quad \text{[Expression 27]}$$

It is assumed that change amounts between respective radiuses at the first time T1 and respective radiuses at the second time T2 are small and negligible also in Expression 26 and Expression 27.

A solution of the simultaneous equations of Expression 26 is as indicated by Expression 28 below. A solution of the simultaneous equations of Expression 27 is as indicated by Expression 29 below.

$$\begin{cases} R_{yaw} = \dfrac{\omega_{roll}(T2) \times v_x(T1) - \omega_{roll}(T1) \times v_x(T2)}{\omega_{roll}(T2) \times \omega_{yaw}(T1) - \omega_{roll}(T1) \times \omega_{yaw}(T2)} \\ R_{rollx} = \dfrac{\omega_{yaw}(T2) \times v_x(T1) - \omega_{yaw}(T1) \times v_x(T2)}{\omega_{yaw}(T2) \times \omega_{roll}(T1) - \omega_{yaw}(T1) \times \omega_{roll}(T2)} \end{cases} \quad \text{[Expression 28]}$$

$$\begin{cases} R_{pitch} = \dfrac{\omega_{roll}(T2) \times v_y(T1) - \omega_{roll}(T1) \times v_y(T2)}{\omega_{roll}(T2) \times \omega_{pitch}(T1) - \omega_{roll}(T1) \times \omega_{pitch}(T2)} \\ R_{rolly} = \dfrac{\omega_{pitch}(T2) \times v_y(T1) - \omega_{pitch}(T1) \times v_y(T2)}{\omega_{pitch}(T2) \times \omega_{roll}(T1) - \omega_{pitch}(T1) \times \omega_{roll}(T2)} \end{cases} \quad \text{[Expression 29]}$$

Therefore, the radius calculating section 764a of the X-direction translation blur correcting section 704x calculates the yaw radius Ryaw on the basis of a first equation in Expression 28 using a yaw angular velocity ωyaw(T1) at the first time T1 and a yaw angular velocity ωyaw(T2) at the second time T2 stored in the storing section 753a, a roll angular velocity ωroll(T1) at the first time T1 and a roll angular velocity ωroll(T2) at the second time T2 stored in the storing section 753b, and an X velocity vx(T1) at the first time T1 and an X velocity vx(T2) at the second time T2 stored in the storing section 753c.

The radius calculating section 764b of the X-direction translation blur correcting section 704x calculates the XZ roll radius Rrollx on the basis of a second equation of Expression 28 using data same as the data used by the radius calculating section 764a of the X-direction translation blur correcting section 704x.

Similarly, the radius calculating section 764a of the Y-direction translation blur correcting section 704y calculates the pitch radius Rpitch on the basis of a first equation in Expression 29 using a pitch angular velocity ωpitch(T1) at the first time T1 and a pitch angular velocity ωpitch(T2) at the second time T2 stored in the storing section 753a, the roll angular velocity ωroll(T1) at the first time T1 and the roll angular velocity ωroll(T2) at the second time T2 stored in the storing section 753b, and a Y velocity vy(T1) at the first time T1 and a Y velocity vy(T2) at the second time T2 stored in the storing section 753c.

The radius calculating section 764b of the Y-direction translation blur correcting section 704y calculates the YZ roll radius Rrolly on the basis of a second equation of Expression 29 using data same as the data used by the radius calculating section 764a of the Y-direction translation blur correcting section 704y.

The velocities at the respective times used by the radius calculating sections 764a and 764b are amounts obtained using at least accelerations at the same times.

The other processing is the same as the processing in the third embodiment.

According to the processing in this modification, the calculation of the respective radiuses can be performed as in the third embodiment. However, in this modification, it is necessary to integrate acceleration detected by the acceleration sensor 9 to calculate a velocity. However, it is likely that an influence of noise such as drift of the acceleration sensor 9 is emphasized by the integration operation to deteriorate accuracy of a radius to be calculated. Therefore, when the configuration of this modification is adopted, it is desirable to set a stricter standard and perform reliability determination.

[Fourth Embodiment]

Figure 26:
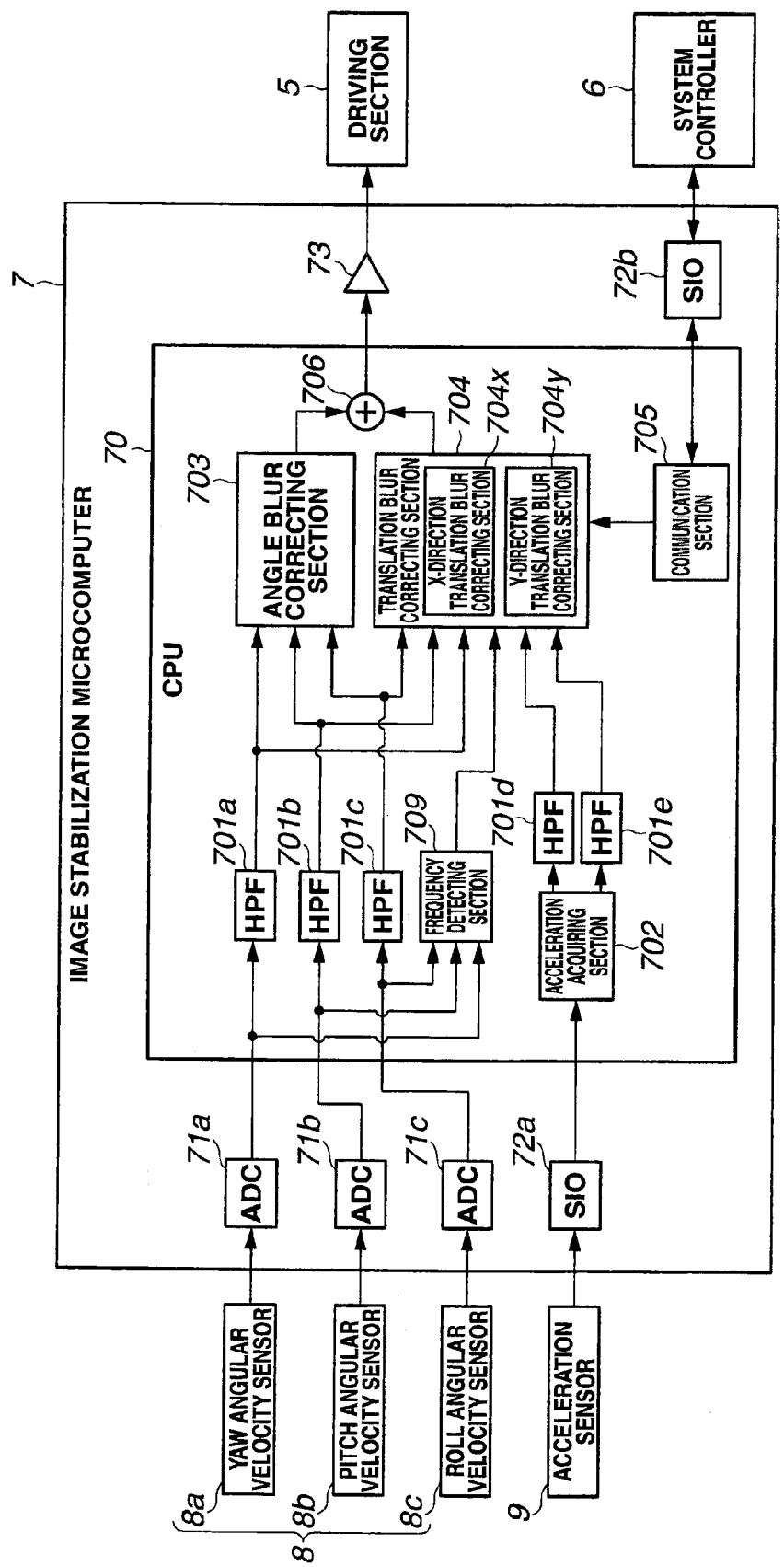
FIG. 26 is a block diagram showing a configuration of an image stabilization microcomputer in a fourth embodiment of the present invention.
Figure 27:
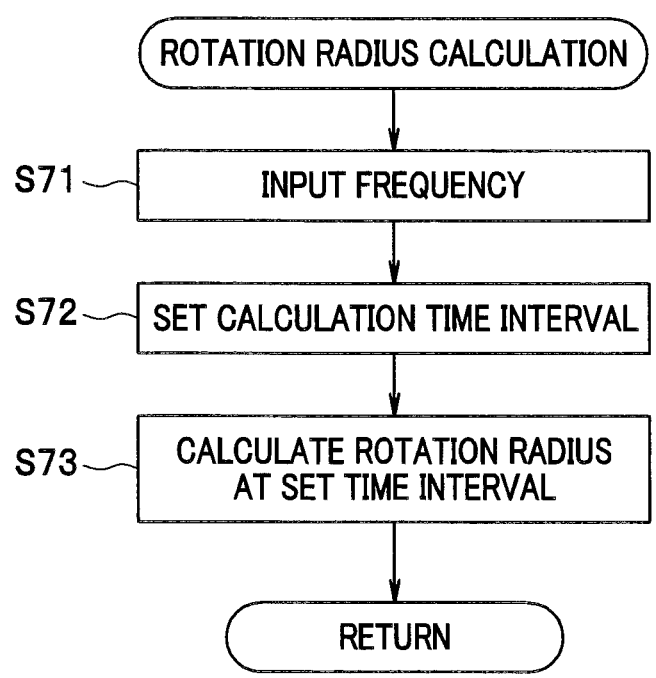
FIG. 27 is a flowchart for explaining details of processing of a rotation radius calculation in step S54 in FIG. 24 in the fourth embodiment.

FIG. 26 and FIG. 27 show a fourth embodiment of the present invention. FIG. 26 is a block diagram showing a configuration of an image stabilization microcomputer. FIG. 27 is a flowchart for explaining details of processing of a rotation radius calculation in step S54 in FIG. 24. In the fourth embodiment, components same as the components in the first to third embodiments are, for example, denoted by the same reference numerals and signs and explanation of the components is omitted as appropriate. Only differences are mainly explained.

As shown in FIG. 26, in the image stabilization microcomputer 7 in the present embodiment, a frequency detecting section 709 is added to the configuration of the image stabilization microcomputer 7 in the first embodiment shown in FIG. 4.

That is, the frequency detecting section 709 detects a frequency of at least one of a roll angular velocity, a yaw angular velocity, and a pitch angular velocity detected by the angular velocity sensor 8. However, in the present embodiment, the frequency detecting section 709 detects each of frequencies of the roll angular velocity, the yaw angular velocity, and the pitch angular velocity.

The frequencies detected by the frequency detecting section 709 are outputted to the radius calculating sections 764a and 764b of the X-direction translation blur correcting section 704x and the radius calculating sections 764a and 764b of the Y-direction translation blur correcting section 704y.

The radius calculating sections 764a and 764b of the X-direction translation blur correcting section 704x and the Y-direction translation blur correcting section 704y perform rotation radius calculation processing shown in FIG. 27 instead of the rotation radius calculation processing shown in FIG. 25 in the third embodiment.

First, the radius calculating sections 764a and 764b receive an input of a frequency from the frequency detecting section 709 (step S71). The inputted frequency may be a representative frequency considered to be most appropriately reflected with a shaking state of the camera 1 among respective frequencies of the roll angular velocity, the yaw angular velocity, and the pitch angular velocity or may be a lowest frequency (that is, a frequency corresponding to an angular velocity having a longest wavelength) among the respective frequencies. Alternatively, the radius calculating sections 764a and 764b receive inputs of all of the roll angular velocity, the yaw angular velocity, and the pitch angular velocity to calculate an average and use the average for processing in a later stage.

Further, a frequency to be inputted may be varied according to which of the radius calculating sections 764a and 764b the frequency is inputted to. For example, it is conceivable that a frequency inputted to the radius calculating section 764a of the X-direction translation blur correcting section 704x is a frequency of the yaw angular velocity ωyaw, a frequency inputted to the radius calculating section 764b of the X-direction translation blur correcting section 704x is a frequency of the roll angular velocity ωroll, a frequency inputted to the radius calculating section 764a of the Y-direction translation blur correcting section 704y is a frequency of the pitch angular velocity ωpitch, and a frequency inputted to the radius calculating section 764b of the Y-direction translation blur correcting section 704y is a frequency of the roll angular velocity ωroll.

Subsequently, the radius calculating sections 764a and 764b set a calculation time interval for a rotation radius, that is, the time interval between the first time T1 and the second time T2 to be longer as the frequency detected by the frequency detecting section 709 is lower (step S72). As an example, it is conceivable to set the time interval (T2-T1) to be inversely proportional to the detected frequency.

However, the angular velocity sensor 8 performs the detection at every predetermined time interval as explained above. Data outputted from the averaging sections 761a, 761b, and 761c has a fixed time interval. Therefore, the time interval (T2-T1) to be actually set is set to, for example, any one of (t2-t1), (t3-t1), (t4-t1), and the like (see FIG. 20 and FIG. 21).

The radius calculating sections 764a and 764b perform calculation of respective radiuses such that the first time T1 and the second time T2 have the set time interval (step S73). Thereafter, the processing returns from the rotation radius calculation processing to the main processing shown in FIG. 24.

According to the fourth embodiment, effects substantially the same as the effects of the third embodiment are attained. Further, a cycle of a change of an angular velocity is detected and a time interval for calculating a rotation radius is set on the basis of the detected cycle. Therefore, it is possible to adaptively suppress expansion of errors when absolute values of the denominators in the respective equations of Expression 24 and Expression 25 are small.

[Fifth Embodiment]

Figure 28:
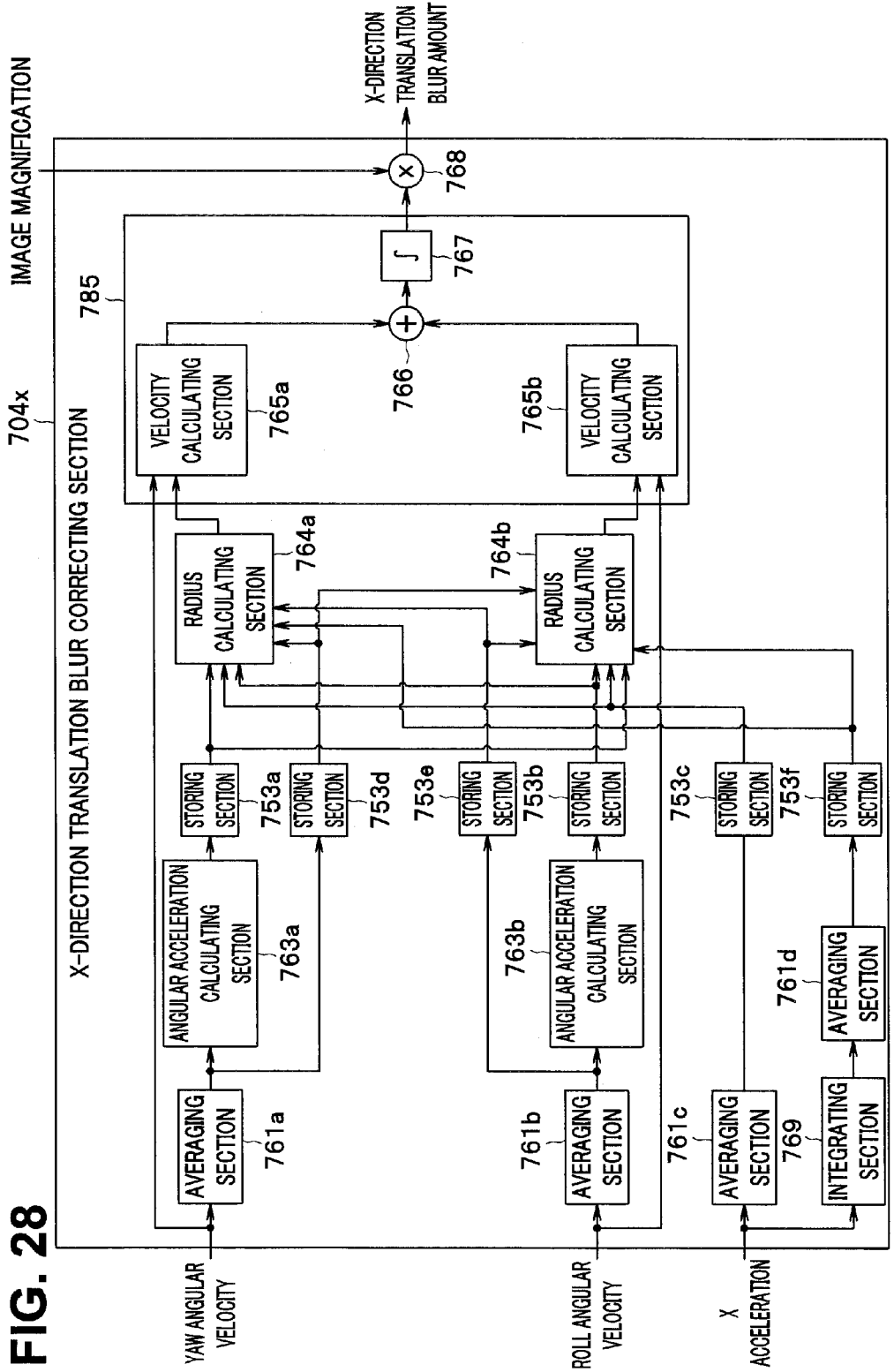
FIG. 28 is a block diagram showing a configuration of an X-direction translation blur correcting section in a fifth embodiment of the present invention.
Figure 29:
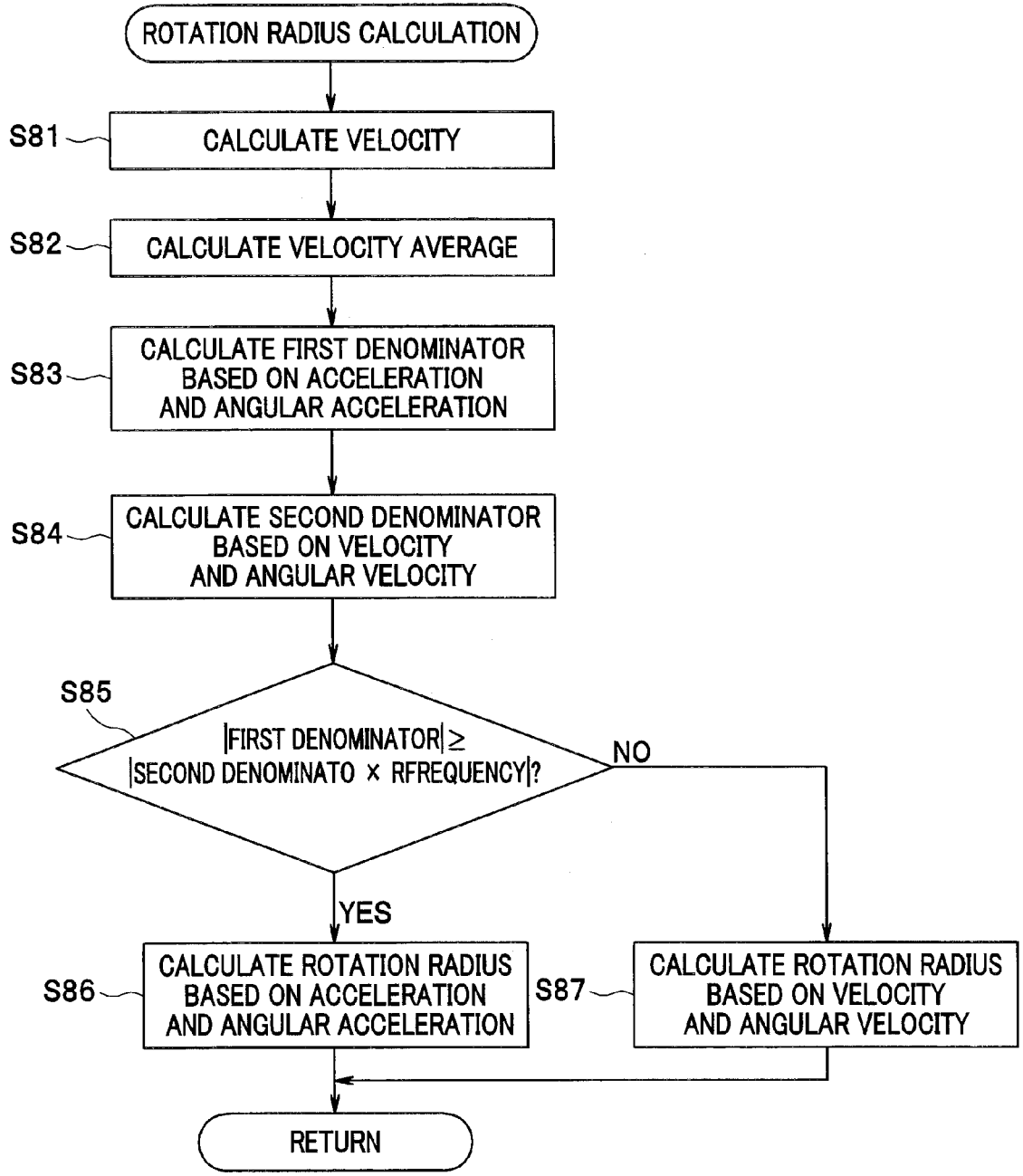
FIG. 29 is a flowchart for explaining details of processing of a rotation radius calculation in step S54 in FIG. 24 in the fifth embodiment.
Figure 30:
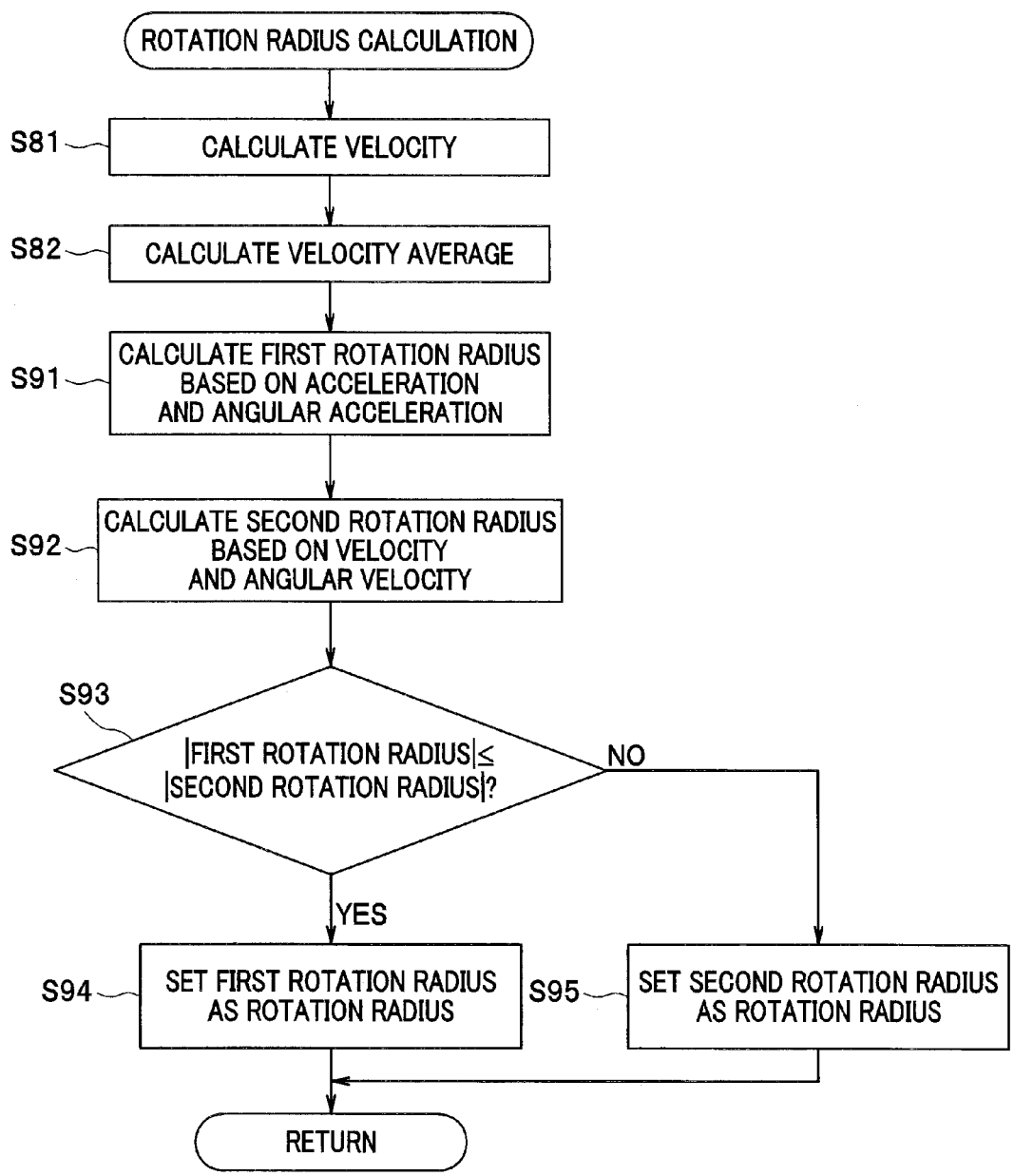
FIG. 30 is a flowchart for explaining details of a modification of the processing of the rotation radius calculation in step S54 in FIG. 24 in the fifth embodiment.

FIG. 28 to FIG. 30 show a fifth embodiment of the present invention. FIG. 28 is a block diagram showing a configuration of the X-direction translation blur correcting section 704x. FIG. 29 is a flowchart for explaining details of processing of a rotation radius calculation in step S54 in FIG. 24. FIG. 30 is a flowchart for explaining details of a modification of the processing of the rotation angle calculation in step S54 in FIG. 24.

In the fifth embodiment, components same as the components in the first to fourth embodiments are, for example, denoted by the same reference numerals and signs and explanation of the components is omitted as appropriate. Only differences are mainly explained.

In the third embodiment, a rotation radius having high reliability is selected out of rotation radiuses calculated on the basis of data of a plurality of different time intervals. In the fourth embodiment, a time interval for calculating a rotation radius is varied according to a changing cycle of an angular velocity. On the other hand, in the fifth embodiment, rotation radiuses are calculated on the basis of angular accelerations and accelerations, rotation radiuses are further calculated on the basis of angular velocities and velocities, and a rotation radius having high reliability is selected out of the rotation radiuses calculated by the different calculation methods.

The image stabilization microcomputer 7 in the present embodiment has the configuration shown in FIG. 26 in the fourth embodiment, that is, includes the frequency detecting section 709.

In the X-direction translation blur correcting section 704x (and, although not shown in the figure, the Y-direction translation blur correcting section 704y) in the present embodiment shown in FIG. 28, the integrating section 769, the averaging section 761d, and storing sections 753d, 753e, and 753f are added to the configuration of the X-direction translation blur correcting section 704x in the third embodiment (or the Y-direction translation blur correcting section 704y in the third embodiment) shown in FIG. 19.

The storing section 753d stores an averaged angular velocity outputted from the averaging section 761a (the yaw angular velocity ωyaw in the case of the X-direction translation blur correcting section 704x and the pitch angular velocity ωpitch in the case of the Y-direction translation blur correcting section 704y) up to averaged angular velocities of past data necessary for radius calculation in the radius calculating sections 764a and 764b.

The storing section 753e stores the averaged roll angular velocity ωroll outputted from the averaging section 761b up to averaged roll angular velocities of past data necessary for the radius calculation in the radius calculating sections 764a and 764b.

Therefore, the averaged angular velocities calculated by the averaging sections 761a and 761b in step S51 in FIG. 24 are respectively stored in the storing sections 753d and 753e.

In the case of the X-direction translation blur correcting section 704x, the integrating section 769 integrates X acceleration inputted from the HPF 701d and calculates an X velocity. In the case of the Y-direction translation blur correcting section 704y, the integrating section 769 integrates Y acceleration inputted from the HPF 701e and calculates a Y velocity.

The averaging section 761d averages velocities inputted from the integrating sections 769 in time series. As explained above, the averaging is performed by, for example, calculating an average of data for four samplings and outputting the average as one sampling value.

The storing section 753f stores a velocity (the X velocity Vx or the Y velocity Vy) averaged by the averaging section 761d up to velocities of past data necessary for the radius calculation in the radius calculating sections 764a and 764b.

The radius calculating sections 764a and 764b perform both of the calculation of a rotation radius using Expression 24 and Expression 25 and the calculation of a rotation radius using Expression 28 and Expression 29.

Processing of rotation radius calculation in the present embodiment is explained with reference to FIG. 29.

When the processing is started, the integrating section 769 integrates acceleration to thereby calculate a velocity (step S81).

Subsequently, the averaging section 761d calculates an averaged velocity (step S82). The averaged velocity calculated in step S82 is stored in the storing section 753f.

The radius calculating sections 764a and 764b calculate the denominators (in the present embodiment, hereinafter referred to as first denominators) in the respective equations of Expression 24 and Expression 25 on the basis of angular accelerations and accelerations stored in the storing sections 753a, 753b, and 753c (step S83).

Further, the radius calculating sections 764a and 764b calculate the denominators (in the present embodiment, hereinafter referred to as second denominators) in the respective equations of Expression 28 and Expression 29 on the basis of angular velocities and velocities stored in the storing sections 753d, 753e, and 753f (step S84).

Thereafter, the radius calculating sections 764a and 764b determines whether absolute values of the first denominators calculated in step S83 is equal to or larger an absolute values of values obtained by multiplying the second denominators calculated in step S84 with the frequency detected by the frequency detecting section 709 (step S85). This determining method is basically a method of determining that reliability of a calculated rotation radius is higher at larger one of the absolute values of the denominators of Expression 24 and Expression 25 and the absolute values of the denominators of Expression 28 and Expression 29. However, since the denominators of Expression 24 and Expression 25 and the denominators of Expression 28 and Expression 29 have different dimensions, the second denominators are multiplied with the frequency to equalize the dimensions.

When determining that the absolute values of the first denominators are equal to or larger than the absolute values of the values obtained by multiplying the second denominators with the frequency, the radius calculating sections 764a and 764b calculate a rotation radius on the basis of angular accelerations and accelerations (step S86).

On the other hand, when determining that the absolute values of the first denominators are smaller than the absolute values of the values obtained by multiplying the second denominators with the frequency, the radius calculating sections 764a and 764b calculate a rotation radius on the basis of angular velocities and velocities (step S87).

After the processing in step S86 or step S87 is performed, the processing returns from the rotation radius calculation processing to the main processing shown in FIG. 24.

A modification of the processing of the rotation radius calculation in the present embodiment is explained with reference to FIG. 30.

In the rotation radius calculation processing shown in FIG. 29, the reliability determination of the rotation radius calculated on the basis of the angular accelerations and the accelerations and the rotation radius calculated on the basis of the angular velocities and the velocities is performed on the basis of the denominators of the calculation equations. However, the rotation radius calculation processing shown in FIG. 30 is performed on the basis of a calculated rotation radius itself.

That is, when the processing shown in FIG. 30 is started, the radius calculating sections 764a and 764b perform the processing in step S81 and step S82.

The radius calculating sections 764a and 764b calculate, on the basis of angular accelerations and accelerations stored in the storing sections 753a, 753b, and 753c, a rotation radius (in the present embodiment, hereinafter referred to as first rotation radius) according to the respective equations of Expression 24 and Expression 25 (step S91).

Further, the radius calculating sections 764a and 764b calculate, on the basis of angular velocities and velocities stored in the storing sections 753d, 753e, and 753f, a rotation radius (in the present embodiment, hereinafter referred to as second rotation radius) according to the respective equations of Expression 28 and Expression 29 (step S92).

Thereafter, the radius calculating sections 764a and 764b determine whether an absolute value of the first rotation radius calculated in step S91 is equal to or smaller than an absolute value of the second rotation radius calculated in step S92 (step S93). This determination method is a method of determining that the rotation radius having a smaller absolute value of the rotation radius calculated by Expression 24 and Expression 25 and the rotation radius calculated by Expression 28 and Expression 29 has higher reliability.

When determining that the absolute value of the first rotation radius is equal to or smaller than the absolute value of the second rotation radius, the radius calculating sections 764a and 764b set the first rotation radius as a rotation radius and output the rotation radius (step S94).

On the other hand, when determining that the absolute value of the first rotation radius is larger than the absolute value of the second rotation radius, the radius calculating sections 764a and 764b set the second rotation radius as a rotation radius and output the rotation radius (step S95).

After the processing in step S94 or step S95 is performed, the processing returns from the rotation radius calculation processing to the main processing shown in FIG. 24.

According to the fifth embodiment, effects substantially the same as the effects of the third and fourth embodiments are attained. Further, a rotation radius determined as having higher reliability of two rotation radiuses calculated on the basis of data in different dimensions is selected. Therefore, it is possible to more surely calculate an appropriate rotation radius. In particular, a probability that reliability of a rotation radius calculated on the basis of angular accelerations and accelerations and reliability of a rotation radius calculated on the basis of angular velocities and velocities simultaneously decrease is considered to be rather low. Therefore, there is an advantage that certainty of calculation of an appropriate rotation radius is high.

Further, there is an advantage that, when determination of reliability is performed on the basis of the denominators of the calculation equations, the absolute values of the denominators are small and it is possible to prevent a rotation radius from becoming excessively large.

On the other hand, when determination of reliability is performed on the basis of a calculated rotation radius itself, it is possible to surely determine whether the calculated rotation radius is within an appropriate range. When a cause of occurrence of a shaking is, for example, a swing of an arm of a photographer who holds the camera 1, it is estimated that the rotation radius is within a fixed range. Therefore, this determination method is particularly effective in such a case.

Note that it goes without saying that the technique for calculating two rotation radiuses on the basis of data in different dimensions in the fifth embodiment may be combined with the technique for calculating a rotation radius on the basis of data of a plurality of different time intervals in the third embodiment or the technique of varying, according to a change cycle of an angular velocity, a time interval for calculating a rotation radius in the fourth embodiment.

[Sixth Embodiment]

Figure 31:
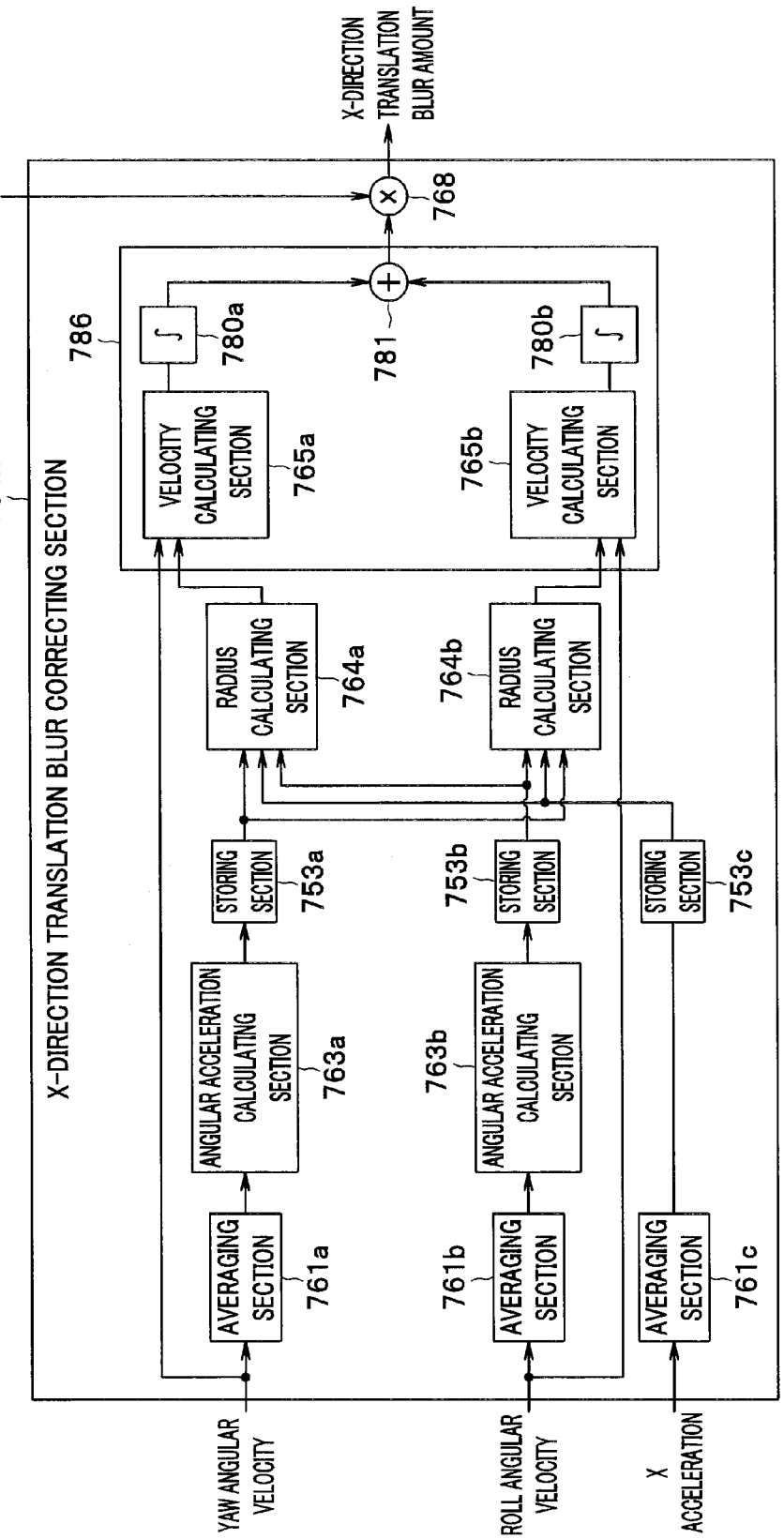
FIG. 31 is a block diagram showing a configuration of an X-direction translation blur correcting section in a sixth embodiment of the present invention.

FIG. 31 shows a sixth embodiment of the present invention and is a block diagram showing a configuration of the X-direction translation blur correcting section 704x.

In the sixth embodiment, components same as the components in the first to fifth embodiments are, for example, denoted by the same reference numerals and signs and explanation of the components is omitted as appropriate. Only differences are mainly explained.

Note that, as in the third embodiment and the like, the Y-direction translation blur correcting section 704y has the same configuration as the X-direction translation blur correcting section 704x. The Y-direction translation blur correcting section 704y is only different from the X-direction translation blur correcting section 704x in that inputs are the pitch angular velocity and the Y acceleration instead of the yaw angular velocity and the X acceleration. Therefore, detailed explanation is omitted as appropriate concerning the Y-direction translation blur correcting section 704y.

First, the X-direction translation blur correcting section 704x (and, although not shown in the figure, the Y-direction translation blur correcting section 704y) in the present embodiment shown in FIG. 31 includes a movement amount calculating section 786 having a configuration different from the configuration of the movement amount calculating section 785 in the X-direction translation blur correcting section 704x in the third embodiment (or the Y-direction translation blur correcting section 704y in the third embodiment) shown in FIG. 19.

The movement amount calculating section 786 in the present embodiment includes velocity calculating sections 765a and 765b, integrating sections 780a and 780b functioning as movement amount calculating sections, and an adding section 781 functioning as a movement amount combining section. A calculation result by the adding section 781 is outputted to the multiplying section 768.

As in the third embodiment, the velocity calculating sections 765a and 765b of the X-direction translation blur correcting section 704x calculate a translational velocity (a first component of an X-direction velocity) Ryaw×ωyaw in the X direction due to a yaw rotational motion and a translational velocity (a second component of the X-direction velocity) Rrollx×ωroll in the X direction due to the roll rotational motion.

The integrating sections 780a and 780b of the X-direction translation blur correcting section 704x integrate the translational velocity calculated by the velocity calculating sections 765a and 765b. That is, the integrating section 780a integrates the translational velocity (the first component of the X-direction velocity) in the X direction due to the yaw rotational motion calculated by the velocity calculating section 765a with respect to the time period t and calculates a first component ΔXyaw of an X-direction translation movement amount as indicated by Expression 30 below.

$$\Delta Xyaw = \int (Ryaw \times \omega yaw) dt \qquad [\text{Expression 30}]$$

Similarly, the integrating section 780b integrates the translational velocity (the second component of the X-direction velocity) in the X direction due to the roll rotational motion calculated by the velocity calculating section 765b with respect to the time period t and calculates a second component ΔXroll of the X-direction translation movement amount as indicated by Expression 31 below.

$$\Delta Xroll = \int (Rrollx \times \omega roll) dt \qquad [\text{Expression 31}]$$

The adding section 781 of the X-direction translation blur correcting section 704x adds up the calculated first component ΔXyaw of the X-direction translation movement amount and the calculated second component ΔXroll of the X-direction translation movement amount as indicated by Expression 32 below and calculates an X-direction translation movement amount ΔX.

$$\Delta X = \Delta X\text{yaw} + \Delta X\text{roll} \quad \text{[Expression 32]}$$

The Y-direction translation blur correcting section 704y calculates a Y-direction translation movement amount ΔY in the same manner as the X-direction translation blur correcting section 704x.

The Y-direction translation blur correcting section 704y is explained below.

The velocity calculating sections 765a and 765b of the Y-direction translation blur correcting section 704y calculate a first component Rpitch×ωpitch of a Y-direction velocity and a second component Rrolly×ωroll of the Y-direction velocity.

The integrating section 780a of the Y-direction translation blur correcting section 704y integrates a translational velocity (a first component of the Y-direction velocity) in the Y direction due to a pitch rotational motion calculated by the velocity calculating section 765a with respect to the time period t and calculates a first component ΔYpitch of a Y-direction translation movement amount as indicated by Expression 33 below.

$$\Delta Y\text{pitch} = \int (R\text{pitch} \times \omega\text{pitch}) dt \quad \text{[Expression 33]}$$

The integrating section 780b of the Y-direction translation blur correcting section 704y integrates a translational velocity (a second component of the Y-direction velocity) in the Y direction due to a roll rotational motion calculated by the velocity calculating section 765b with respect to the time period t and calculates a second component ΔYroll of the Y-direction translation movement amount as indicated by Expression 34 below.

$$\Delta Y\text{roll} = \int (R\text{rolly} \times \omega\text{roll}) dt \quad \text{[Expression 34]}$$

The adding section 781 of the Y-direction translation blur correcting section 704y adds up the calculated first component ΔYpitch of the Y-direction translation movement amount and the calculated second component ΔYroll of the Y-direction translation movement amount as indicated by Expression 35 below and calculates the Y-direction translation movement amount ΔY.

$$\Delta Y = \Delta Y\text{pitch} + \Delta Y\text{roll} \quad \text{[Expression 35]}$$

The movement amounts ΔX and ΔY calculated in this way are converted into a blur amount on the image pickup plane by the multiplying section 768 as in the third embodiment.

According to the sixth embodiment, effects same as the effects in the third embodiments are attained.

Note that it goes without saying that the blur correction amount calculating technique by the movement correction amount calculating section 786 in the sixth embodiment may be combined with the technique of varying, according to a change cycle of an angular velocity, a time interval for calculating a rotation radius in the fourth embodiment or the technique of calculating two rotation radiuses on the basis of data in different dimensions in the fifth embodiment.

[Seventh Embodiment]

Figure 32:
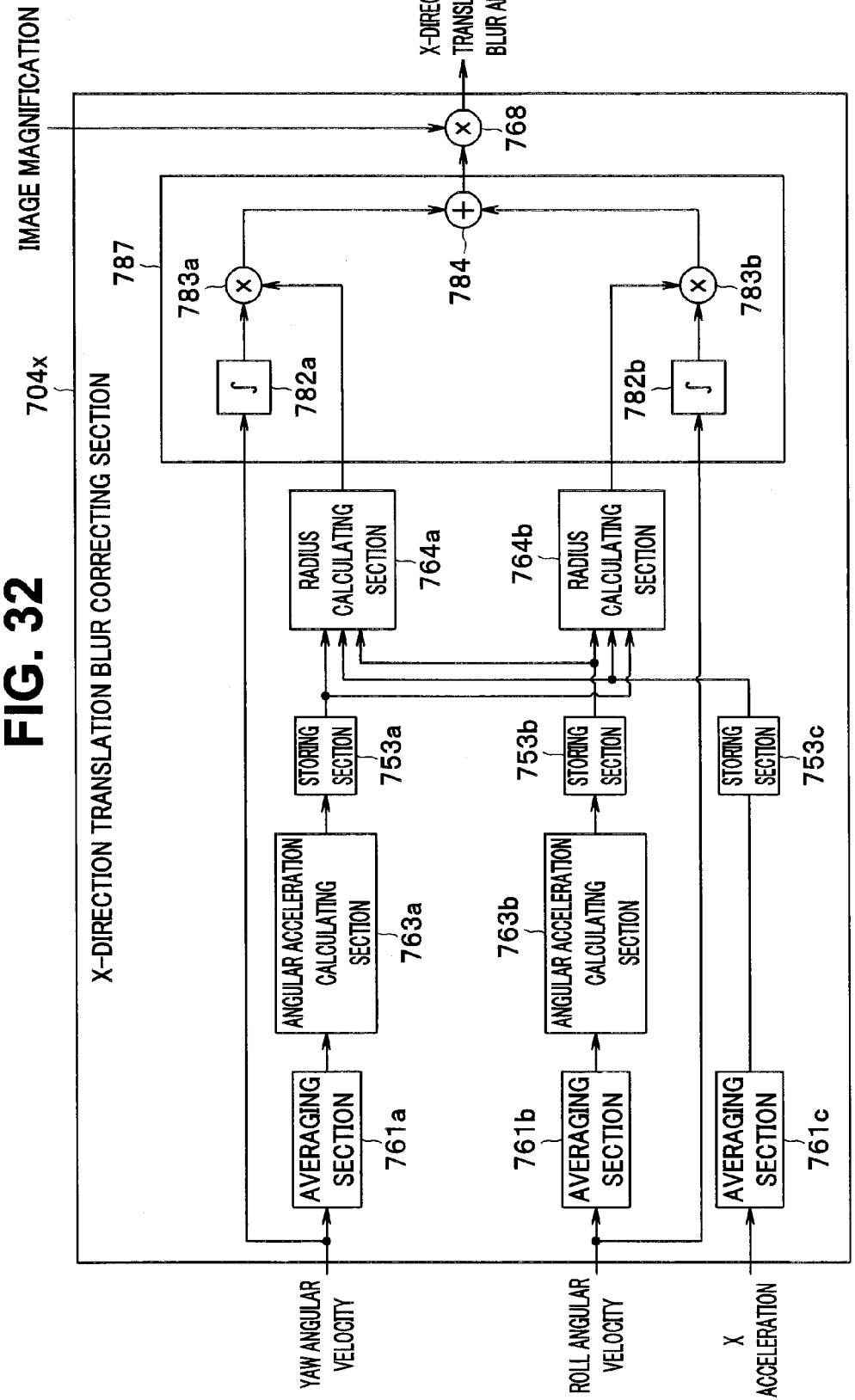
FIG. 32 is a block diagram showing a configuration of an X-direction translation blur correcting section in a seventh embodiment of the present invention.

FIG. 32 shows a seventh embodiment of the present invention and is a block diagram showing a configuration of the X-direction translation blur correcting section 704x.

In the seventh embodiment, components same as the components in the first to sixth embodiments are, for example, denoted by the same reference numerals and signs and explanation of the components is omitted as appropriate. Only differences are mainly explained.

Note that, as in the third embodiment and the like, the Y-direction translation blur correcting section 704y has the same configuration as the X-direction translation blur correcting section 704x. The Y-direction translation blur correcting section 704y is only different from the X-direction translation blur correcting section 704x in that inputs are the pitch angular velocity and the Y acceleration instead of the yaw angular velocity and the X acceleration. Therefore, detailed explanation is omitted as appropriate concerning the Y-direction translation blur correcting section 704y.

First, the X-direction translation blur correcting section 704x (and, although not shown in the figure, the Y-direction translation blur correcting section 704y) in the present embodiment shown in FIG. 32 includes a movement amount calculating section 787 having a configuration different from the configuration of the movement amount calculating section 785 in the X-direction translation blur correcting section 704x in the third embodiment (or the Y-direction translation blur correcting section 704y in the third embodiment) shown in FIG. 19.

The movement amount calculating section 787 in the present embodiment includes integrating sections 782a and 782b functioning as angle calculating sections, multiplying sections 783a and 783b functioning as movement amount calculating sections, and an adding section 784 functioning as a movement amount combining section. A calculation result by the adding section 784 is outputted to the multiplying section 768.

The integrating section 782a of the X-direction translation blur correcting section 704x integrates an inputted yaw angular velocity ωyaw with respect to the time period t and calculates a rotation angle (a yaw angle) θyaw in a yaw direction as indicated by Expression 36 below.

$$\theta\text{yaw} = \int \omega\text{yaw}\, dt \quad \text{[Expression 36]}$$

The integrating section 782b of the X-direction translation blur correcting section 704x integrates an inputted roll angular velocity ωroll with respect to the time period t and calculates a rotation angle (a roll angle) θroll in a roll direction as indicated by Expression 37 below.

$$\theta\text{roll} = \int \omega\text{roll}\, dt \quad \text{[Expression 37]}$$

The multiplying section 783a of the X-direction translation blur correcting section 704x multiplies together the yaw angle θyaw and the yaw radius Ryaw calculated by the radius calculating section 764a and calculates a first component ΔXyaw of an X-direction translation movement amount as indicated by Expression 38 below.

$$\Delta X\text{yaw} = \theta\text{yaw} \times R\text{yaw} \quad \text{[Expression 38]}$$

The multiplying section 783b of the X-direction translation blur correcting section 704x multiplies together the roll angle θroll and the XZ roll radius Rrollx calculated by the radius calculating section 764b and calculates a second component ΔXroll of the X-direction translation movement amount as indicated by Expression 39 below.

$$\Delta X\text{roll} = \theta\text{roll} \times R\text{rollx} \quad \text{[Expression 39]}$$

The adding section 784 of the X-direction translation blur correcting section 704x adds up the calculated first component ΔXyaw of the X-direction translation movement amount and the calculated second component ΔXroll of the X-direction translation movement amount and calculates an X-direction translation movement amount ΔX as indicated by Expression 40 below.

$$\Delta X = \Delta X \text{yaw} + \Delta X \text{roll} \quad \text{[Expression 40]}$$

The Y-direction translation blur correcting section 704y calculates the Y-direction translation movement amount ΔY in the same manner as the X-direction translation blur correcting section 704x.

The Y-direction translation blur correcting section 704y is explained below.

The integrating section 782a of the Y-direction translation blur correcting section 704y integrates the inputted pitch angular velocity ωpitch with respect to the time period t and calculates a rotation angle (a pitch angle) θpitch in the pitch direction as indicated by Expression 41 below.

$$\theta \text{pitch} = \int \omega \text{pitch} \, dt \quad \text{[Expression 41]}$$

The integrating section 782b of the Y-direction translation blur correcting section 704y integrates the inputted roll angular velocity ωroll with respect to the time period t and calculates a rotation angle (a roll angle) θroll in the roll direction as indicated by Expression 42 below.

$$\theta \text{roll} = \int \omega \text{roll} \, dt \quad \text{[Expression 42]}$$

The multiplying section 783a of the Y-direction translation blur correcting section 704y multiplies together the pitch angle θpitch and the pitch radius Rpitch calculated by the radius calculating section 764a and calculates the first component ΔYpitch of the Y-direction translation movement amount as indicated by Expression 43 below.

$$\Delta Y \text{pitch} = \theta \text{pitch} \times R \text{pitch} \quad \text{[Expression 43]}$$

The multiplying section 783b of the Y-direction translation blur correcting section 704y multiplies together the roll angle θroll and the YZ roll radius Rrolly calculated by the radius calculating section 764b and calculates the second component ΔYroll of the Y-direction translation movement amount as indicated by Expression 44 below.

$$\Delta Y \text{roll} = \theta \text{roll} \times R \text{rolly} \quad \text{[Expression 44]}$$

The adding section 784 adds up the calculated first component ΔYpitch of the Y-direction translation movement amount and the calculated second component ΔYroll of the Y-direction translation movement amount and calculates the Y-direction translation movement amount ΔY as indicated by Expression 45 below.

$$\Delta Y = \Delta Y \text{pitch} + \Delta Y \text{roll} \quad \text{[Expression 45]}$$

The movement amounts ΔX and ΔY calculated in this way are converted into a blur amount on the image pickup plane by the multiplying section 768 as in the third embodiment.

According to the seventh embodiment, effects same as the effects in the third embodiments are attained. Further, in general, the angle blur correcting section 703 integrates an angular velocity and calculates a rotation angle. Therefore, the integrating sections 782a and 782b, which are the angle calculating sections, can be shared by the angle blur correcting section 703 and the translation blur correcting section 704. Therefore, it is possible to attain improvement of processing velocity and a reduction of a program memory.

Note that, in the above explanation, the shaking amount detecting apparatus and the image pickup apparatus including the shaking amount detecting apparatus are mainly explained. However, the present invention may be a shaking amount detecting method for performing the shaking amount detection as explained above or a control method for controlling the shaking amount detecting apparatus and the like as explained above or may be a processing program for performing the shaking amount detection as explained above, a control program for causing a computer to control the shaking amount detecting apparatus and the like as explained above, a computer-readable recording medium that records the processing program and the control program, and the like.

Further, the present invention is not limited to the embodiments per se. In an implementation stage, the constituent elements can be modified and embodied without departing from the spirit of the present invention. Aspects of various inventions can be formed by appropriate combinations of the plurality of constituent elements disclosed in the embodiments. For example, several constituent elements may be deleted from all the constituent elements explained in the embodiments. Further, the constituent elements explained in the different embodiments may be combined as appropriate. In this way, it goes without saying that various modifications and applications are possible without departing from the spirit of the present invention.

What is claimed is:

1. A shaking amount detecting apparatus comprising:
    a first angular velocity sensor configured to detect a first angular velocity of an image pickup apparatus about a first axis, wherein the image pickup apparatus comprises:
        an image pickup device; an
        an optical system that forms an image of light from an object on an image pickup plane of the image pickup device as an object image;
    a second angular velocity sensor configured to detect a second angular velocity of the image pickup apparatus about a second axis orthogonal to the first axis;
    an acceleration sensor configured to detect a third acceleration of the image pickup apparatus in a direction along a third axis orthogonal to the first axis and the second axis; and
    a hardware processor configured to:
        calculate a second radius of a rotational motion about the second axis on the basis of the first angular velocity, the second angular velocity, and the third acceleration at a first time and the first angular velocity, the second angular velocity, and the third acceleration at a second time;
        calculate a first-third projection radius of projection of a first radius of a rotational motion about the first axis on a plane including the first axis and the third axis;
        calculate a movement amount in the third axis direction on the basis of the second radius, the first-third projection radius, the first angular velocity, and the second angular velocity; and
        output an instruction signal to drive at least one of the image pickup device and the optical system based on the movement amount in the third direction.

2. The shaking amount detecting apparatus according to claim 1,
    wherein the calculating the movement amount in the third axis direction by the hardware processor comprises:
        multiplying the second angular velocity with the second radius to thereby calculate a first component of a third velocity in the third axis direction and multiplying the first angular velocity with the first-third projection radius to calculate a second component of the third velocity in the third axis direction;
        adding up the first component of the third velocity and the second component of the third velocity to acquire the third velocity; and
        integrating the third velocity with respect to a time period to thereby calculate the movement amount in the third axis direction.

3. The shaking amount detecting apparatus according to claim 2,
further comprising:
a third angular velocity sensor configured to detect a third angular velocity about the third axis,
wherein the acceleration sensor is further configured to detect a second acceleration in a direction along the second axis, and
wherein the hardware processor is further configured to:
calculate a third radius of a rotational motion about the third axis on the basis of the first angular velocity, the third angular velocity, and the second acceleration at the first time and the first angular velocity, the third angular velocity, and the second acceleration at the second time and calculate a first-second projection radius of projection of the first radius of the rotational motion about the first axis on a plane including the first axis and the second axis;
multiply the third angular velocity with the third radius to thereby calculate a first component of a second velocity in the direction along the second axis and multiply the first angular velocity with the first-second projection radius to thereby calculate a second component of a second velocity in the direction along the second axis;
add up the first component of the second velocity and the second component of the second velocity to acquire the second velocity; and
integrate the second velocity with respect to a time period to thereby calculate a movement amount in the direction along the second axis.

4. The shaking amount detecting apparatus according to claim 2,
wherein the first axis is a Z axis same as an optical axis of an optical system, a rotational motion about the Z axis is a roll rotational motion, the first angular velocity is a roll angular velocity, the first angular velocity sensor is a roll angular velocity sensor, and the first radius is a roll radius.

5. The shaking amount detecting apparatus according to claim 3,
wherein the first axis is a Z axis same as an optical axis of the optical system, a rotational motion about the Z axis is a roll rotational motion, the first angular velocity is a roll angular velocity, the first angular velocity sensor is a roll angular velocity sensor, and the first radius is a roll radius,
wherein the second axis is a Y axis serving as an axis in a vertical direction in a standard posture of the image pickup apparatus, a rotational motion about the Y axis is a yaw rotational motion, the second angular velocity is a yaw angular velocity, the second angular velocity sensor is a yaw angular velocity sensor, the second acceleration is Y acceleration, the second radius is a yaw radius, and the second velocity is a Y-direction velocity,
wherein the third axis is an X axis serving as an axis in a horizontal direction in the standard posture of the image pickup apparatus, a rotational motion about the X axis is a pitch rotational motion, the third angular velocity is a pitch angular velocity, the third angular velocity sensor is a pitch angular velocity sensor, the third acceleration is an X acceleration, the third radius is a pitch radius, and the third velocity is an X-direction velocity,
wherein the first-third projection radius is an XZ roll radius of projection of the roll radius on an XZ plane and the first-second projection radius is a YZ roll radius of projection of the roll radius on a YZ plane, and wherein the shaking amount detecting apparatus further comprises an angular velocity sensor comprising the roll angular velocity sensor, the yaw angular velocity sensor, and the pitch angular velocity sensor.

6. The shaking amount detecting apparatus according to claim 5,
wherein hardware processor is configured to calculate the yaw radius Ryaw and the XZ roll radius Rrollx according to $$\begin{cases} R_{yaw} = \dfrac{\alpha_{\omega\_roll}(T2) \times \alpha_{v\_x}(T1) - \alpha_{\omega\_roll}(T1) \times a_{v\_x}(T2)}{\alpha_{\omega\_roll}(T2) \times \alpha_{\omega\_yaw}(T1) - \alpha_{\omega\_roll}(T1) \times \alpha_{\omega\_yaw}(T2)} \\ R_{rollx} = \dfrac{\alpha_{\omega\_yaw}(T2) \times \alpha_{v\_x}(T1) - \alpha_{\omega\_yaw}(T1) \times a_{v\_x}(T2)}{\alpha_{\omega\_yaw}(T2) \times \alpha_{\omega\_roll}(T1) - \alpha_{\omega\_yaw}(T1) \times \alpha_{\omega\_roll}(T2)} \end{cases}$$

on the basis of roll angular acceleration $\alpha\omega\_roll(T1)$ obtained from the roll angular velocity, yaw angular acceleration $\alpha\omega\_yaw(T1)$ obtained from the yaw angular velocity, and the X acceleration $\alpha v\_x(T1)$ at the first time T1 and roll angular acceleration $\alpha\omega\_roll(T2)$ obtained from the roll angular velocity, yaw angular acceleration $\alpha\omega\_yaw(T2)$ obtained from the yaw angular velocity, and the X acceleration $\alpha v\_x(T2)$ at the second time T2 and further calculate the pitch radius Rpitch and the YZ roll radius Rrolly according to $$\begin{cases} R_{pitch} = \dfrac{\alpha_{\omega\_roll}(T2) \times \alpha_{v\_y}(T1) - \alpha_{\omega\_roll}(T1) \times a_{v\_y}(T2)}{\alpha_{\omega\_roll}(T2) \times \alpha_{\omega\_pitch}(T1) - \alpha_{\omega\_roll}(T1) \times \alpha_{\omega\_pitch}(T2)} \\ R_{rolly} = \dfrac{\alpha_{\omega\_pitch}(T2) \times \alpha_{v\_y}(T1) - \alpha_{\omega\_pitch}(T1) \times a_{v\_y}(T2)}{\alpha_{\omega\_pitch}(T2) \times \alpha_{\omega\_roll}(T1) - \alpha_{\omega\_pitch}(T1) \times \alpha_{\omega\_roll}(T2)} \end{cases}$$

on the basis of the roll angular acceleration $\alpha\omega\_roll(T1)$, pitch angular acceleration $\alpha\omega\_pitch(T1)$ obtained from the pitch angular velocity, and the Y acceleration $\alpha v\_y(T1)$ at the first time T1 and the roll angular acceleration $\alpha\omega\_roll(T2)$, pitch angular acceleration $\alpha\omega\_pitch(T2)$ obtained from the pitch angular velocity, and the Y acceleration $\alpha v\_y(T2)$ at the second time T2.

7. The shaking amount detecting apparatus according to claim 5,
wherein the hardware processor is configured to calculate the yaw radius Ryaw and the XZ roll radius Rrollx according to $$\begin{cases} R_{yaw} = \dfrac{\omega_{roll}(T2) \times v_x(T1) - \omega_{roll}(T1) \times v_x(T2)}{\omega_{roll}(T2) \times \omega_{yaw}(T1) - \omega_{roll}(T1) \times \omega_{yaw}(T2)} \\ R_{rollx} = \dfrac{\omega_{yaw}(T2) \times v_x(T1) - \omega_{yaw}(T1) \times v_x(T2)}{\omega_{yaw}(T2) \times \omega_{roll}(T1) - \omega_{yaw}(T1) \times \omega_{roll}(T2)} \end{cases}$$

on the basis of the roll angular velocity $\omega roll(T1)$, the yaw angular velocity $\omega yaw(T1)$, and an X velocity vx(T1) obtained from the X acceleration at the first time T1 and the roll angular velocity $\omega roll(T2)$, the yaw angular velocity $\omega yaw(T2)$, and an X velocity vx(T2) obtained from the X acceleration at the second time T2 and further calculate the pitch radius Rpitch and the YZ roll radius Rrolly according to $$\begin{cases} R_{pitch} = \frac{\omega_{roll}(T2) \times v_y(T1) - \omega_{roll}(T1) \times v_y(T2)}{\omega_{roll}(T2) \times \omega_{pitch}(T1) - \omega_{roll}(T1) \times \omega_{pitch}(T2)} \\ R_{rolly} = \frac{\omega_{pitch}(T2) \times v_y(T1) - \omega_{pitch}(T1) \times v_y(T2)}{\omega_{pitch}(T2) \times \omega_{roll}(T1) - \omega_{pitch}(T1) \times \omega_{roll}(T2)} \end{cases}$$

on the basis of the roll angular velocity ωroll(T1), the pitch angular velocity ωpitch(T1), and a Y velocity vy(T1) obtained from the Y acceleration at the first time T1 and the roll angular velocity ωroll(T2), the pitch angular velocity ωpitch(T2), and a Y velocity vy(T2) obtained from the Y acceleration at the second time T2.

8. The shaking amount detecting apparatus according to claim 6,
wherein, when determining that the second time T2 is temporally later than the first time T1, the hardware processor is further configured to perform, concerning the respective radiuses of the yaw radius Ryaw, the XZ roll radius Rrollx, the pitch radius Rpitch, and the YZ roll radius Rrolly, reliability determination of a plurality of kinds of the respective radiuses calculated on the basis of detection values at a plurality of kinds of the first time T1 having different time intervals from the second time T2 and calculate and output kinds of the respective radiuses determined as having highest reliability.

9. The shaking amount detecting apparatus according to claim 8,
wherein the hardware processor is further configured to determine that the radiuses having largest absolute values of denominators of respective equations related to the calculation of the plurality of kinds of the respective radiuses have the highest reliability.

10. The shaking amount detecting apparatus according to claim 5,
wherein the hardware processor is further configured to:
detect at least one frequency among the roll angular velocity, the yaw angular velocity, and the pitch angular velocity detected by the angular velocity sensor; and
set, concerning the respective radiuses of the yaw radius Ryaw, the XZ roll radius Rrollx, the pitch radius Rpitch, and the YZ roll radius Rrolly, a time interval between the first time T1 and the second time T2 to be longer as the detected at least one frequency is lower and perform the calculation of the respective radiuses.

11. The shaking amount detecting apparatus according to claim 6,
wherein the hardware processor is further configured to calculate the yaw radius Ryaw and the XZ roll radius Rrollx according to $$\begin{cases} R_{yaw} = \frac{\omega_{roll}(T2) \times v_x(T1) - \omega_{roll}(T1) \times v_x(T2)}{\omega_{roll}(T2) \times \omega_{yaw}(T1) - \omega_{roll}(T1) \times \omega_{yaw}(T2)} \\ R_{rollx} = \frac{\omega_{yaw}(T2) \times v_x(T1) - \omega_{yaw}(T1) \times v_x(T2)}{\omega_{yaw}(T2) \times \omega_{roll}(T1) - \omega_{yaw}(T1) \times \omega_{roll}(T2)} \end{cases}$$

on the basis of the roll angular velocity ωroll(T1), the yaw angular velocity ωyaw(T1), and an X velocity vx(T1) obtained from the X acceleration at the first time T1 and the roll angular velocity ωroll(T2), the yaw angular velocity ωyaw(T2), and an X velocity vx(T2) obtained from the X acceleration at the second time T2, and calculate the pitch radius Rpitch and the YZ roll radius Rrolly according to $$\begin{cases} R_{pitch} = \frac{\omega_{roll}(T2) \times v_y(T1) - \omega_{roll}(T1) \times v_y(T2)}{\omega_{roll}(T2) \times \omega_{pitch}(T1) - \omega_{roll}(T1) \times \omega_{pitch}(T2)} \\ R_{rolly} = \frac{\omega_{pitch}(T2) \times v_y(T1) - \omega_{pitch}(T1) \times v_y(T2)}{\omega_{pitch}(T2) \times \omega_{roll}(T1) - \omega_{pitch}(T1) \times \omega_{roll}(T2)} \end{cases}$$

on the basis of the roll angular velocity ωroll(T1), the pitch angular velocity ωpitch(T1), and a Y velocity vy(T1) obtained from the Y acceleration at the first time T1 and the roll angular velocity ωroll(T2), the pitch angular velocity ωpitch(T2), and a Y velocity vy (T2) obtained from the Y acceleration at the second time T2, and performs, concerning the respective radiuses of the yaw radius Ryaw, the XZ roll radius Rrollx, the pitch radius Rpitch, and the YZ roll radius Rrolly, reliability determination of the respective radiuses calculated on the basis of the angular accelerations and the accelerations and the respective radiuses calculated on the basis of the angular velocities and the velocities and outputs the respective radiuses determined as having higher reliability.

12. The shaking amount detecting apparatus according to claim 11,
wherein the hardware processor is further configured to determine that the radiuses having smaller absolute values of the respective radiuses calculated on the basis of the angular accelerations and the accelerations and the respective radiuses calculated on the basis of the angular velocities and the velocities have higher reliability.

13. The shaking amount detecting apparatus according to claim 11,
wherein the hardware processor is further configured to:
detect at least one frequency among the roll angular velocity, the yaw angular velocity, and the pitch angular velocity detected by the angular velocity sensor; and
determine that the respective radiuses related to respective equations that give larger absolute values of absolute values of denominators of respective equations used for calculating the respective radiuses on the basis of the angular accelerations and the accelerations and absolute values obtained by multiplying denominators of respective equations used for calculating the respective radiuses on the basis of the angular velocities and the velocities with the detected at least one frequency have higher reliability.

14. The shaking amount detecting apparatus according to claim 1,
wherein the calculating the movement amount in the third axis direction by the hardware processor comprises:
multiplying the second angular velocity with the second radius to thereby calculate a first component of a third velocity in the third axis direction and multiplying the first angular velocity with the first-third projection radius to thereby calculate a second component of the third velocity in the third axis direction;
integrating the first component of the third velocity with respect to a time period to thereby calculate a first component of a movement amount in the third axis direction and integrating the second component of the third velocity with respect to a time period to thereby calculate a second component of the movement amount in the third axis direction; and
adding up the first component of the movement amount in the third axis direction and the second component of the movement amount in the third axis direction to calculate the movement amount in the third axis direction.

15. The shaking amount detecting apparatus according to claim 1,
wherein the calculating the movement amount in the third axis direction comprises:
integrating the first angular velocity with respect to a time period to thereby calculate a first angle, which is an angle about the first axis and integrating the second angular velocity with respect to a time period to thereby calculate a second angle, which is an angle about the second axis;
multiplying together the second radius and the second angle to thereby calculate a first component of a movement amount in the third axis direction and multiplying together the first-third projection radius and the first angle to thereby calculate a second component of the movement amount in the third axis direction; and
adding up the first component of the movement amount in the third axis direction and the second component of the movement amount in the third axis direction to calculate the movement amount in the third axis direction.

16. The shaking amount detecting apparatus according to claim 2,
wherein the first time is time when there is no influence of a rotational motion about the first axis and the second time is time when there is no influence of a rotational motion about the second axis, and
wherein the hardware processor is further configured to calculate the second radius on the basis of the second angular velocity and the third acceleration at the first time and calculate the first-third projection radius on the basis of the first angular velocity and the third acceleration at the second time.

17. The shaking amount detecting apparatus according to claim 16,
further comprising:
a third angular velocity sensor configured to detect a third angular velocity about the third axis,
wherein the acceleration sensor is further configured to detect a second acceleration in the second axis direction, and
wherein the hardware processor is further configured to:
calculate a third radius of a rotational motion about the third axis on the basis of the third angular velocity and the second acceleration and calculate a first-second projection radius of projection of the first radius of the rotational motion about the first axis on a plane including the first axis and the second axis on the basis of the first angular velocity and the second acceleration,
multiply the third angular velocity with the third radius to thereby calculate a first component of a second velocity in the second axis direction and multiply the first angular velocity with the first-second projection radius to thereby calculate a second component of the second velocity in the second axis direction,
add up the first component of the second velocity and the second component of the second velocity to acquire the second velocity, and
integrate the second velocity with respect to a time period to thereby calculate a movement amount in the second axis direction.

18. The shaking amount detecting apparatus according to claim 16,
wherein the first axis is a Z axis same as an optical axis of the optical system, a rotational motion about the Z axis is a roll rotational motion, the first angular velocity is a roll angular velocity, the first angular velocity sensor is a roll angular velocity sensor, and the first radius is a roll radius.

19. The shaking amount detecting apparatus according to claim 17,
wherein the first axis is a Z axis same as an optical axis of the optical system, a rotational motion about the Z axis is a roll rotational motion, the first angular velocity is a roll angular velocity, the first angular velocity sensor is a roll angular velocity sensor, and the first radius is a roll radius,
wherein the second axis is a Y axis serving as an axis in a vertical direction in a standard posture of the image pickup apparatus, a rotational motion about the Y axis is a yaw rotational motion, the second angular velocity is a yaw angular velocity, the second angular velocity sensor is a yaw angular velocity sensor, the second acceleration is Y acceleration, the second radius is a yaw radius, and the second velocity is a Y-direction velocity,
wherein the third axis is an X axis serving as an axis in a horizontal direction in the standard posture of the image pickup apparatus, a rotational motion about the X axis is a pitch rotational motion, the third angular velocity is a pitch angular velocity, the third angular velocity sensor is a pitch angular velocity sensor, the third acceleration is an X acceleration, the third radius is a pitch radius, and the third velocity is an X-direction velocity,
wherein the first-third projection radius is an XZ roll radius of projection of the roll radius on an XZ plane and the first-second projection radius is a YZ roll radius of projection of the roll radius on a YZ plane, and
wherein the shaking amount detecting apparatus further comprises an angular velocity sensor comprising the roll angular velocity sensor, the yaw angular velocity sensor, and the pitch angular velocity sensor.

20. The shaking amount detecting apparatus according to claim 19,
wherein the hardware processor is further configured to calculate the yaw radius on the basis of the yaw angular velocity and the X acceleration detected at time when there is no influence of the roll rotational motion, calculate the pitch radius on the basis of the pitch angular velocity and the Y acceleration detected at time when there is no influence of the roll rotational motion, calculate the XZ roll radius on the basis of the roll angular velocity and the X acceleration detected at time when there is no influence of the yaw rotational motion, and calculate the YZ roll radius on the basis of the roll angular velocity and the Y acceleration detected at time when there is no influence of the pitch rotational motion.

21. The shaking amount detecting apparatus according to claim 19,
wherein the hardware processor is further configured to:
calculate, in every predetermined number of detections, respective averages of respective angular velocities detected by the angular velocity sensor and respective accelerations detected by the acceleration sensor; and
calculate the second radius, the first-third projection radius, the third radius, and the first-second projection radius on the basis of the respective angular velocities and the respective accelerations that have been averaged.

22. The shaking amount detecting apparatus according to claim 19,
wherein the hardware processor is further configured to calculate respective angular accelerations from the respective angular velocities and calculate the second radius, the first-third projection radius, the third radius, and the first-second projection radius on the basis of the calculated respective angular accelerations and the respective accelerations.

23. The shaking amount detecting apparatus according to claim 22,
wherein the hardware processor is further configured to output a radius as 0 when at least one of a condition that an absolute value of the angular acceleration is smaller than a predetermined angular acceleration threshold and a condition that an absolute value of the acceleration is smaller than a predetermined acceleration threshold holds, and
wherein the radius is at least one of the second radius, the first-third projection radius, the third radius, and the first-second projection radius.

24. The shaking amount detecting apparatus according to claim 19,
wherein the hardware processor is further configured to output an average of a predetermined number of a latest radius to radiuses in a past of each of the second radius, the first-third projection radius, the third radius, and the first-second projection radius.

25. The shaking amount detecting apparatus according to claim 24,
wherein the hardware processor is further configured to calculate the average of the radiuses for each of signs of the radiuses, calculate an average of positive radiuses and an average of negative radiuses, and output an average of a radius having a sign same as a sign of the latest radius calculated.

26. The shaking amount detecting apparatus according to claim 25,
wherein the hardware processor is further configured to give weights decreasing from a latest weight to weights in the past to the predetermined number of radiuses from the latest radius to the radiuses in the past, add up the weights for each of the signs of the radiuses to calculate an added-up weight, set a predetermined threshold that only one of an added-up weight for the positive radius and an added-up weight for the negative radius can take, when any one of the added-up weight for the positive radius and the added-up weight for the negative radius is equal to or larger than the predetermined threshold, output the radius having the sign equal to or larger than the threshold, and, when both the added-up weights are smaller than the threshold, output a radius as 0.

27. The shaking amount detecting apparatus according to claim 19,
wherein the hardware processor is further configured to:
detect whether the image pickup apparatus is in a stationary state; and
when the hardware processor detects that the image pickup apparatus is in the stationary state, output a radius as 0,
wherein the radius is at least one of the second radius, the first-third projection radius, the third radius, and the first-second projection radius.

28. The shaking amount detecting apparatus according to claim 19,
wherein, when a detection value of the yaw angular velocity sensor is fixed exceeding a predetermined time period or when a sign of the detection value of the yaw angular velocity sensor is the same exceeding the predetermined time period, the hardware processor is configured to output a radius as 0 for the predetermined time period, and
wherein the radius is at least one of the second radius, the first-third projection radius, the third radius, and the first-second projection radius.

29. The shaking amount detecting apparatus according to claim 19,
further comprising:
a storage configured to store tilt information related to a tilt of the angular velocity sensor and a tilt of the acceleration sensor with respect to a predetermined standard direction,
wherein the hardware processor is further configured to:
read out the tilt information from the storage and correct a detection value of the angular velocity sensor and a detection value of the acceleration sensor; and
use the corrected detection values to calculate the third velocity.

30. The shaking amount detecting apparatus according to claim 19,
wherein the hardware processor is further configured to detect a relative posture on the basis of a detection value by the angular velocity sensor, calculate an absolute posture on the basis of the relative posture and a detection value by the acceleration sensor, and remove a gravitational acceleration component from the detection value by the acceleration sensor on the basis of the calculated absolute posture, and
wherein the hardware processor is further configured to use the detection value from which the gravitational acceleration component is removed to calculate the third velocity.

31. The shaking amount detecting apparatus according to claim 19,
wherein the hardware processor is further configured to detect whether the image pickup apparatus is in a stationary state,
wherein the shaking amount detecting apparatus further comprises a storage configured to store acceleration information, which is a detection value of the acceleration sensor, when the hardware processor detects that the image pickup apparatus is in the stationary state, and
wherein the hardware processor is further configured to calculate, when an amount of the stored acceleration information is sufficient for determining aged deterioration of detection sensitivity of the acceleration sensor, sensitivity correction information used for correction of the detection sensitivity of the acceleration sensor.

32. An image pickup apparatus comprising:
the shaking amount detecting apparatus according to claim 1;
the optical system; and
the image pickup device,
wherein the hardware processor is further configured to:
calculate an image blur amount based on an image magnification value of the optical system and the movement amount detected by the shaking amount detecting apparatus; and
drive at least one of the optical system and the image pickup device in a direction for cancelling the image blur amount.

33. The image pickup apparatus according to claim 32,
wherein, when a predetermined time elapses after exposure by the image pickup device is started, the hardware processor is further configured to output each of the second radius and the first-third projection radius as 0.

34. A shaking amount detecting method comprising:
  detecting a first angular velocity of an image pickup apparatus about a first axis, wherein the image pickup apparatus comprises:
    an image pickup device; and
    an optical system that forms an image of light from an object on an image pickup plane of the image pickup device as an object image;
  detecting a second angular velocity of the image pickup apparatus about a second axis orthogonal to the first axis;
  detecting a third acceleration of the image pickup apparatus in a third axis direction orthogonal to the first axis and the second axis;
  calculating a second radius of a rotational motion about the second axis on the basis of the first angular velocity, the second angular velocity, and the third acceleration at a first time and the first angular velocity, the second angular velocity, and the third acceleration at a second time;
  calculating a first-third projection radius of projection of a first radius of a rotational motion about the first axis on a plane including the first axis and the third axis;
  calculating a movement amount in the third axis direction on the basis of the second radius, the first-third projection radius, the first angular velocity, and the second angular velocity; and
  outputting an instruction signal to drive at least one of the image pickup device and the optical system based on the movement amount in the third direction.

35. The shaking amount detecting method according to claim 34,
  wherein the calculating of the movement amount in the third axis direction based on the second radius, the first-third projection radius, the first angular velocity, and the second angular velocity comprises:
    multiplying the second angular velocity with the second radius to thereby calculate a first component of a third velocity in the third axis direction and multiplying the first angular velocity with the first-third projection radius to calculate a second component of the third velocity in the third axis direction;
    adding up the first component of the third velocity and the second component of the third velocity to acquire the third velocity; and
    integrating the third velocity with respect to a time period to thereby calculate the movement amount in the third axis direction.

36. The shaking amount detecting method according to claim 35,
  wherein the first time is time when there is no influence of a rotational motion about the first axis and the second time is time when there is no influence of a rotational motion about the second axis,
  wherein the calculation of the second radius is performed on the basis of the second angular velocity and the third acceleration at the first time, and
  wherein the calculation of the first-third projection radius is performed on the basis of the first angular velocity and the third acceleration at the second time.

37. A shaking amount detecting apparatus comprising:
  a first angular velocity sensor configured to detect a first angular velocity of an image pickup apparatus about a first axis, wherein the image pickup apparatus comprises:
    an image pickup device; and
    an optical system that forms an image of light from an object on an image pickup plane of the image pickup device as an object image;
  a second angular velocity sensor configured to detect a second angular velocity of the image pickup apparatus about a second axis orthogonal to the first axis;
  an acceleration sensor configured to detect a third acceleration of the image pickup apparatus in a third axis direction orthogonal to the first axis and the second axis;
  a processor; and
  a memory storing instructions, that when executed by the processor, causes the processor to:
    calculate a second radius of a rotational motion about the second axis on the basis of the first angular velocity, the second angular velocity, and the third acceleration at a first time and the first angular velocity, the second angular velocity, and the third acceleration at a second time;
    calculate a first-third projection radius of projection of a first radius of a rotational motion about the first axis on a plane including the first axis and the third axis;
    calculate a movement amount in the third axis direction on the basis of the second radius, the first-third projection radius, the first angular velocity, and the second angular velocity; and
    output an instruction signal to drive at least one of the image pickup device and the optical system based on the movement amount in the third direction.

38. A computer-readable storage device storing instructions, that when executed by a computer, causes the computer to control a shaking amount detecting apparatus, wherein the shaking amount detecting apparatus comprises:
  a first angular velocity sensor configured to detect a first angular velocity of an image pickup apparatus about a first axis, wherein the image pickup apparatus comprises:
    an image pickup device; and
    an optical system that forms an image of light from an object on an image pickup plane of the image pickup device as an object image;
  a second angular velocity sensor configured to detect a second angular velocity of the image pickup apparatus about a second axis orthogonal to the first axis; and
  an acceleration sensor configured to detect a third acceleration of the image pickup apparatus in a third axis direction orthogonal to the first axis and the second axis,
  and wherein controlling the shaking amount detecting apparatus comprises:
    calculating a second radius of a rotational motion about the second axis on the basis of the first angular velocity, the second angular velocity, and the third acceleration at a first time and the first angular velocity, the second angular velocity, and the third acceleration at a second time;
    calculating a first-third projection radius of projection of a first radius of a rotational motion about the first axis on a plane including the first axis and the third axis;
    calculating a movement amount in the third axis direction on the basis of the second radius, the first-third projection radius, the first angular velocity, and the second angular velocity; and
    outputting an instruction signal to drive at least one of the image pickup device and the optical system based on the movement amount in the third direction.

* * * * *